US012215677B2

(12) United States Patent
Cohen et al.

(10) Patent No.: US 12,215,677 B2
(45) Date of Patent: Feb. 4, 2025

(54) ARTIFICIAL CILIUM AND ARRAYS THEREOF

(71) Applicant: Cornell University, Ithaca, NY (US)

(72) Inventors: Itai Cohen, Ithaca, NY (US); Wei Wang, Ithaca, NY (US); Qingkun Liu, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 18/783,271

(22) Filed: Jul. 24, 2024

(65) Prior Publication Data

US 2024/0392758 A1 Nov. 28, 2024

Related U.S. Application Data

(63) Continuation-in-part of application No. PCT/US2023/028004, filed on Jul. 18, 2023, and a continuation-in-part of application No. PCT/US2023/011619, filed on Jan. 23, 2023, said application No. PCT/US2023/028004 is a continuation-in-part of application No. PCT/US2023/011619, filed on Jan. 23, 2023.

(60) Provisional application No. 63/368,751, filed on Jul. 18, 2022, provisional application No. 63/268,351, filed on Feb. 22, 2022, provisional application No. 63/267,190, filed on Jan. 26, 2022.

(51) Int. Cl.
F03G 7/00 (2006.01)

(52) U.S. Cl.
CPC ......... F03G 7/0121 (2021.08); F03G 7/0254 (2021.08)

(58) Field of Classification Search
CPC .............................. F03G 7/0121; F03G 7/0254
See application file for complete search history.

(56) References Cited

U.S. PATENT DOCUMENTS

| 6,456,420 | B1 | 9/2002 | Goodwin-Johansson |
| 7,354,787 | B2 | 4/2008 | Dunec et al. |
| 8,778,666 | B1 * | 7/2014 | Chung ............... B01F 33/30 |
| | | | 435/287.1 |

(Continued)

FOREIGN PATENT DOCUMENTS

| CN | 107036657 A * | 8/2017 | ............. G01D 21/02 |
| KR | 20110085094 A | 7/2011 | |

(Continued)

OTHER PUBLICATIONS

PCT/US2023/011619 International Search Report and Written Opinion dated Jun. 27, 2023, 14 pages.

(Continued)

*Primary Examiner* — J. San Martin
(74) *Attorney, Agent, or Firm* — COZEN O'CONNOR

(57) ABSTRACT

An artificial cilium device includes a substrate and a voltage-actuated cilia-shaped structure attached at a proximal end to the substrate. The voltage-actuated cilia-shaped structure has a first layer of a first material and a second layer of a second material. The second layer of the second material includes an exposed surface that causes the cilia-shaped structure to, in a working medium, (a) change shape from a first shape to a second shape responsive to application of a first voltage and (b) change shape from the second shape to the first shape responsive to application of a second voltage different than the first voltage.

26 Claims, 28 Drawing Sheets

(56) References Cited

U.S. PATENT DOCUMENTS

| | | |
|---|---|---|
| 2002/0043895 A1 | 4/2002 | Richards et al. |
| 2004/0164649 A1 | 8/2004 | Xu et al. |
| 2006/0069425 A1 | 3/2006 | Hillis et al. |
| 2008/0170936 A1 | 7/2008 | Den Toonder et al. |
| 2010/0212762 A1* | 8/2010 | Den Toonder .......... F04D 33/00 137/803 |
| 2013/0282174 A1 | 10/2013 | Xi et al. |
| 2015/0097317 A1 | 4/2015 | Chen et al. |
| 2019/0127214 A1 | 5/2019 | Paci et al. |
| 2020/0053325 A1 | 2/2020 | Deyle et al. |
| 2020/0339415 A1 | 10/2020 | Arnitz et al. |
| 2021/0163279 A1 | 6/2021 | Hilt et al. |
| 2021/0178596 A1 | 6/2021 | Kaminka et al. |
| 2023/0347508 A1* | 11/2023 | Miskin ................. F03G 7/0121 |

FOREIGN PATENT DOCUMENTS

| | | |
|---|---|---|
| WO | WO 2018/005449 A1 | 1/2018 |
| WO | WO 2021178978 A1 | 9/2021 |

OTHER PUBLICATIONS

Wang, W. et al. "Cilia metasurfaces for electronically programmable microfluidic manipulation" May 25, 2022, 15 pages.

Den Toonder, J. et al. "Artificial cilia for active micro-fluidic mixing" Lab Chip, 2008, 8, 533-541, published Mar. 4, 2008.

Cohen, I et al. Atomically Thin Actuator-Enabled Micro-Machines and Micro-Structures Cornell NanoScale Facility; 2019-2020 Research Accomplishments; pp. 90-91.

Kim, S. et al. "Fabrication and Manipulation of Ciliary Microrobots with Non-reciprocal Magnetic Actuation" Sci Rep 6, 30713 (2016) 9 pages.

Sareh, S. et al. "Swimming like algae: biomimetic soft artificial cilia" J R Soc Interface. Jan. 2013; Epub Nov. 2012., 1 pages.

Dotson, Z.S. "Material selection for the actuator design for a biomimetic rolling robot conducive to miniaturization" (2009). Thesis. Rochester Institute of Technology, 142 pages.

International Patent Application No. PCT/US2023/028004, International Search Report and Written Opinion dated Dec. 2, 2024, 17 pages.

* cited by examiner

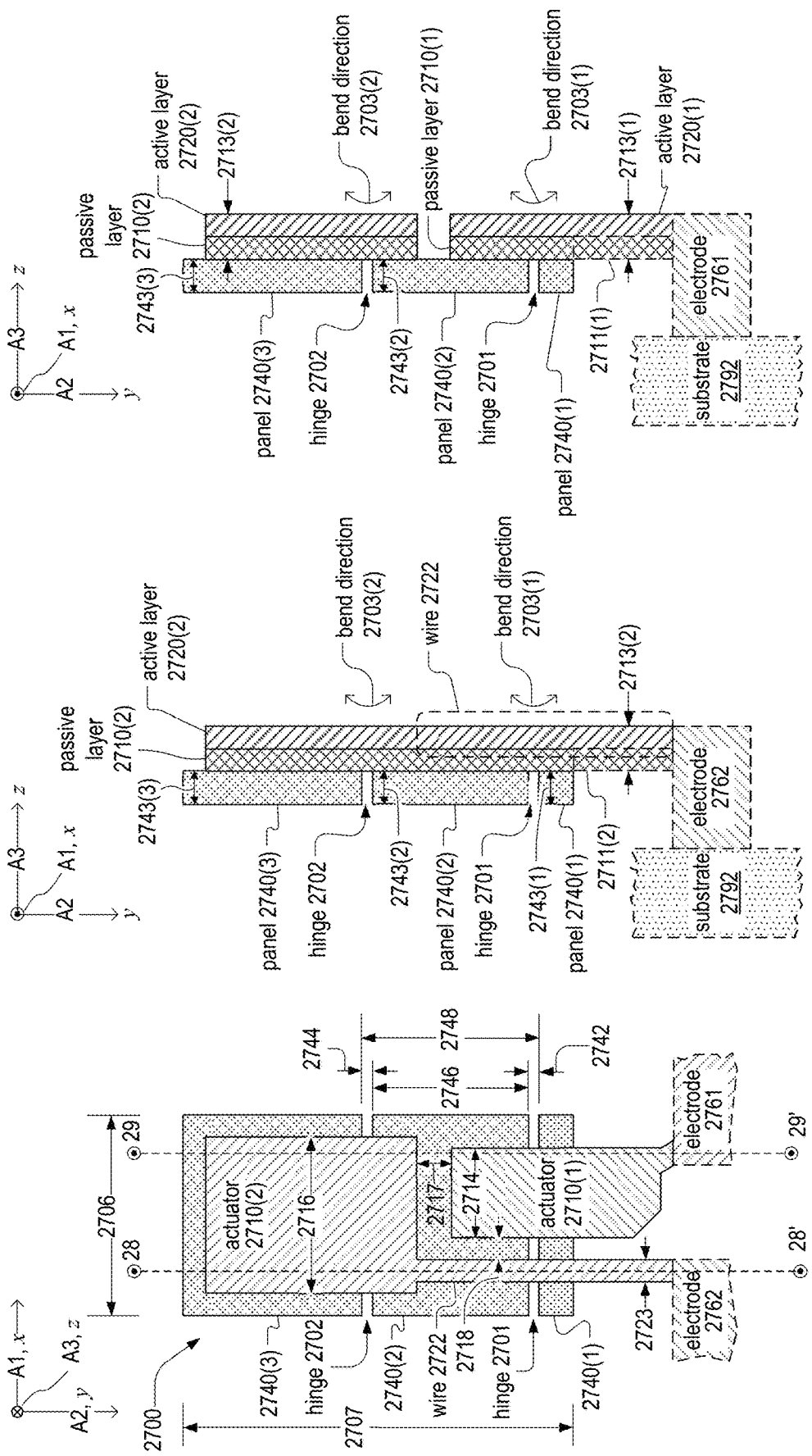

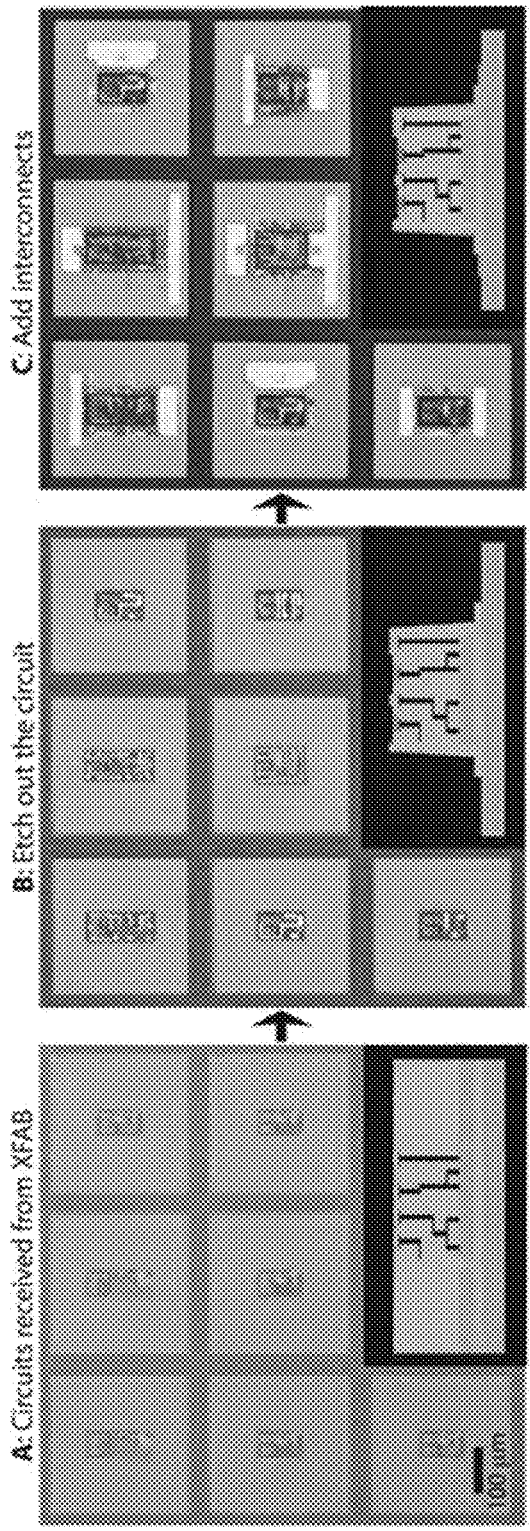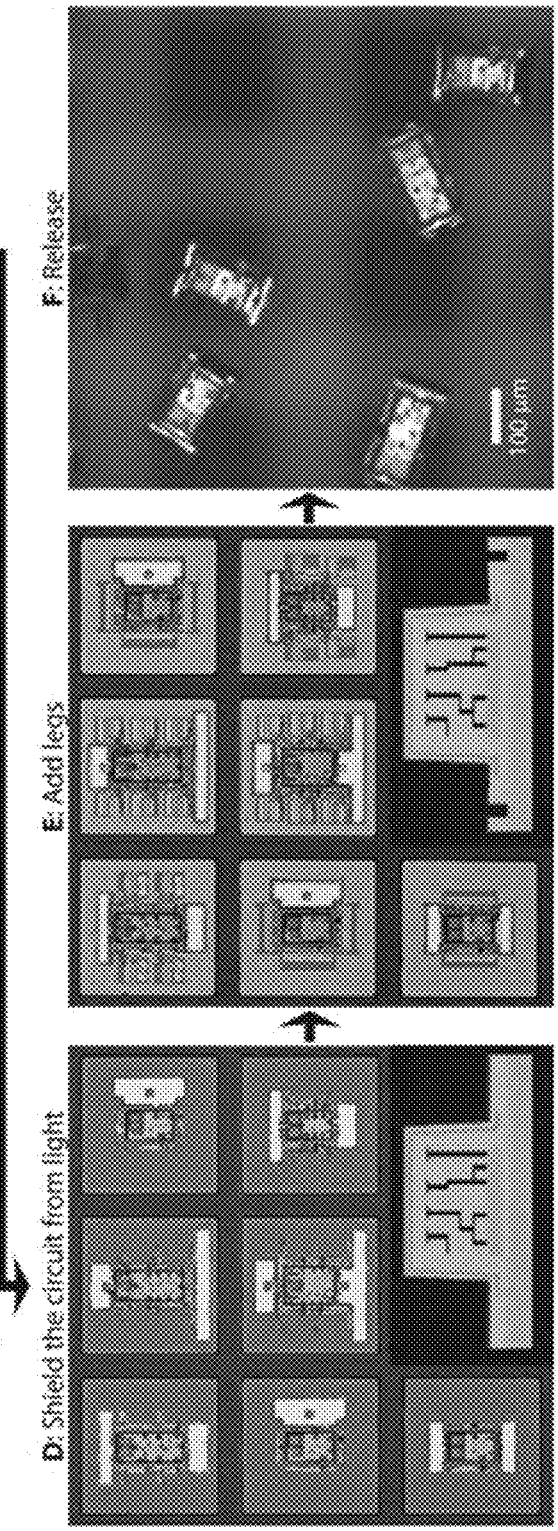
FIG. 33A  FIG. 33B  FIG. 33C  FIG. 33D  FIG. 33E  FIG. 33F

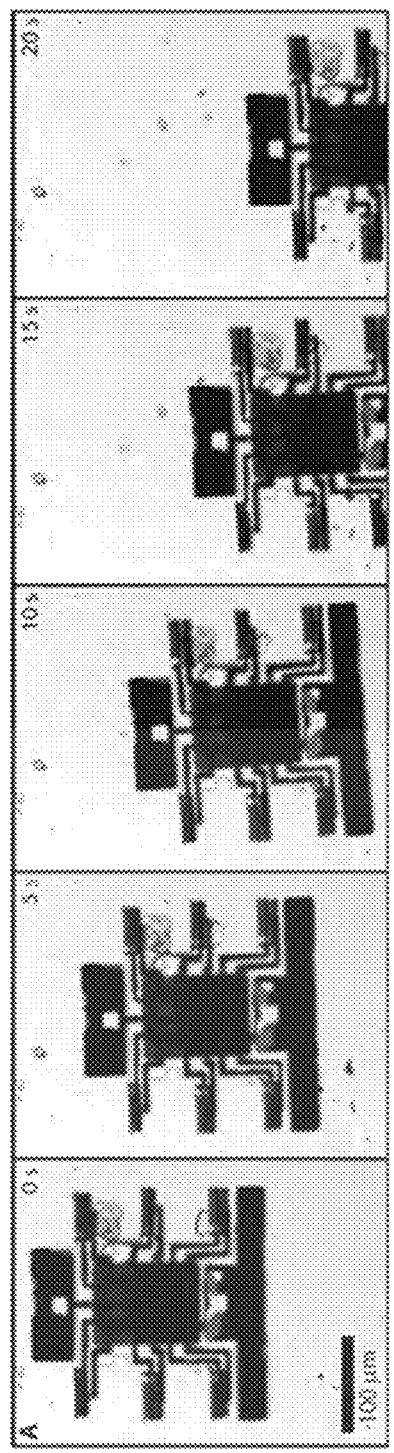
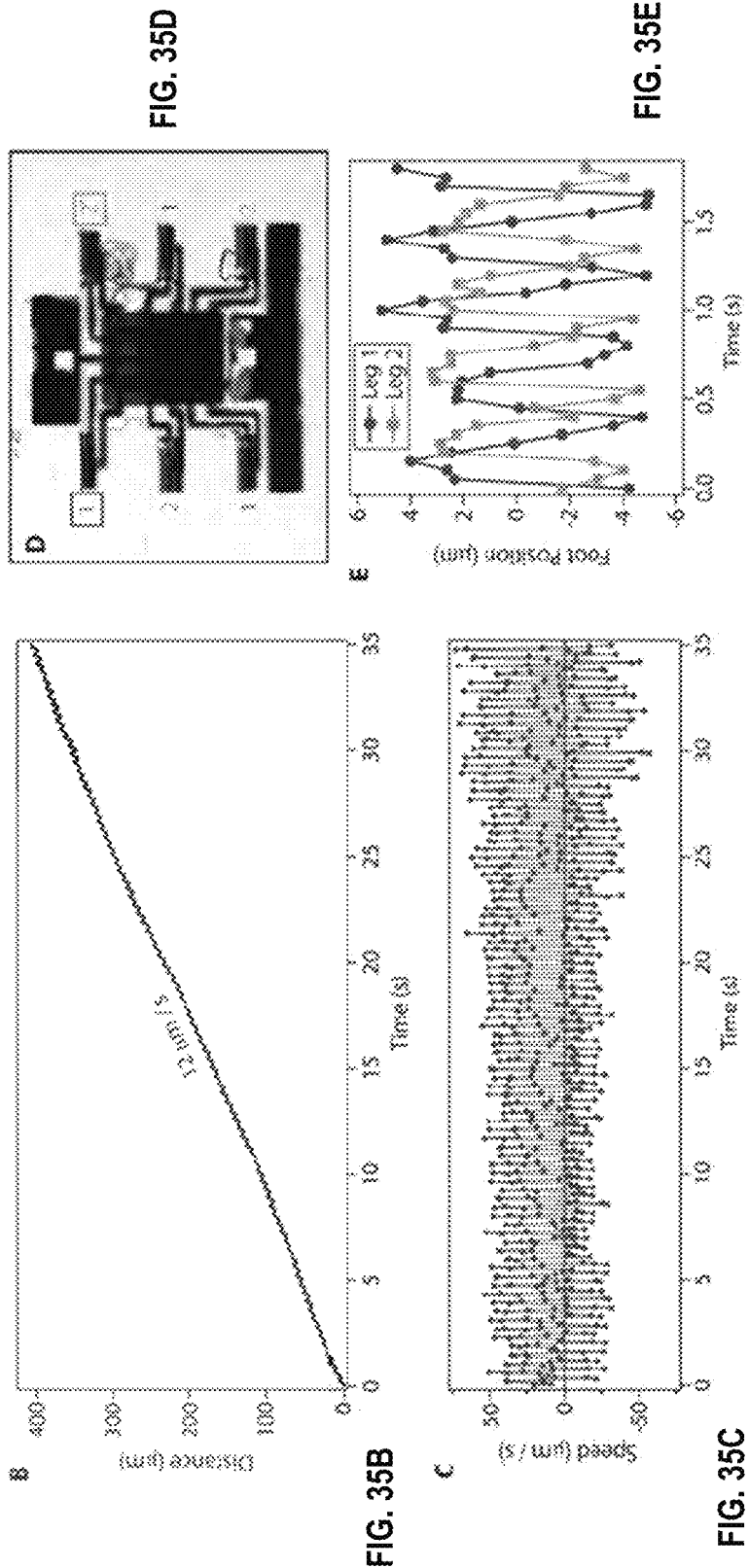
FIG. 35A
FIG. 35B
FIG. 35C
FIG. 35D
FIG. 35E

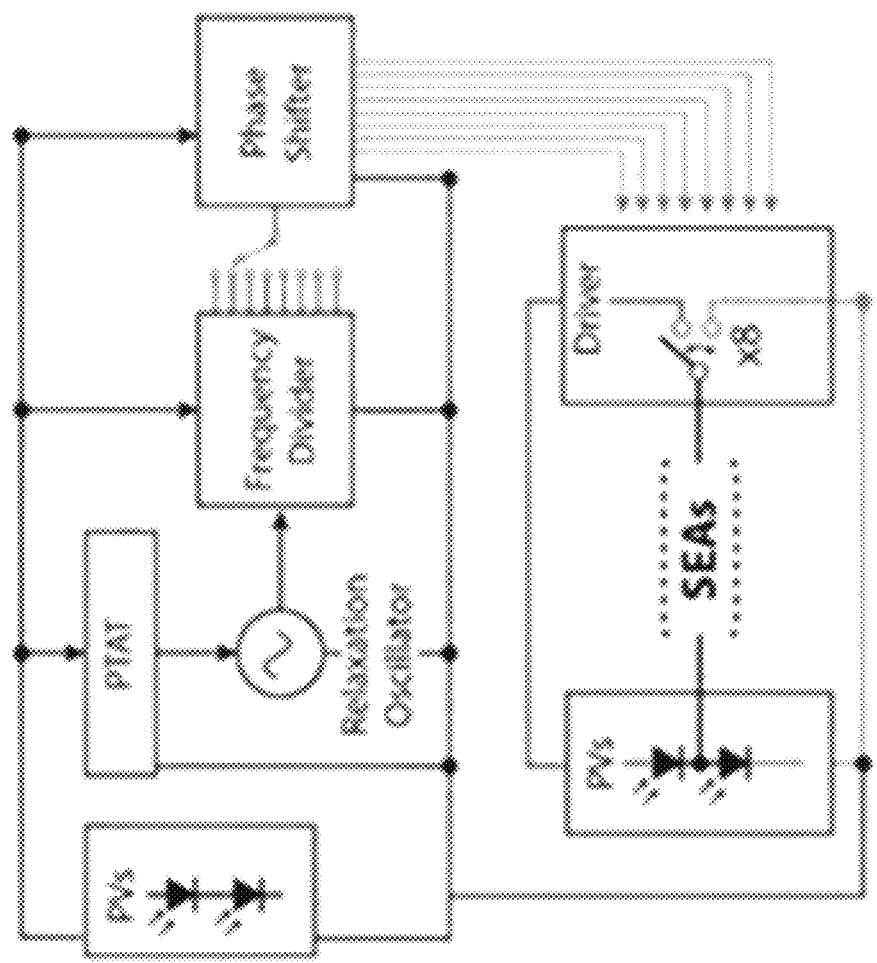
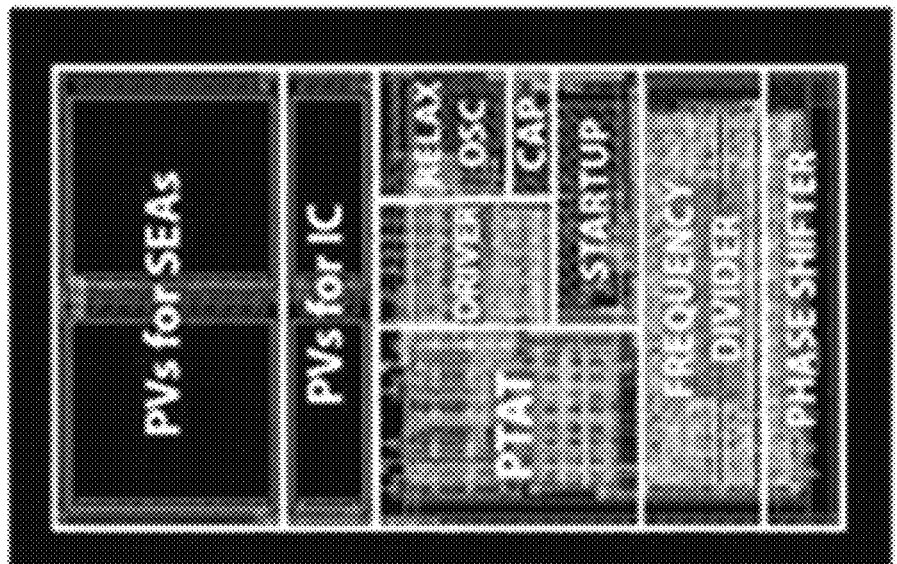
FIG. 37A
FIG. 37B

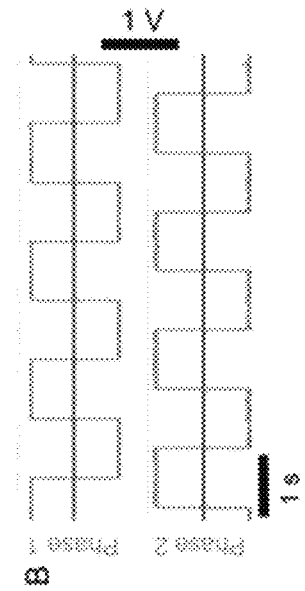
FIG. 38A
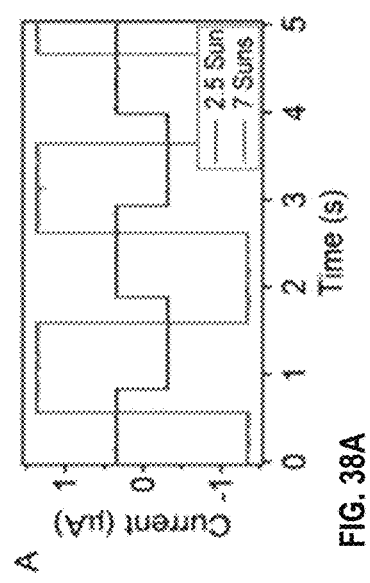
FIG. 38B
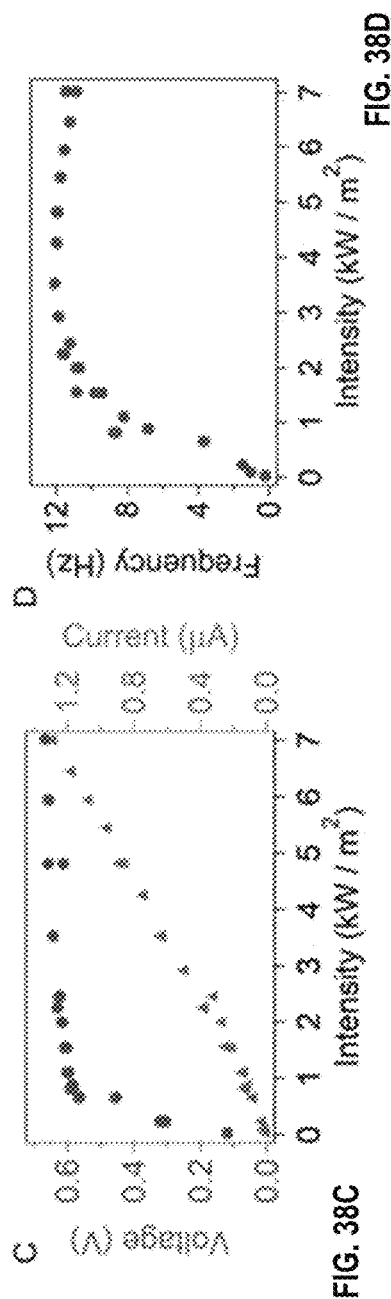
FIG. 38C
FIG. 38D
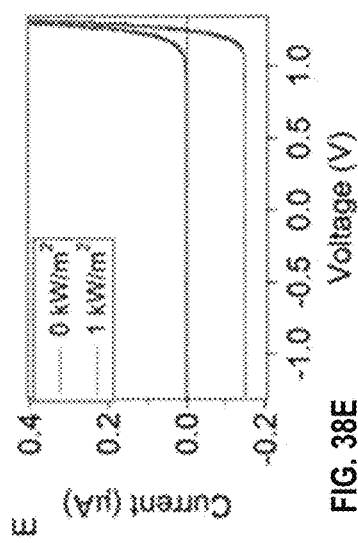
FIG. 38E

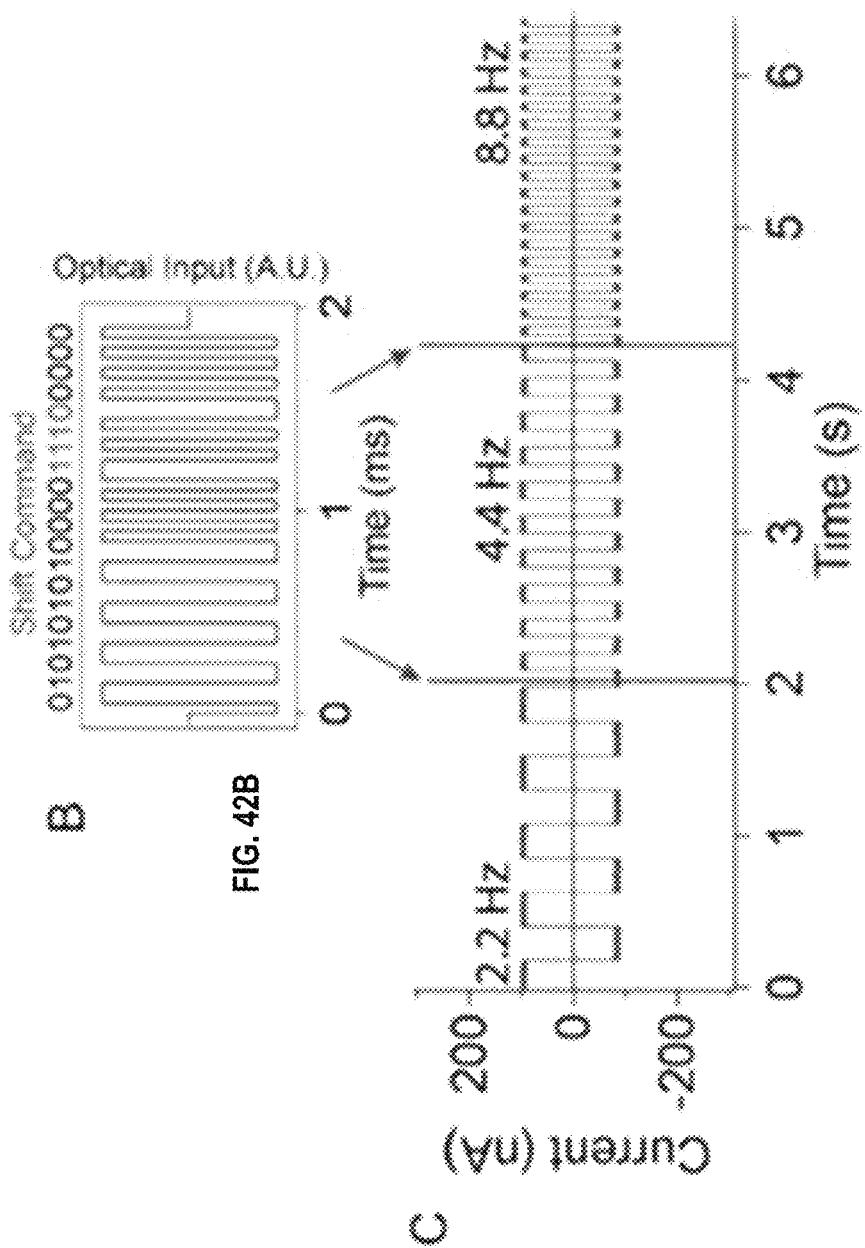
FIG. 42B
FIG. 42C
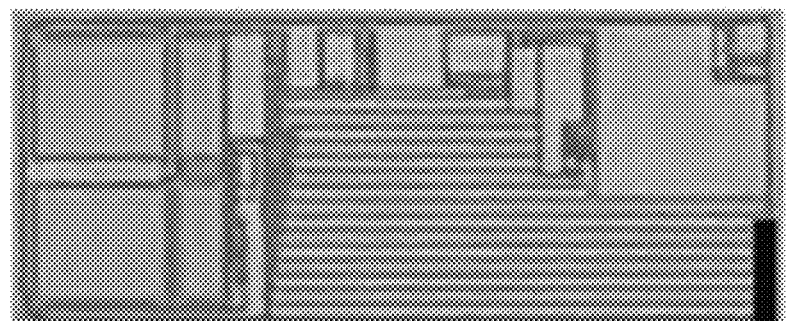
FIG. 42A

ARTIFICIAL CILIUM AND ARRAYS THEREOF

CROSS-REFERENCE TO RELATED APPLICATIONS

This application is a continuation-in-part of International Patent Application No. PCT/US2023/028004, filed Jul. 18, 2023, which claims the benefit of U.S. Provisional Application No. 63/368,751, filed Jul. 18, 2022, and International Patent Application No. PCT/US2023/011619, filed Jan. 26, 2023. This application is also a continuation-in-part of International Patent Application No. PCT/US2023/011619, filed Jan. 26, 2023, which claims the benefit of U.S. Provisional Application Nos. 63/368,751, filed Jul. 18, 2022, 63/268,351, filed Feb. 22, 2022, and 63/267,190, filed Jan. 26, 2022. Each of the foregoing applications is incorporated herein by reference in its entirety.

STATEMENT REGARDING FEDERALLY SPONSORED RESEARCH

This invention is made with government support under Grant No. ARO W911NF-18-1-0032 awarded by the Army Research Office. This invention is also made with government support under Grant No. EFMA-1935252 from the National Science Foundation, Air Force Office of Scientific Research under Grant No. MURI: FA9550-16-1-0031. The government has certain rights in the invention.

TECHNICAL FIELD

This patent document relates to an electrochemical actuator.

BACKGROUND

While ciliary pumping is one of the most important and ubiquitous fluidic transport methods in the microscopic world, it has been challenging to engineer artificial cilia platforms that can be widely adopted. While several pioneering studies have demonstrated methods for fabricating artificial cilia whose actuation is based on light, electrostatic, and magnetic interactions, these systems have limitations.

SUMMARY

Embodiments disclosed herein may be implemented to provide a metasurface that actively manipulates fluid flow near the surface and yield desired fluid flows.

In a first aspect, an artificial cilium device includes a substrate and a voltage-actuated cilia-shaped structure attached at a proximal end to the substrate. The voltage-actuated cilia-shaped structure has a first layer of a first material and a second layer of a second material. The second layer of the second material includes an exposed surface that causes the cilia-shaped structure to, in a working medium, (a) change shape from a first shape to a second shape responsive to application of a first voltage and (b) change shape from the second shape to the first shape responsive to application of a second voltage different than the first voltage.

In a second aspect, an artificial cilium includes a first actuator, a second actuator, a proximal panel, a middle panel, a distal panel, and wire. The first actuator includes a first passive layer on a first active layer. The second actuator includes a second passive layer on a second active layer. The middle panel is between the proximal panel and the distal panel, and has a length less than a distance between the proximal panel and the distal panel when the proximal panel and the distal panel are coplanar. The wire is (i) electrically connected to the second actuator and (ii) on each of the proximal panel and the distal panel. The first actuator is on each of, and spanning a proximal gap between, the proximal panel and the middle panel. The second actuator is on each of, spanning a distal gap between, the middle panel and the distal panel.

BRIEF DESCRIPTION OF THE DRAWINGS

FIGS. 27-29 show respective views of an embodiment of an artificial cilium.

FIG. 32A shows one such microscopic robot, pictured next to an ant. In FIG. 32B, we zoom in on the robot. FIG. 32C: legs made of SEAs and rigid silicon dioxide panels. FIG. 32D shows the computer aided design (CAD) layout of the IC that controls the robot. FIG. 32E shows an optical micrograph of the circuit FIGS. 33A-33F Simplified Fabrication Process. Starting from CMOS electronics received from XFAB (FIG. 33A), we first etch around the circuit of the robot (FIG. 33B), then deposit interconnects (FIG. 33C), deposit metal to shield the circuit from light (FIG. 33D), and finally pattern the actuators and rigid panels to make the legs (FIG. 33E). Once the robots are completed, we etch the silicon substrate beneath them and release them into aqueous solution (FIG. 33F), FIGS. 34A-34C Purcell-bot. A simple two-legged autonomous microscopic robot walking independently across a smooth silicon wafer is shown in FIG. 34A. The distance traveled by Purcell-bot versus time (measured by tracking the robot center) is plotted in FIG. 34B. FIG. 35E tracks the motion of one leg on each phase with respect to the body.

FIG. 36B shows the CAD layout for dogbot's circuit. We show an optical microscope image of the fully integrated dogbot in FIG. 36C. In FIG. 36D, we show dogbot's response to a shift command that changes the gait frequency.

FIGS. 37A and 37B Control circuit for microscopic robots. The circuit for driving the robots in FIGS. 34A-34C and FIGS. 35A-35E consists of the circuit blocks labeled on the circuit CAD layout and in a block diagram in FIGS. 37A and 37B.

FIGS. 38A-38E. Circuit Testing. In FIG. 38A, we plot the current versus time for two incident light intensities. FIG. 38B plots the voltage versus time from two different phase outputs measured simultaneously. In FIG. 38C, we plot the measured amplitude of current and voltage of square wave outputs from the circuit as a function of light intensity. In FIG. 38D, we plot the frequency versus light intensity from one of the circuits. FIG. 38E shows I-V curves for the large photovoltaics for powering the legs of the robot wired in series.

FIGS. 42A-42C. Dogbot circuit testing. FIG. 42A shows an optical image of that circuit prior to fabrication. In FIG. 42B, we show the shift command delivered to the circuit optically. In FIG. 42C, we plot the current versus time from the circuit as it receives consecutive shift commands.

DETAILED DESCRIPTION

Figure 1:
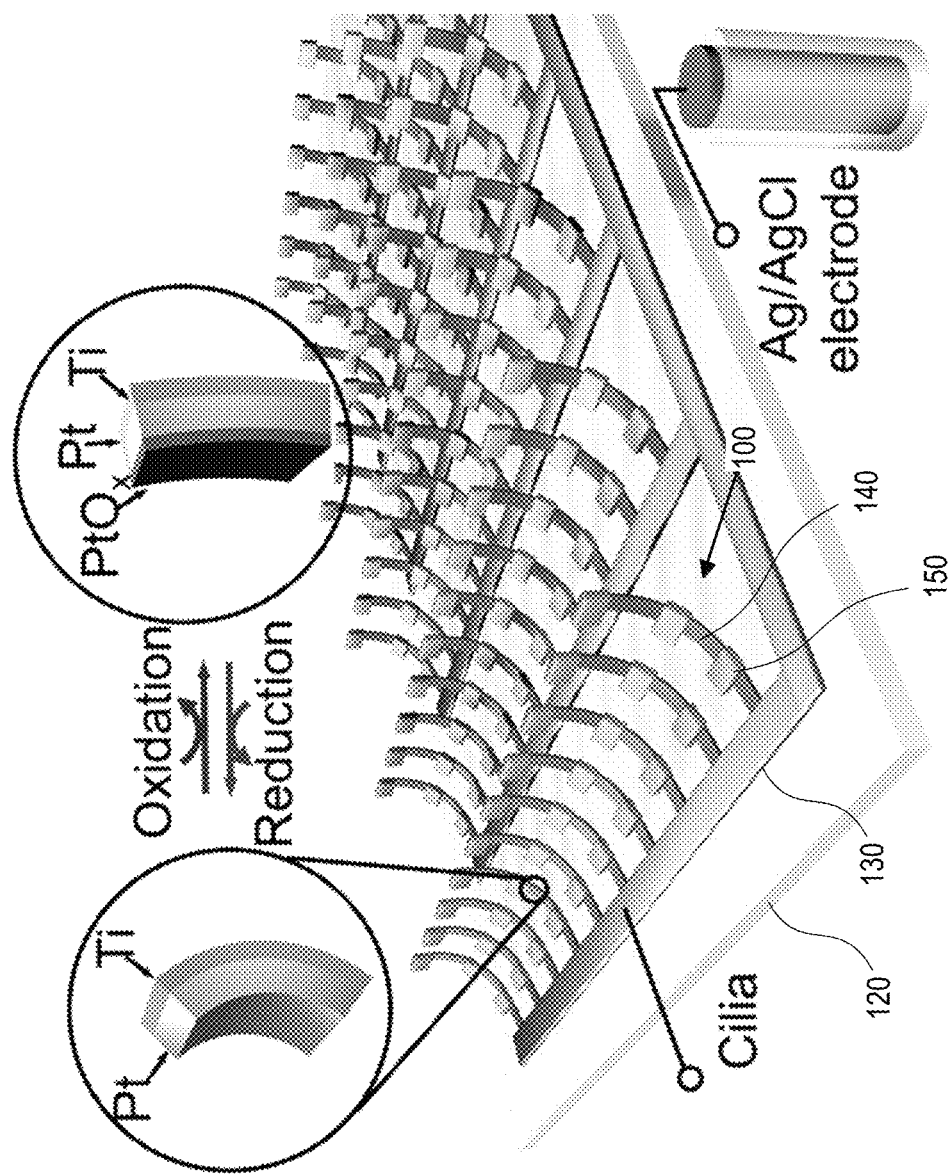
FIG. 1 shows an embodiment of electrically-actuated artificial cilia.

Cilial pumping is a powerful strategy used by biological organisms to control and manipulate fluids at the microscale. Despite numerous recent advances in optically, magnetically, and electrically driven actuation, however, development of an engineered cilial platform with comparable capabilities has remained elusive. Embodiments disclosed herein may be implemented to provide active metasurfaces of electronically actuated artificial cilia that can create arbitrary flow patterns in liquids near a surface. For example, embodiments, of voltage-actuated cilia generate non-reciprocal motions to drive surface flows at tens of microns per second at actuation voltages of 1V. A cilia unit cell implemented based on some embodiments can locally create a range of elemental flow geometries. In some embodiments, an active cilia metasurface includes a plurality of cilia unit cells that generate and switch between any desired surface flow pattern. In some embodiments, a light-powered complementary metal-oxide-semiconductor (CMOS) clock circuit enables wireless operation of the cilia. In one example, the light-powered clock circuit outputs voltage pulses with various phase delays to demonstrate improved pumping efficiency using metachronal waves. The results obtained using some embodiments illustrate a new pathway to fine scale microfluidic manipulations, with applications from microfluidic pumping to microrobotic locomotion.

There have been many attempts to manipulate fluids at a microscale using artificial cilia platforms. Despite numerous recent advances in optically, magnetically, and electrically driven artificial cilia platforms, none of them is efficient and feasible to be applied to a microfluid system.

Embodiments disclosed herein may be implemented to provide a metasurface that actively manipulates fluid flow near the fluid surface and yield desired flows. In some implementations, a surface electrochemical microactuator can be used in microfluidic pumping. In one example, the microactuator can be used to implement artificial cilia in tens of micrometers, which is smaller than most other artificial cilia. The artificial cilia implemented in some implementations can operate in an aqueous solution.

Embodiments disclosed herein may be implemented to provide a method for creating and reprogramming arbitrary micro scale flow patterns. In some implementations, cilia patterns include periodic cellular structures that can be used to generate arbitrary flow near the surface.

Embodiments disclosed herein may be implemented to provide wireless cilia integrated with control circuits. In some implementations, the control circuit is used to remotely control the artificial cilia to generate metachronal wave. In one example, the control circuit includes a photovoltaic unit, a clock unit, and a phase shifter unit.

In embodiments, a fabrication process of an artificial cilia device includes a photolithography process that is performed in a cleanroom. At first, a release layer that includes aluminum and aluminum oxide is grown and patterned. Thicknesses of the aluminum and aluminum oxide may be in the following respective ranges: 160 nm-200 nm and 15 nm-25 nm. Then, a thin titanium layer and a platinum layer are grown and patterned. Thicknesses of the titanium layer and platinum layer may be in the following respective ranges: 2 nm-4 nm and 5 nm-10 nm, respectively.

Electrodes with 10 nm Ti and 60 nm Pt are then patterned. Polymer panels are patterned on the top to regulate the actuation. The device is then cut into pieces, e.g., having dimensions of approximately 1 cm by 1 cm. These pieces are then wire bonded into the chip carrier. The chip carrier is then connected to a computer and controlled by a system design platform such as LabView. The device may be placed in an etchant to etch away the release layer, after which the aqueous solution is applied to the device. The actuation of artificial cilia is controlled to get the desired flow patterns.

Integrated microfluidic chip with artificial cilia
Fabrication of Artificial Cilia A fabrication process of artificial cilia includes growing layers of Pt and Ti, etching these layers, fabricating polymeric panels, and finally releasing the cilia structures. The fabrication process may include at least one of the following enumerated steps. (1) A release layer of 180 nm aluminum is deposited on glass, e.g., Borofloat® glass, using a thermal evaporator (e.g., CVC SC4500). To protect this release layer during the fabrication process, an additional 20 nm $Al_2O_3$ is grown at 110° C. using atomic layer deposition (ALD). To pattern these release layers, a positive photoresist (e.g., Microposit S1813) is spin-coated and exposed using an ABM contact aligner; the wafer is then developed in a developer (e.g., MicroChemicals AZ 726 MIF). The exposed releasing layers are etched by an aluminum etchant. Then, the photoresist is stripped by an organic remover (e.g., Microposit Remover 1165) with sonication, followed by oxygen plasma clean for 3 min (e.g., Oxford PlasmaLab 80+). (2) To fabricate the cilia, 3 nm of Ti is sputtered onto the sample at 3 mTorr and 400 W (e.g., AJA sputter tool). (3) Then, a 7.5 nm Pt layer is grown using ALD at 250° C. (4) A positive photoresist S1813 is spin-coated, and the cilia pattern is defined by photolithography. (5) The Ti and Pt layers are then etched by an ion mill tool at 600 V (e.g., AJA ion mill). Then the photoresist is stripped in the organic remover. (6) A negative photoresist (e.g., MicroChemicals NLOF 2020) is spin-coated and patterned as the rigid panels to regulate the deformation of artificial cilia. 7) To balance the prestress in Pt/Ti layers, the top surface of Pt layer is oxidized by 1-min oxygen plasma. 8) Finally, the sample is baked at 170° C. for 30 minutes to strengthen the adhesion between the Pt layer and polymer panels.

Fabrication of Cilia Metasurface

Between the aforementioned steps (5) and (6), metal electrodes (e.g., 10 nm Ti and 60 nm Pt) are patterned to interconnect the cilia to the soldering pads. The chip is then packaged into a chip carrier with Dual In-line Package (DIP) and Ceramic Pin Grid Array (CPGA) using aluminum wires via wire bonding (e.g., Westbond 7400A Ultrasonic Wire Bounder) after the fabrication of artificial cilia. Finally, the aluminum wires are protected by epoxy glue (e.g., NOA 60 from Norland Products Inc.).

Artificial Cilia with Internal Degrees of Freedom

The cilia can be designed to have internal degrees of freedom that can vastly increase its swept area, and hence its pumping efficiency. We demonstrate this concept using a multi-hinge cilia that include two hinges that may be actuated independently with a phase delay. The fabrication of these cilia is very similar to the fabrication steps for the single hinge cilia. A multi-hinge cilium may include a secondary wire that passes through the first hinge and activates the second hinge. Its operation can be characterized by the two hinge angles. We fabricated and implemented the stroke of an example two-hinge cilium; its mean pumping distance per cycle is about 4.9±0.5 µm. Moreover, the two-hinge cilia can be made much larger and operated at much lower frequencies than their one hinge counterparts. These results highlight the versatility of our system for creating cilia with internal degrees of freedom.

Wireless Microfluidic Chip with Artificial Cilia
Design of the Control Circuit

The control circuit of the wireless microfluidic chip with artificial cilia may include optically powered CMOS circuits that drive the actuators. In some implementations, the circuit includes two sets of silicon photovoltaics (PVs), one to power the surface electrochemical actuators (SEAs) and one to power the circuit. The electronics may include a Proportional to Absolute Temperature (PTAT) current source, a relaxation oscillator, a frequency divider consisting of D-type flip-flops that reduces the frequency of the relaxation oscillator to a useable range (approximately 2 Hz to 256 Hz, which can be set by hardwiring the circuit in post processing), a phase shifter that produces square waves with a phase offset, and a driver that uses the phase-shifted waves from the circuit to control the voltage applied to the artificial cilia.

Fabrication of CMOS Integrated Artificial Cilia

Embodiments of an artificial cilia device may be built on a silicon on insulator (SOI) substrate with CMOS circuit. A process for building such a device includes at least one of the following enumerated steps. (1) The $SiO_2$ layer on top of the CMOS circuit is first thinned by inductively coupled plasma etching (e.g., Oxford PlasmaLab 80+). (2) A 180-nm aluminum (doped with 1% silicon) layers and a 30-nm ALD $Al_2O_3$ layer are deposited and patterned as release layers. (3) The electrical contacts are made by selectively etching the top $SiO_2$ layer. (4) Metal wires (e.g., 10 nm Ti and 60 nm Pt) are patterned to interconnect the CMOS circuit and artificial cilia. (5) A 300-nm silica insulation layer is then patterned on top of the CMOS circuit, preventing short circuits among the circuit, the subsequent layers and the electrolyte. (6) Chrome is deposited and patterned as the light shielding layer on top of the CMOS circuit, leaving only the photovoltaics exposed to light. Finally, the artificial cilia are fabricated as discussed above.

FIG. 1 shows a plurality of electrically-actuated artificial cilia 100. Each cilium 100 includes a thin surface electrochemical actuator 140 made of a platinum strip (Pt) capped on one side by a titanium film (Ti). Each cilium 100 is attached to a substrate 120 (or a busbar 130 arranged on substrate 120) at one end and actuated by raising and lowering the potential of the film relative to the reference electrode to drive oxidation (at 1 V, for example) and reduction (at −0.2 V, for example) processes that expand and contract the platinum surface. In addition, one or more (e.g., three) panels 150 are fabricated to set the bending direction. Panel 150 may be formed of a dielectric, such as polymer or an oxide, e.g., silicon dioxide.

Figure 2:
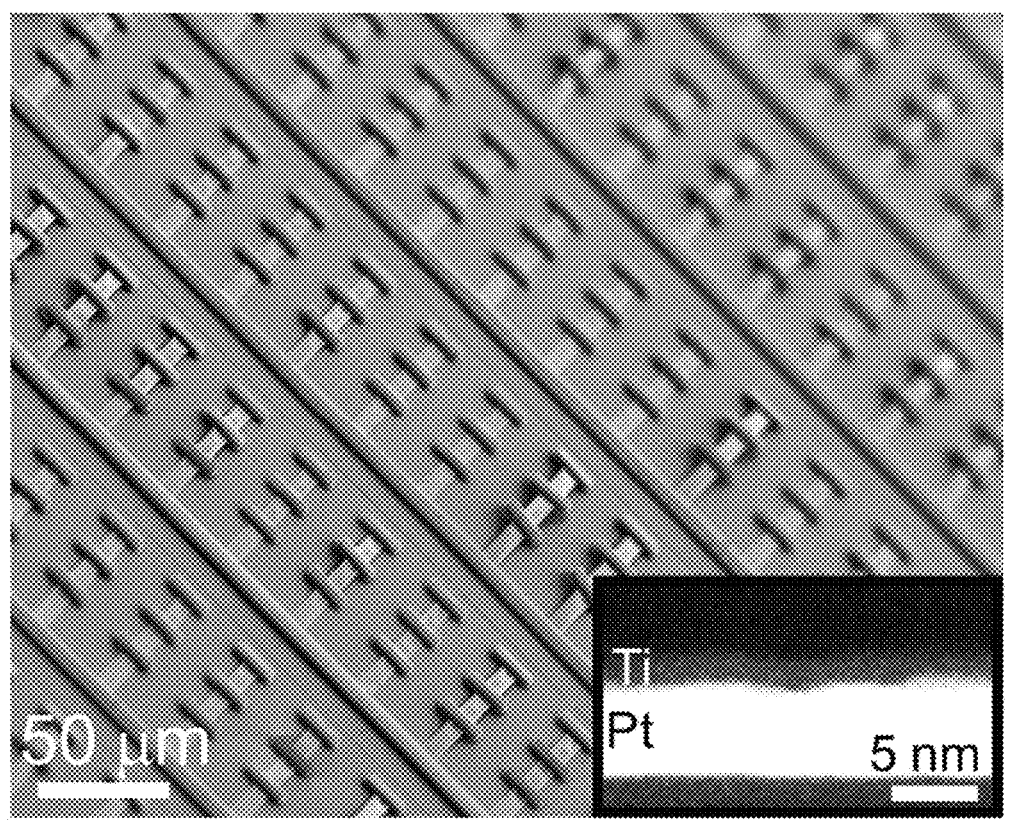
FIG. 2 shows an example of SEM image of released artificial cilia arrays with each row connected by a single busbar.

FIG. 2 shows an example of SEM image of released artificial cilia arrays with each row connected by a single busbar. A STEM image of a cilium cross section showing the platinum (white), titanium (black) is presented in the bottom right inset.

Figure 3:
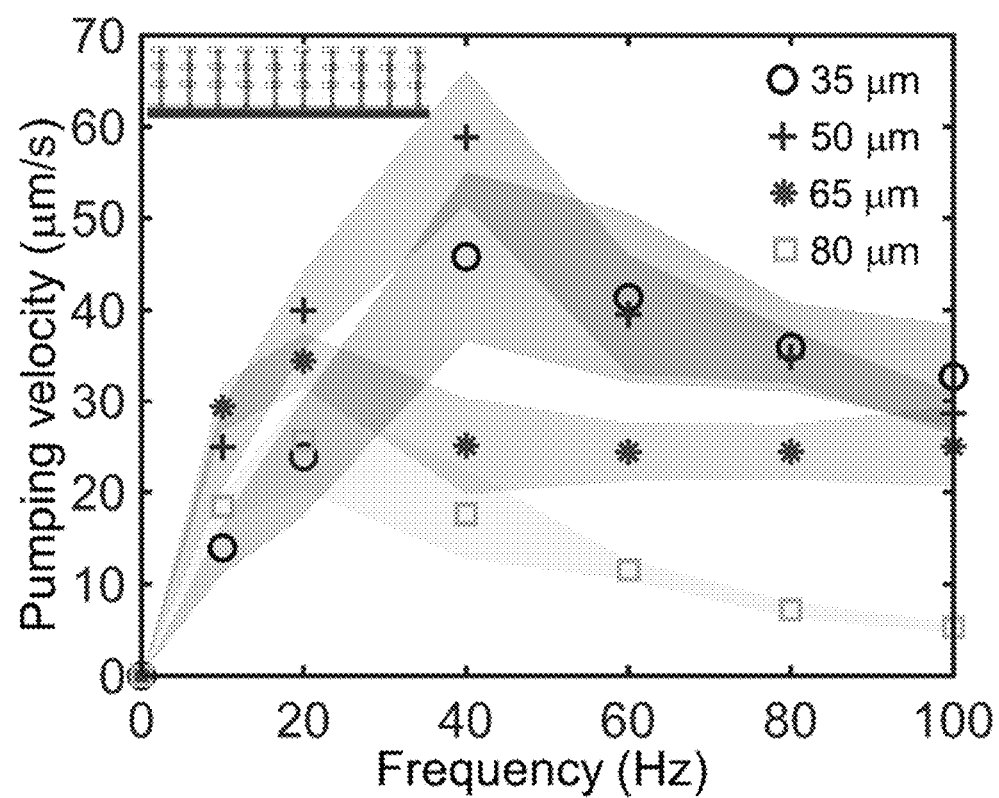
FIG. 3 shows experimental results for pumping velocity versus frequency for an embodiment of a cilia array.

FIG. 3 shows experimental results for pumping velocity versus frequency for a single cilia array such as the one shown in the top left inset. The data points show the mean pumping velocity over five different measurements at different actuation frequencies; the shaded regions indicate the standard deviation. The optimal frequency for achieving the highest pumping velocities at first increases then decreases with the cilia length.

At lower actuation frequencies, the viscous force is not large enough to break the symmetry. At higher frequency, the viscous drag is too large, diminishing the motion of the cilia. To extract the local velocity values, we focused on tracer particles in the vicinity of the cilia tips where the most efficient pumping occurred. The focal depth of the objective (20×, NA=0.4) is about 5 μm according to the resolution equation along the axial direction $f=1.4\, n\lambda/NA^2$, where f, n, λ, and NA are the focal depth, refractive index, wavelength, and numerical aperture, respectively. In the lateral dimension, the particles in a 20 μm by 20 μm area surrounding the cilia tips were chosen to calculate the velocity. The velocities were obtained for tracer particles in a 20 μm by 20 μm by 5 μm region surrounding the cilia tips.

Figure 4:
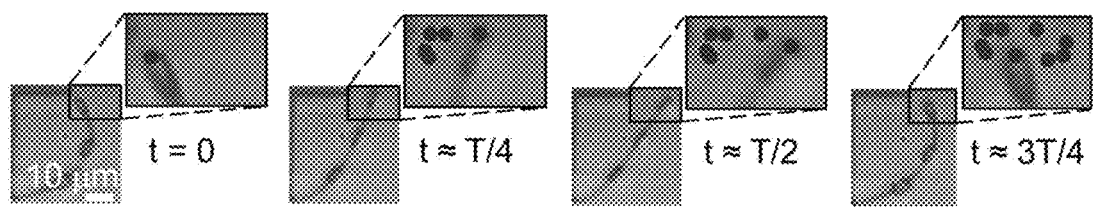
FIG. 4 shows an example of nonreciprocal motion of one 50-μm long cilium driven at 40 Hz.

FIG. 4 shows an example of nonreciprocal motion of one 50-μm long cilium driven at 40 Hz. Zoom-in trajectories of the tip are shown at the top right for each of four instants in time. T is the period of actuation cycle. The filled black circles indicate the positions of the cilium tip at times t corresponding to different moments in the stroke cycle. The trajectory traced out by the tip is elliptical, which indicates that the cilium is executing a non-reciprocal stroke capable of driving flows even at low Reynolds numbers.

Figure 5:
FIG. 5 shows an example of an extensional flow generated by an embodiment of a programmable cilia unit.

FIG. 5 shows an example of an extensional flow generated by a programmable cilia unit. Each unit includes eight cilia arrays, with each array includes eight cilia spaced laterally by a distance 514, which in this example equals 25 μm. Each cilium has a length 512, which in this example equals 50 μm. The white tracks indicate the trajectories of florescent particles in the fluid.

Figure 6:
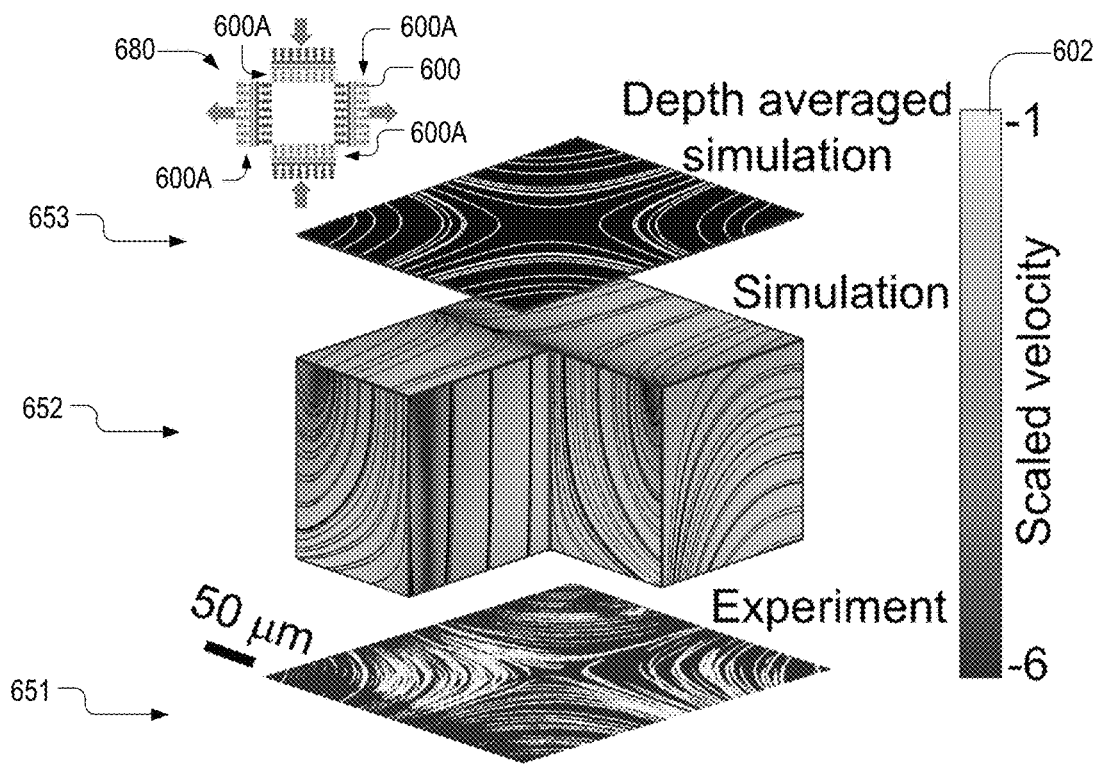
FIG. 6 shows an example of 3D flow generated by surface-driven extensional flow.

FIG. 6 shows an example of 3D flow generated by surface-driven extensional flow. Image 651 is a composite experimental and simulation image showing the extensional flow measured in the experiments from FIG. 5. Projection 652 illustrates simulated 3D flow geometry projected onto the surface of a cuboid with a quadrant removed. Simulated flow 653 is averaged over the entire depth. Gray-level bar 602 indicates the logarithm of the flow magnitude. The upper left schematic of a cilia unit 680 highlights active cilia arrays 600A and resulting flow directions (red arrows) for this elementary flow geometry. Each cilia array 600A includes a plurality of cilia 600.

Figure 7:
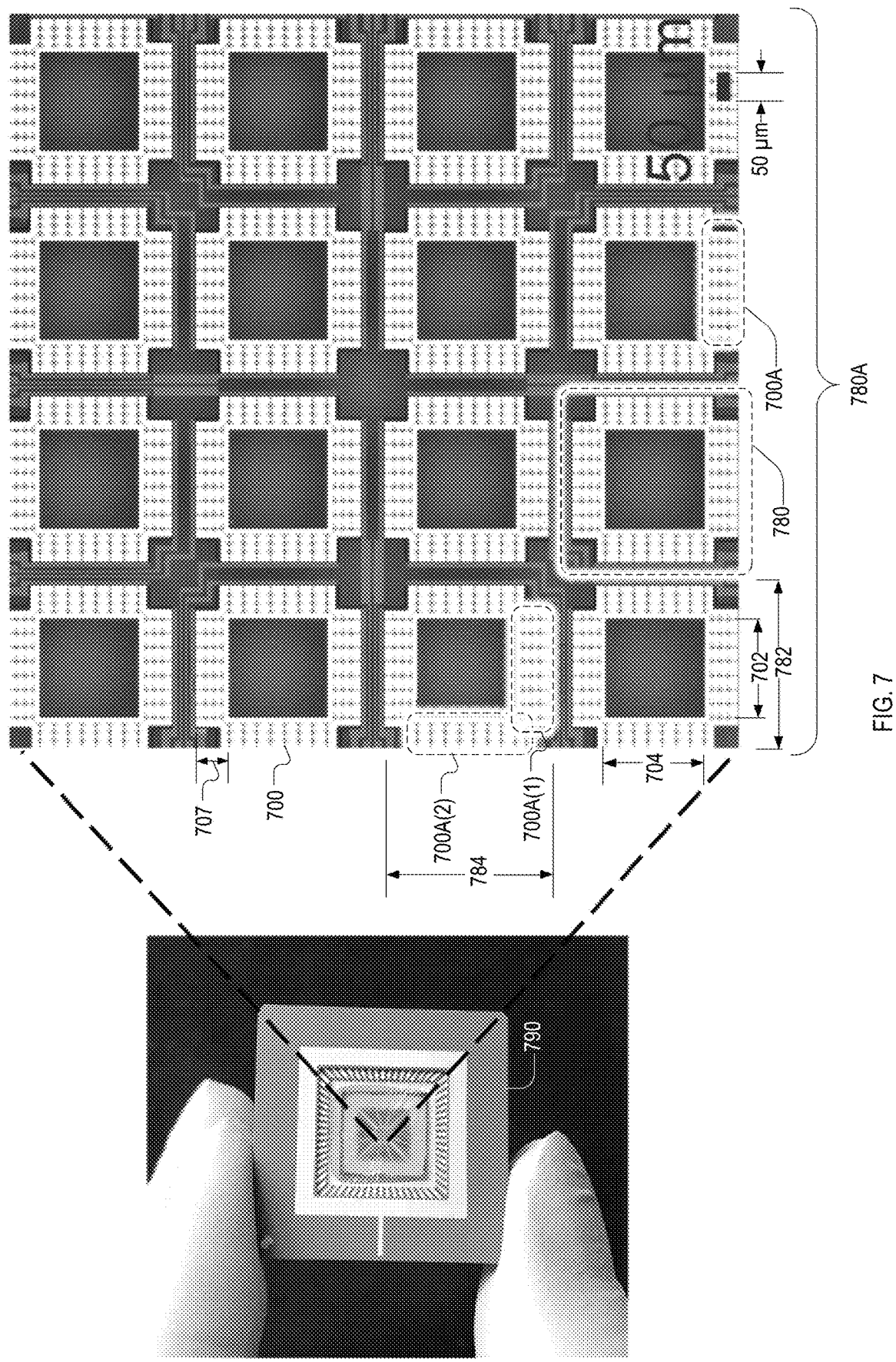
FIG. 7 shows an embodiment of a tiled cilia array that can produce arbitrary flow patterns.

FIG. 7 shows an example of a cilia chip 790 that can generate arbitrary flow patterns. Cilia chip 790 includes a plurality of cilia units, which are tiled to form a cilia metasurface 780A. Each cilia unit 780 includes four cilia arrays 700A, each of which includes an artificial cilia 700. FIG. 7 illustrates a four-by-four section of the array, which in this example includes sixty-four individual cilia arrays, which are wire bonded to a chip carrier of cilia chip 790. FIG. 7 denotes a scale that denotes a fifty-micrometer length for this particular embodiment. The spatial dimension of this scale may differ from fifty micrometers without departing from the scope hereof.

In the example of FIG. 7, cilia unit 780 includes four cilia arrays 700A arranged as a rectangle. In embodiments, cilia unit 700A may include a different number of cilia arrays 780. For example, cilia unit 780 may include a total of three cilia arrays arranged as an equilateral triangle, or a total of six cilia arrays arranged as a hexagon.

Cilia unit 780 includes two cilia arrays 700A(1) and two cilia arrays 700A(2), which are horizontally oriented and vertically oriented, respectively, and are on adjacent sides of a rectangle. Cilia arrays 700A(1) and 700A(2) have respective lengths 702 and 704, which may be either equal or unequal. Each cilium 700 has a length 707. Cilia unit 780 has respective lengths 782 and 784 along the horizontal and vertical axes, respectively. Length 782 may be greater than or equal to $L_x^{min}$, which is length 702 plus two times length 707. Length 782 may be less than $L_x^{min}$ plus M times a spacing between adjacent cilia of cilia array 700A, where M is greater than or equal to one.

Length 784 may be greater than or equal to $L_y^{min}$, which length 704 plus two times length 707. Length 784 may be less than $L_y^{min}$ plus M times a spacing between adjacent cilia of cilia array 700A, where M is greater than or equal to one.

Figure 8:
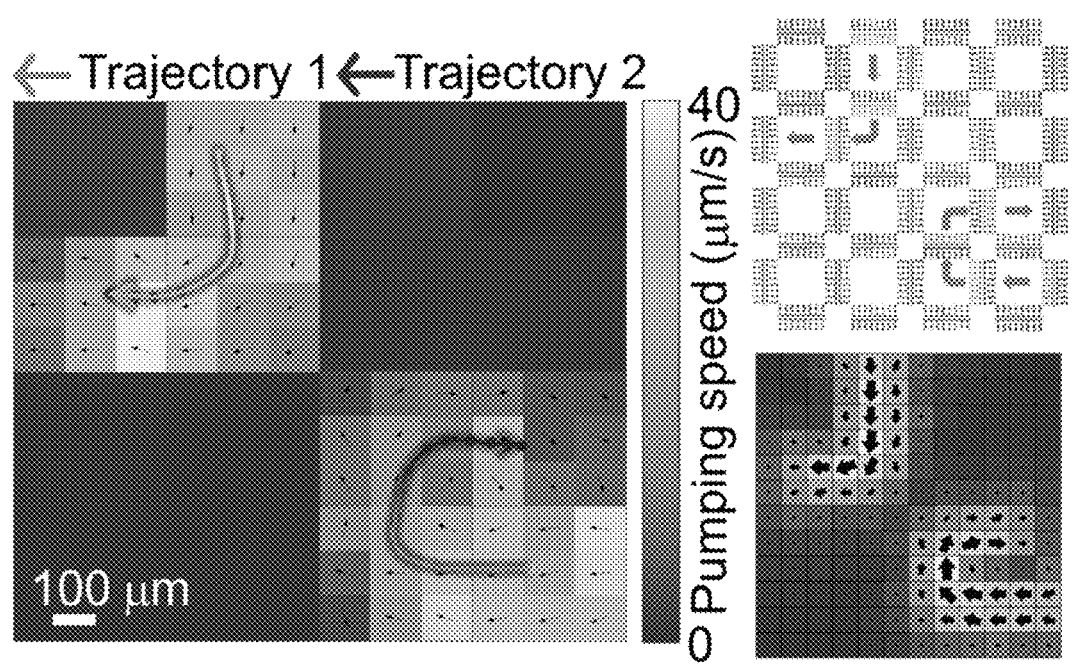
FIGS. 8, 9, 10, and 11 show, respectively, (i) two independent flow trajectories, (ii) a local rotation, (iii) a localized transport, and (iv) trajectories that split and merge, each generated by the tiled cilia array of FIG. 7.
Figure 9:
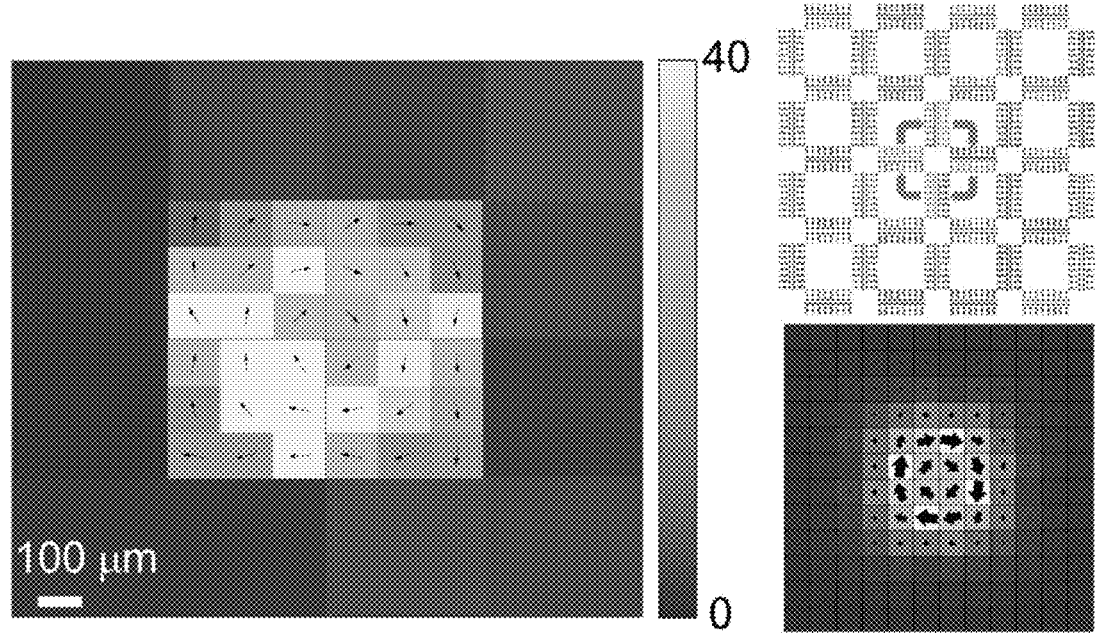
Figure 10:
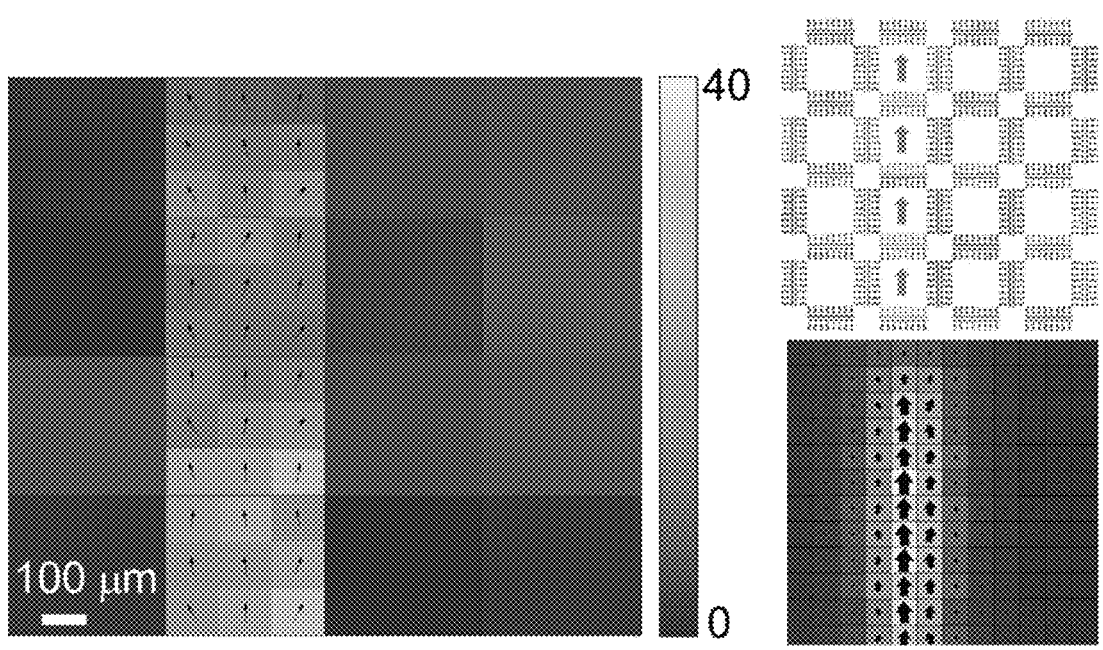
Figure 11:
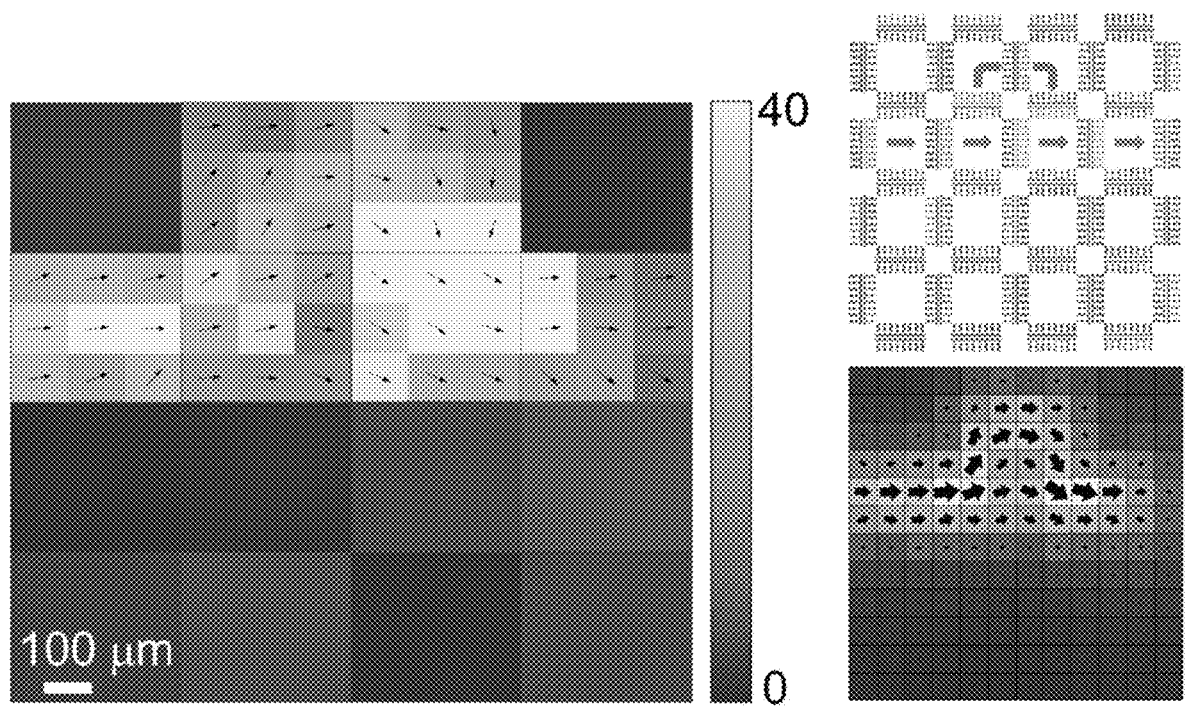

FIG. 8 shows two independent flow trajectories generated by cilia metasurface 780A, including the experimentally measured particle velocimetry data (left) a schematic of the activated cilia arrays (upper right), and the simulated flow pattern (lower right). For clarity, an individual particle track for each flow trajectory is indicated. FIG. 9 shows a local rotation generated by cilia metasurface 780A. FIG. 10 shows a localized transport generated by the cilia metasurface 780A. FIG. 11 shows trajectories that split and merge generated by cilia metasurface 780A.

Figure 12:
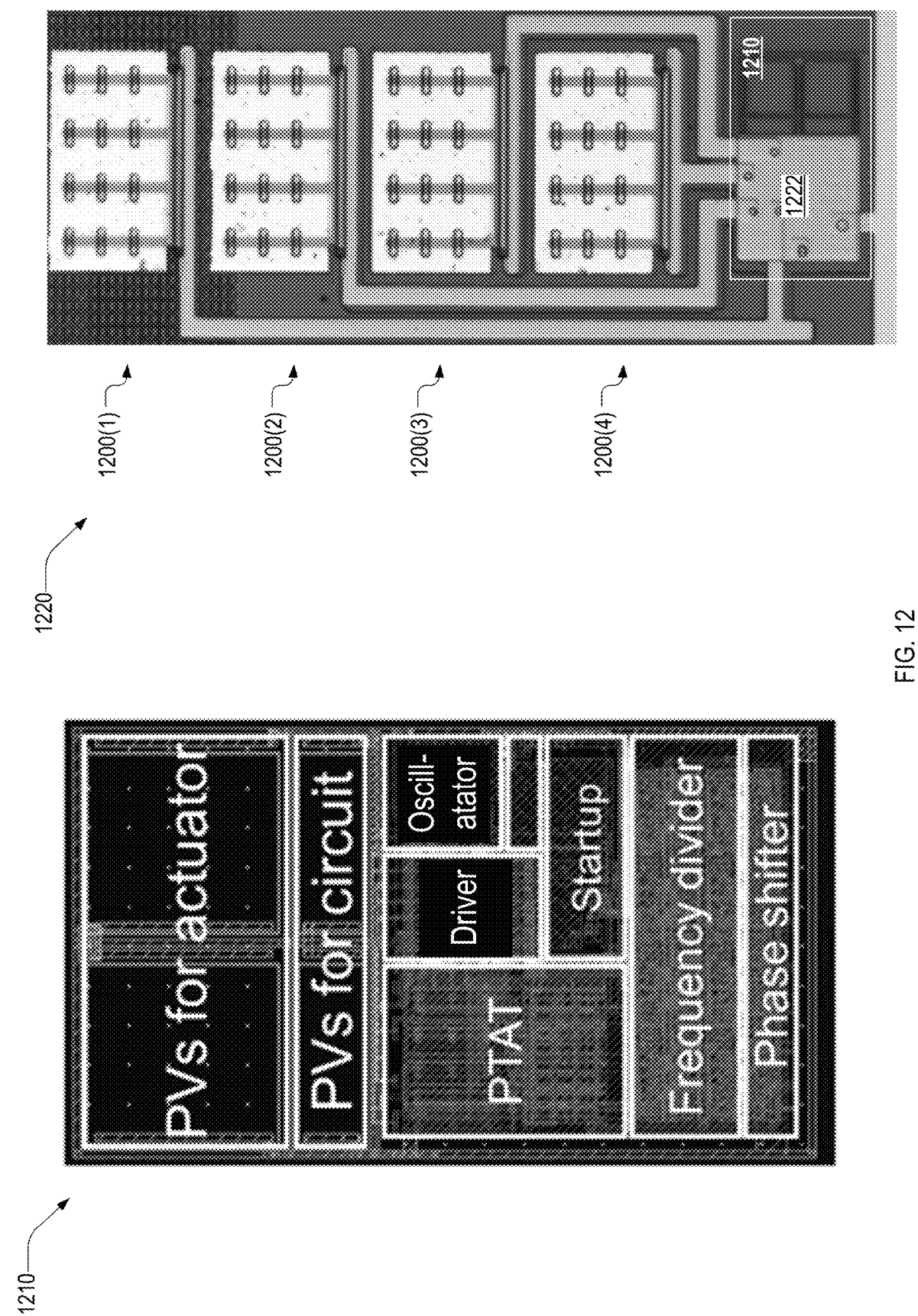
FIG. 12 shows (a) circuit layout indicating circuit components, and (b) an optical image of the CMOS circuit integrated with four artificial cilia arrays, in an embodiment.
Figure 13:
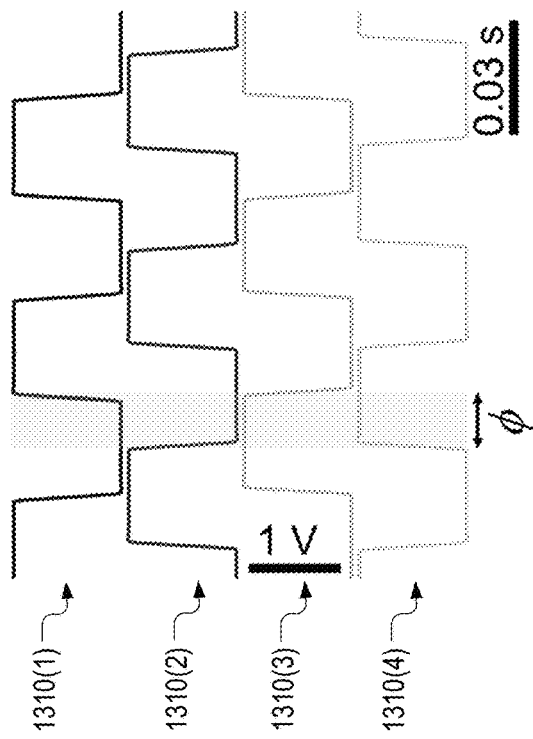
FIG. 13 shows measurements of four example voltage outputs from the CMOS circuit of FIG. 12.

FIG. 12 shows circuit 1210 indicating circuit components, and an image of a CMOS circuit 1220 that includes four CMOS integrated artificial cilia arrays 1200A(1-4). CMOS circuit 1220 includes circuit 1210. Circuit 1210 includes four photovoltaic cells, an oscillator, a frequency divider, and a phase shifter. In this example of CMOS circuit 1220, a shielding layer 1222 obscures all but the photovoltaic cells of circuit 1210. Artificial cilia array 1200A is an example of artificial cilia array 700A. Untethered control of artificial cilia arrays 1200A generates metachronal waves. FIG. 13 shows measurements of voltage outputs 1310(1-4) of CMOS circuit 1220, which control respective cilia arrays 1200A(1-4). Relative to voltage outputs 1310(1), voltage outputs 1310(2), 1310(3), and 1310(4) are phase-delayed by phases equal to φ, 2φ, and 3φ respectively. In the example of FIG. 13, φ=π/2.

Figure 14:
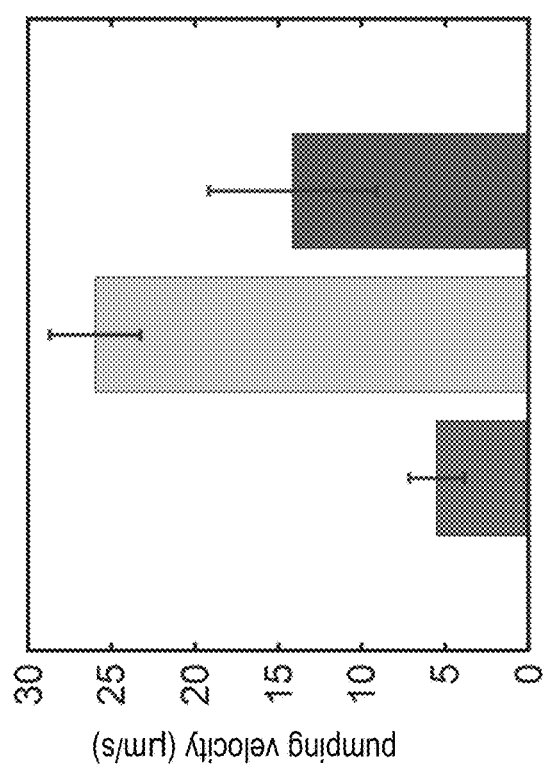
FIG. 14 is a graph of pumping velocity as a function of different phase delays applied to the cilia arrays of the CMOS circuit of FIG. 12.

FIG. 14 is a graph of pumping velocity versus phase delay for artificial cilia arrays 1200 driven at 16 Hz averaged over five separate measurements. The error bars indicate the standard deviation. In this example, a ½ phase delay between the arrays produces a pumping velocity that is ~370% higher than that obtained without phase delays, and ~84% higher than that obtained for phase delay of T.

Figure 15:
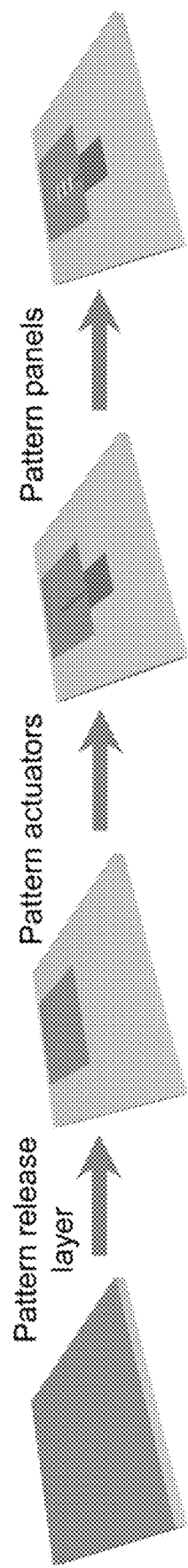
FIG. 15 shows an example fabrication process of an artificial cilium.

FIG. 15 shows an example fabrication process of an artificial cilia array 700A. 180 nm Al and 20 nm $Al_2O_3$ are first grown and patterned as the release layer. 3 nm Ti and 7.5 nm Pt are then grown and patterned as the actuator. Finally, several polymer panels are patterned on the actuator to prevent twisting of the cilium.

Figure 16:
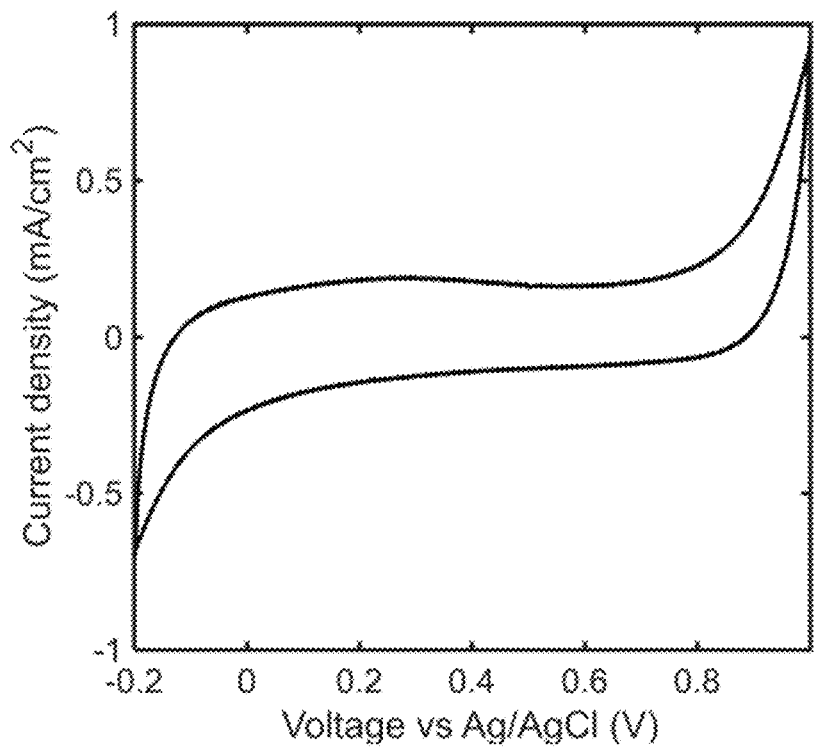
FIG. 16 is a graph illustrating cyclic voltammetry of artificial cilia, in an embodiment.

FIG. 16 is a cyclic voltammetry curve for an artificial cilium actuated between −0.2 V to 1 V at a sweep rate of 1 V/s. The peak current density is about 1 mA/cm2, which means a 1-cm by 1-cm device fully covered by artificial cilia would only consume about 1 mW of power.

Figure 17:
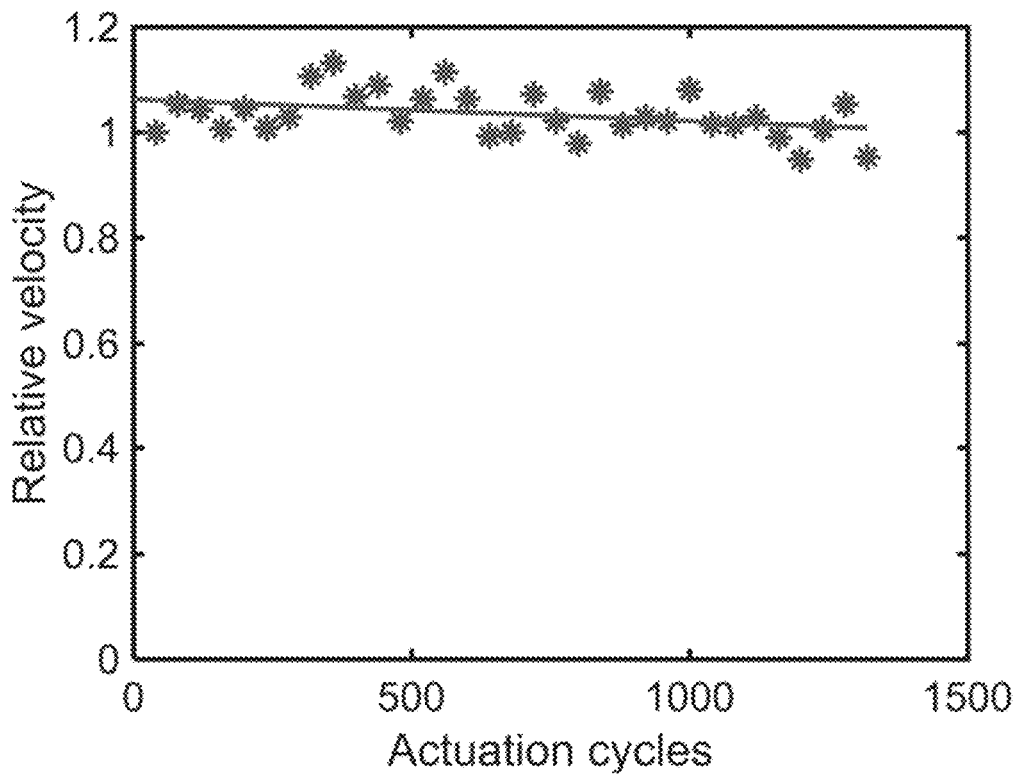
FIG. 17 is a graph illustrating durability of artificial cilia, in an embodiment.

FIG. 17 shows the durability of artificial cilia expressed as the relative velocity as a function of the number of actuation cycles. The relative velocity is scaled by the initial pumping velocity. The linear fit to the data indicates the relative velocity will decrease by 50% after 20,000 actuation cycles.

Figure 18:
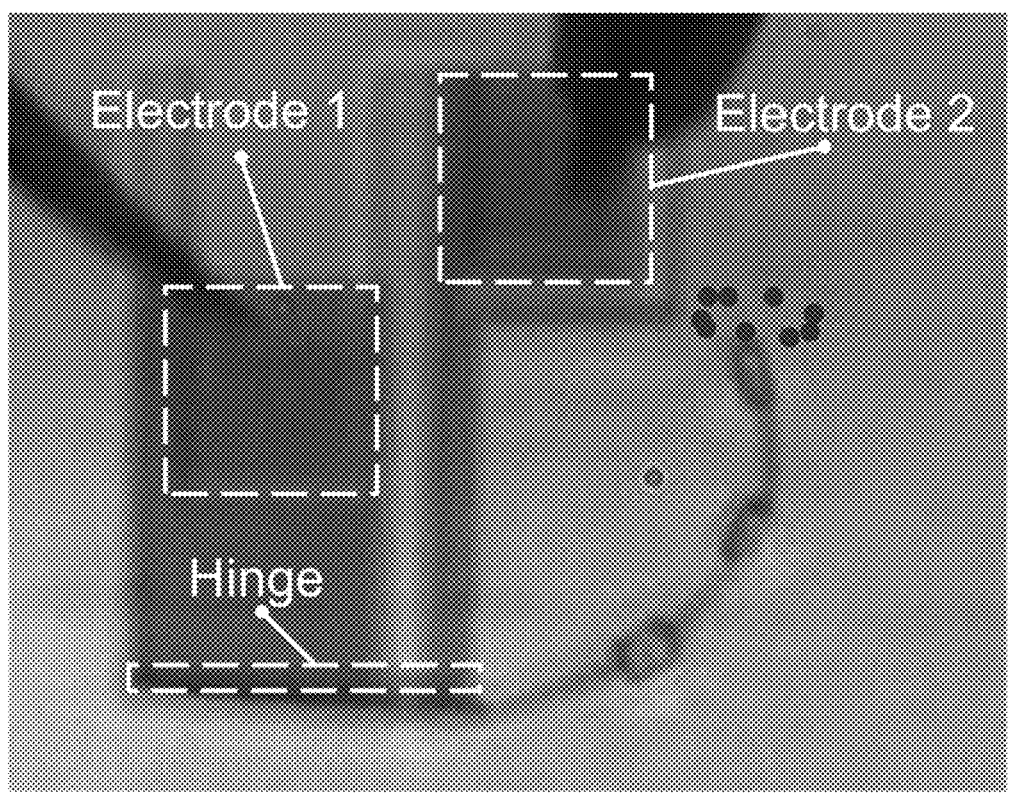
FIG. 18 shows an example of a microscopic device for measuring the trajectory of one cilium.

FIG. 18 shows an example of a microscopic device for measuring the trajectory of one cilium. At first, a fixed voltage is applied to the hinge through electrode 1 to make the hinge bend up to about 90°, then another oscillating voltage is applied through electrode 2 to actuate the cilium.

Figure 19:
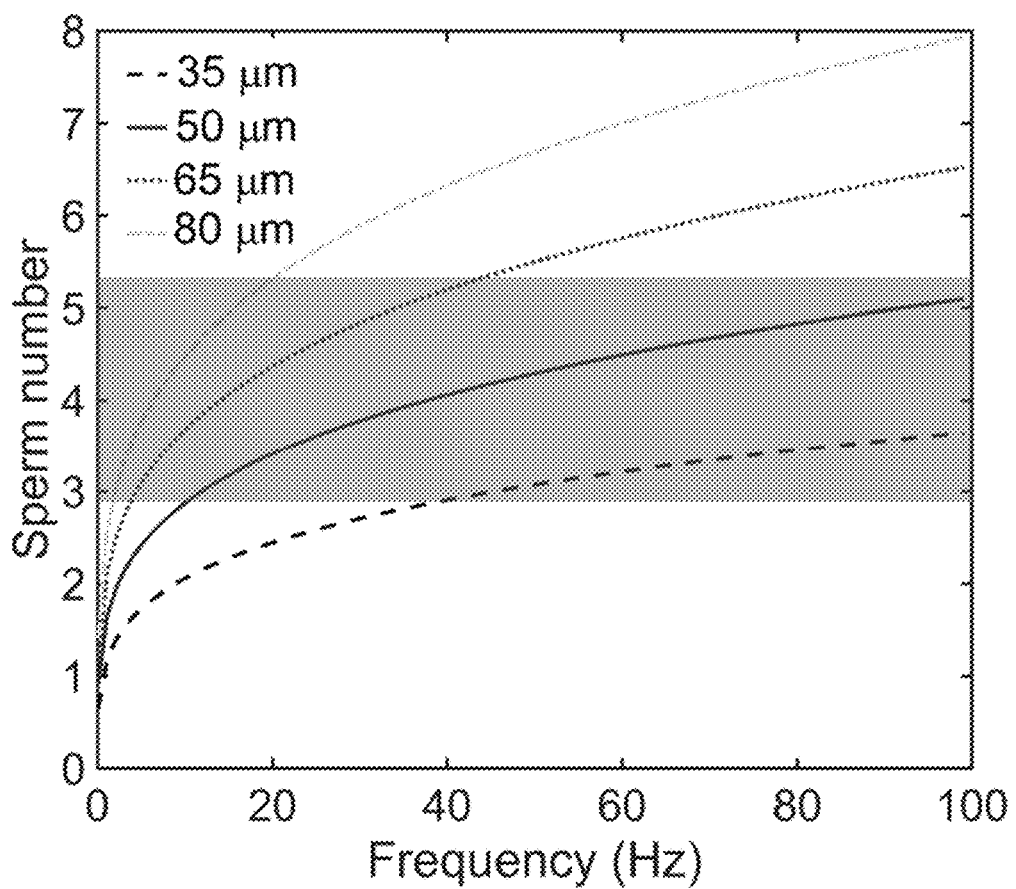
FIG. 19 is a graph illustrating Sperm number as a function of actuation frequency for cilia with different lengths.

FIG. 19 is a plot cilia Sperm number as a function of cilia actuation frequency for cilia with different lengths. The shaded region of FIG. 19 indicates the range of Sperm numbers corresponding to the maximum measured pumping velocities. The shaded region roughly indicates the maximal pumping velocities measured in the experiments.

Figure 20:
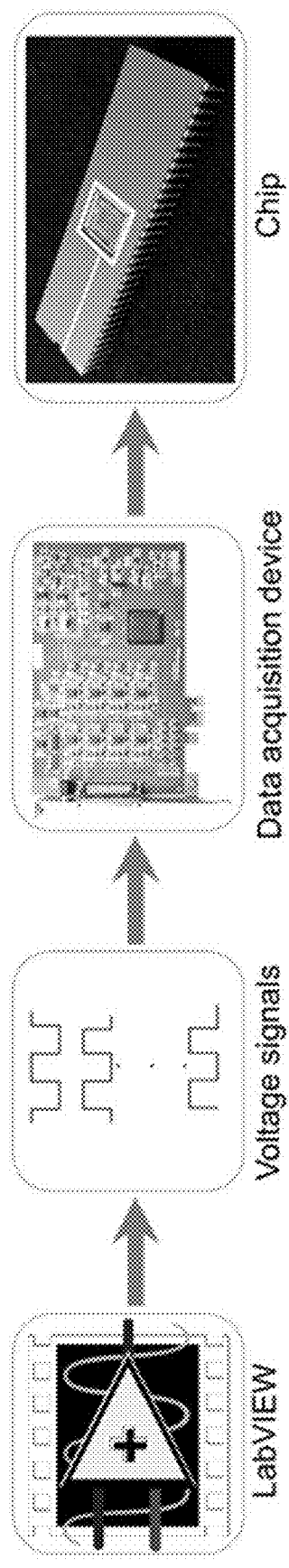
FIG. 20 shows an example of a control system for artificial cilia that produces arbitrary flow patterns.

FIG. 20 shows an example of the control system of the artificial cilia for arbitrary flow patterns. In an example, a LabVIEW program may be used to generate voltage signals and send these signals to a data acquisition device. The output of the data acquisition device is connected to the micro fluidic chip through a breadboard.

Figure 21:
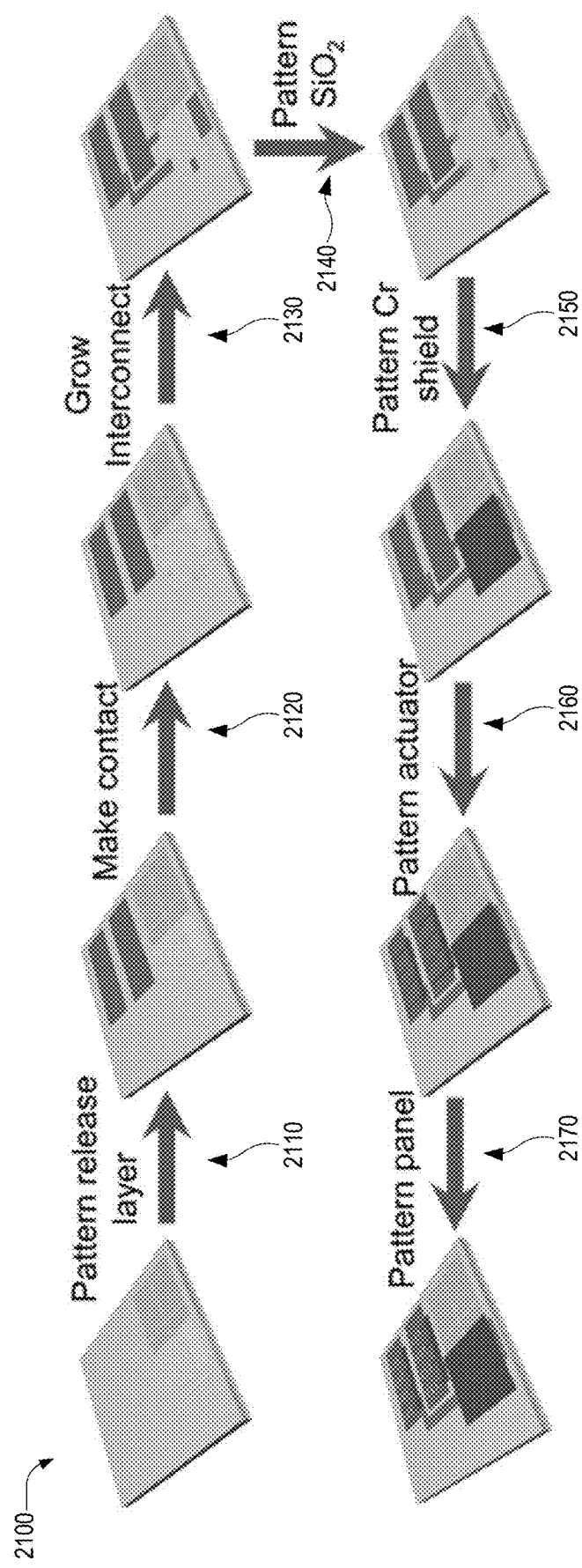
FIG. 21 shows an example a fabrication process for untethered artificial cilia integrated with a CMOS circuit.

FIG. 21 shows a process 2100 for fabricating untethered artificial cilia integrated with a CMOS circuit. Process 2100 includes steps 2110, 2120, 2130, 2140, 2150, 2160, and 2170. 180-nm thick Al and 20 nm thick $Al_2O_3$ are first grown and patterned (step 2110) as the release layer. The metal contacts are then etched and exposed (step 2120). Ti/Pt interconnects are patterned to wire the contacts (step 2130). A protective $SiO_2$ layer is grown and patterned to prevent electrical shorts and current leaks (step 2140). A Cr shielding layer is fabricated to protect the circuit from the light (step 2150). Actuator layers that consist of Ti and Pt are grown and patterned (step 2160). Finally, polymer panels are patterned on the actuator (step 2170).

Figure 22:
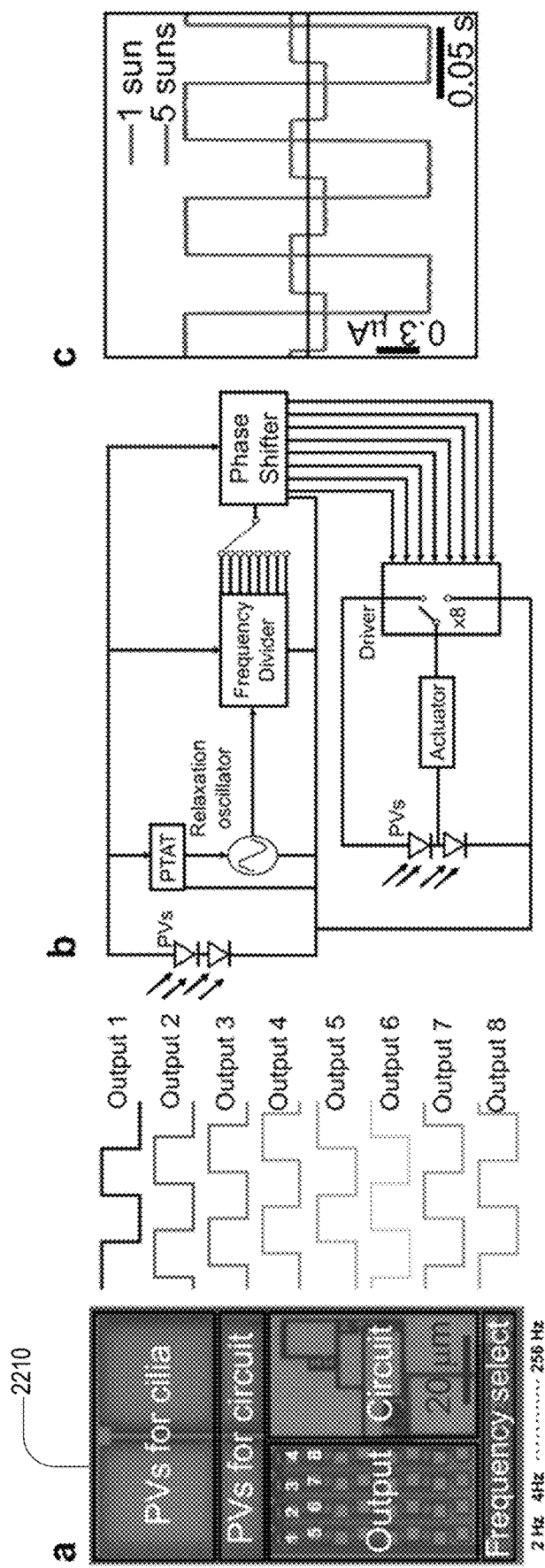
FIG. 22 shows an example a CMOS circuit, its block diagram, and example output current.

FIG. 22 shows an example CMOS circuit. Specifically, FIG. 22(a) shows an optical image of integrated circuit 2210. The circuit outputs up to eight square waves with phase delays to drive the actuators. In one example, the frequency is set by hard wiring, and the available driving frequencies range from 2 Hz to 256 Hz. FIG. 22(b) shows a block diagram of circuit 2210. FIG. 22(c) shows current versus time outputs from circuit 2210 under different light intensities. The output current ranges from 140 nA under a light intensity of 1 kW/m² equivalent to 1 sun, to about 880 nA at a light intensity of 5 suns.

Figure 23:
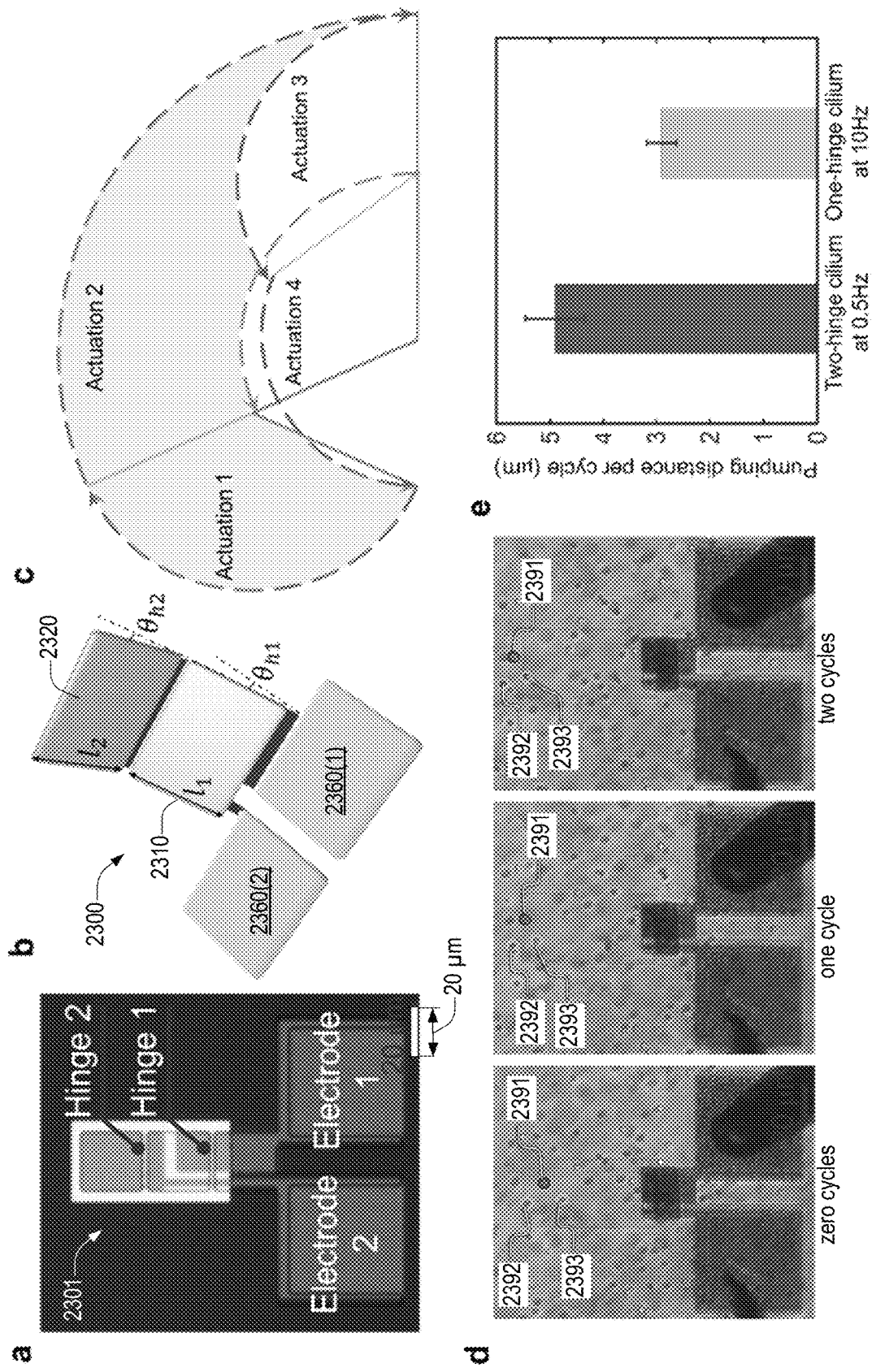
FIG. 23 shows an example of a two-hinge cilium, its actuation sequences, positions of particles moved by the cilium, and example pumping distance.

FIG. 23(a) shows an optical image of a fabricated two-hinge cilium 2301, which is an example of cilium 700, FIG. 7. FIG. 23(b) is a schematic of a two-hinge cilium 2300, of which two-hinge cilium 2301 is an example. Cilium 2300 includes a first panel 2310 and a second panel 2320, which have respective panel lengths $l_1$ and $l_2$ and respective hinge angles $\theta_{h1}$ and $\theta_{h2}$. Cilium 2300 also includes electrodes 2360(1) and 2360(2).

FIG. 23(c) shows actuation sequences that maximize a swept area (shaded region) for two-hinge cilium 2301. FIG. 23(d) shows the positions of representative particles 2391, 2392, and 2393 after zero, one and two cycles of actuations (from left to right). FIG. 23(e) shows the pumping distance per cycle for fabricated two-hinge cilium 2301 operating at 0.5 Hz and a one-hinge cilium operating at 10 Hz.

Fabrication of cilia 2300 may be similar to fabrication steps for a single-hinge cilia, e.g., as in FIG. 15. Here, however, the fabrication includes a secondary wire that passes through the first hinge and activates the second hinge.

Cilium 2300 has internal degrees of freedom, which can vastly increase its swept area and hence its pumping efficiency. Operation of cilium 2300 can be characterized by two hinge angles, $\theta_{h1}$ and $\theta_{h2}$. To maximize the pumping efficiency, a geometric calculation may be used to tune the initial and final angles for each hinge so that the swept area over one cycle, which includes four actuation steps, is maximized (FIG. 23(c)). Assuming equal length panels ($l_1=l_2$), the hinge angles at the start of the stroke that maximize the swept area are $\theta_{h1}=2.02°$, $\theta_{h2}=2.23°$. This stroke can be implemented in fabricated two-hinge cilium 2301. The mean pumping distance per cycle is about 4.9±0.5 µm (FIG. 23(d)). This result is larger compared to the pumping distance, which is about 2.9 µm per cycle (FIG. 23(e)). Moreover, two-hinge cilia 2300 may be made much larger and operated at much lower frequencies than their one hinge counterparts. These results highlight the versatility of our system for creating cilia with internal degrees of freedom.

The disclosed technology may be implemented in some embodiments to control the local chemical environment and the chemical reactions by controlling the local flows. Devices based on some embodiments may be integrated with sensors to measure the chemical, optical, and thermal state of the surrounding fluid to determine an appropriate microfluidic manipulation. The cilia based on some embodiments can be used to replace the natural cilia to help the organisms function properly. The cilia based on some embodiments can be used to drive the microrobot in aqueous solution.

The disclosed technology can be implemented in some embodiments to provide artificial cilia including the surface electrochemical actuator. In some implementations, each of the artificial cilia includes an electrochemically active layer (EAL), an electrically passive layer (EPL) and several panels. In some implementations, the exposed surface of EAL is expanded when the hydrogen or oxygen atoms adsorb onto or intercalate into the EAL materials and is shrunk when the hydrogen or oxygen atoms escape from the EAL materials. Applying periodic voltages causes the actuator to bend and flatten. This actuation is then interacted with the fluid around the cilia.

By designing the thickness of cilia at about 10 nm, width 5 µm and length 50 µm, the elastic force of cilia and the fluid force roughly in one order (the ratio of these two forces is called Sperm number) can get non-reciprocate motions to pump fluid in Low Reynold's number. The cilium can either be actuated using one actuation with Sperm number of order 1 or using multiply actuations with Sperm number smaller than 1 to enable transport at low frequency (see FIG. 23). Cross panels can be used to stabilize bending.

Figure 24:
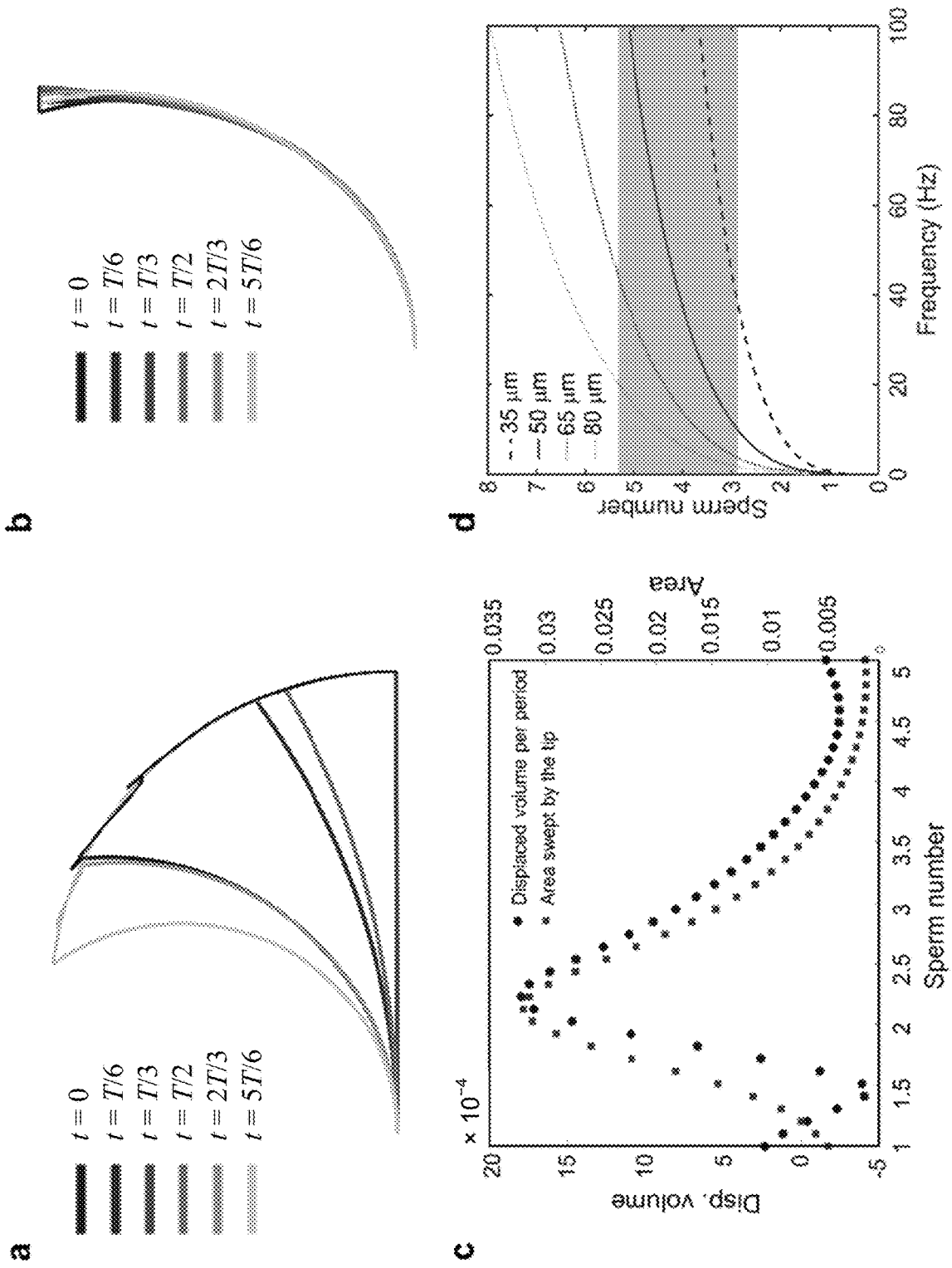
FIG. 24 shows simulated and measured pumping efficiency of an embodiment of an artificial cilium.

FIG. 24 shows pumping efficiency in simulation and experiment. (a) A cilium beating at around 1 Hz, corresponding to a Sperm number of 1. At these low Sperm numbers, the viscous force is not large enough to break the actuation symmetry. (b) A cilium beating at around 230 Hz, corresponding to a Sperm number of 7. At these high Sperm numbers viscous drag is too large, diminishing the motion of the cilia. (c) The relationship between swept area, displaced volume, and Sperm number. Displaced volume per period and the swept area as a function the Sperm number. Results are obtained by numerical simulations of the single cilium model. The area is defined as the ratio between the area covered by the cilium tip and the square of the length of the cilium. This range of Sperm numbers reflects the conditions under which the area swept by a cilium is largest, and is consistent with classical work on artificial microswimmers and biological cilia. (d) The relationship between Sperm number and the actuation frequency for cilia with different lengths. The blue shaded region roughly indicates the maximal pumping velocities measured in the experiments.

In some implementations, the fluid velocity can be experimentally shown and numerically validated to scale with the "swept area." To address this in some embodiments of the disclosed technology, additional numerical computations can be performed based on the theoretical model of a single cilium. FIG. 24(c) shows a plot for the total fluid volume displaced per period of actuation (i.e., the integrated fluid flux, in blue) and the "swept area" (in red) as a function of the dimensionless Sperm number (essentially, varying the frequency of actuation). FIG. 24(c) shows qualitative agreement between the two curves, verifying that the velocity scale does indeed scale with the swept area in some embodiments of the disclosed technology.

Figure 25:
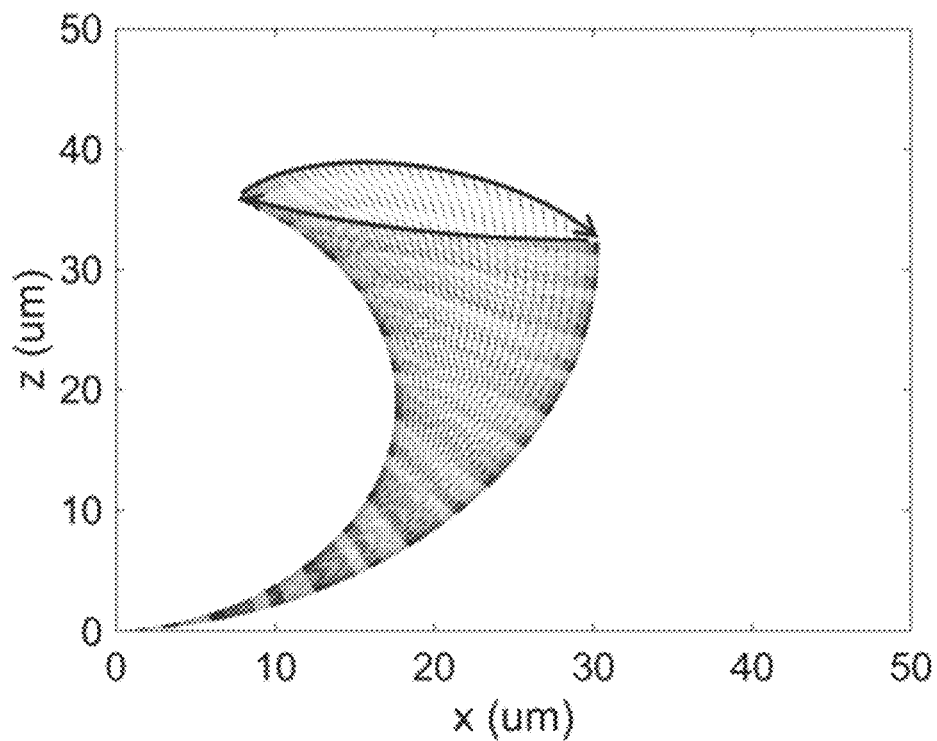
FIG. 25 shows the symmetry-breaking of an example cilium.

FIG. 25 shows an illustrative representation of the symmetry-breaking of an example cilium. In this representation, the example cilium comprises a fixed proximal end at the example origin (0, 0) and a distal end (i.e., the tip of the cilium) that is free. Responsive to an example driving function, locations of the cilium tip over a full stroke of an example driving function (e.g., applied voltage at 40 Hz), such as is shown by way of example in FIG. 4, sweep out an elliptical trajectory indicating non-reciprocal motion resulting from interplay between viscous forces and the elasticity of the cilium. Forced chemical reactions induce internal elastic stress and relaxation of the elastic stresses starts from the distal end and propagates toward the proximal end on a timescale controlled by the viscous forces (e.g., the elastohydrodynamic timescale). In at least some examples of the present concepts, the period of the driving voltage is set to be comparable with the elastohydrodynamic timescale of the cilium or cilia resulting in a continuous lag between the distal end (tip or free end) of the cilium or cilia and the proximal end (root or fixed end) of the cilium or cilia, which gives rise to non-reciprocal motion.

Figure 26:
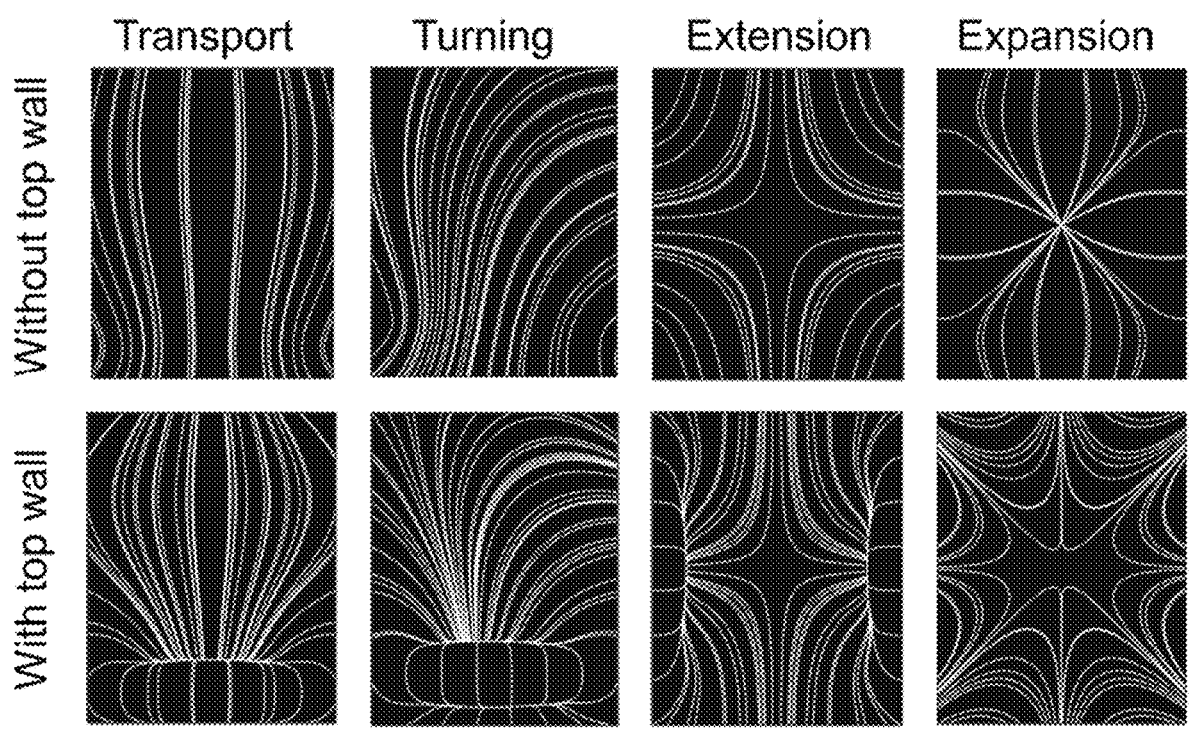
FIG. 26 shows a comparison of the streamlines for various cilia activation patterns open channels without a top wall and closed channels with a top wall included.

FIG. 26 shows comparison of the streamlines for various cilia activation patterns for open channels without a top wall and closed channels with a top wall included. All the figures are obtained through numerical simulations. The qualitative features of the streamlines are preserved when the top wall is added. The parts of the streamlines that deviate from the single wall case the most are located exactly where the regularized singularities are located, and therefore where the simulation error is largest. The biggest change occurs for the expansion flows, which are inherently 3D. These simulation results suggest thus that the tessellation idea will work in a channel geometry as well.

As shown in FIG. 26, similar patterns are generated when an additional upper boundary is included. The disclosed technology can also be implemented in some embodiments to determine whether such elementary flows can be generated when there is an additional boundary parallel to the substrate. The flow due to a point force can be approximated in this case. The leading order of the flow, averaged over the wall-to-wall distance, is parallel to the walls and has the same streamline structure for any value of the channel height. However, this leading order flow is singular near the horizontal locations of the active cilia, so we regularize the singularities by an algebraic blob of size 0.45 cilia lengths.

The experiments discussed herein may be performed in neutral PBS solution, which is compatible with biological environments. Since the redox reaction of Pt only requires a conductive aqueous solution with trace electrolyte ($Na^+$, $K^+$, $Mg^{2+}$, etc.), artificial cilia implemented based on some embodiments of the disclosed technology may be operated in environments ideal for biological/biomedical applications. There is a pH dependence to the electrochemical operation of the cilia, but it is slight. According to the Nernst equation, the voltage driving the electrochemical reaction changes by about 59 mV per pH unit at room temperature. As such, this actuator work over a broad range of pH from acidic to basic solutions. In one example, the Pt/Ti micro-actuator works in 0.5M sulfuric acid (pH=0.3) and 0.25M sodium hydroxide (pH=13.4).

In some implementations, the deformation of artificial cilia implemented based on some embodiments of the disclosed technology is not sensitive to the oxidation of the Pt layer in the fabrication process. In some implementations, the cilia are oxidized so that they initially lay flat and are less susceptible to damage during the various fluid transfer processes. Once the cilia are operated, the oxidized layer reduces and re-oxidizes based on the applied voltage. Overall, the fabrication process based on some embodiments of the disclosed technology is robust consistently yielding over 95% operational cilia per fabrication run. To balance the prestress in Pt/Ti layers, the top surface of Pt layer can be oxidized by 1-min oxygen plasma. This step can control the shape of the cilia upon release so that they do not get damaged during the various fluid exchange processes.

In some implementations, natural cilia are characterized by a large, enclosed area that the cilium tip makes during a full stroke. This swept area is directly linked to the fluid driving performance of the cilia at low Reynolds numbers. The limited size of the presented swept area is a direct consequence of using the viscous forces to break symmetry, a $4^{th}$-order effect. For natural cilia and recent magnetic and fluidic cilia, symmetry breaking is present in the actuator itself and does not rely on fluidic interactions.

In some embodiments, the cilia can be designed to have internal degrees of freedom. While more complicated, such cilia can break time reversal symmetry without the need for elastic deformations due to hydrodynamic forces.

Theory and Simulations

Model of a single cilium. To elucidate the physical mechanism behind the motion of the cilia, we develop a simple theoretical model that captures all the important dynamical features that are experimentally observed. We model a single artificial cilium as a slender, inextensible elastic rod with a centerline x(s, t), at time t, parameterized by its arc-length s. In the experiments, the motion is driven by expansion/contraction of one side of the cilium caused by chemical reactions due to an applied oscillating electrical potential. We model this forcing as a periodic variation of the natural curvature of the centerline and assume it is uniform along its length.

$$\kappa_0(t) = K + A \sin \omega t, \quad (1)$$

where A and K are constants and w is the actuation (angular) frequency.

The rest of the model is based on a standard approach for microsized slender, elastic filaments immersed in a viscous fluid, at low Reynolds number. The elastic forces are computed using a classical Kirchhoff rod model (linear elasticity) with prescribed natural curvature while the hydrodynamic forces are based on the standard resistive force theory of slender filaments that assumes that the drag force density $f_h(s)$ is local and anisotropic and can be found as $$f_h(s) = -(\xi_\| tt + \xi_\perp nn) \cdot \frac{\partial x}{\partial t}, \quad (2)$$

where n and t are a local unit normal and a tangent to the centreline while $\xi_\perp = 2\xi_\|$ are the drag coefficients in the said directions.

For the boundary conditions, we assume that the rod is clamped at one end (s=0) and there is no force or torque applied at the other (s=L). For simplicity, we non-dimensionalize the governing equations by scaling length by the length of a cilium L, time by the elasto-hydrodynamic timescale $\tau=\xi_\perp L^4/B$, where B is the elastic bending modulus of the effective cross-section that we assume is constant in time and uniform along the length. Also, as we assume the shape remains two-dimensional, it is most convenient to use the tangential angle θ(s, t), which is the angle between a local tangent to the center-line and the clamping direction at the fixed end.

Finally, the model is then described by the following set of equations $$\theta_t = -\theta_{ssss} - 3\Lambda_s \theta_s + \left(-\Lambda + 2\kappa_0 \theta_s + 9\theta_s^2\right)\theta_{ss}, \quad (3)$$

$$\Lambda_{ss} - \frac{1}{2}\theta_s^2 \Lambda = 3\theta_{ss}^2 + \left(2\kappa_0 + \frac{7}{2}\theta_s\right)\theta_{sss} + \frac{1}{2}(\kappa_0 - \theta_s)\theta_s^3 \quad (4)$$

with boundary conditions $$\theta(0, t) = 0; \theta_s(1, t) = \kappa_0(t); \theta_{ss}(1, t) = 0; \Lambda(1, t) = 0, \quad (5)$$

$$\theta_{sss}(0, t) + \theta_s(0, t)[\Lambda(0, t) + (\kappa_0 - \theta_s)\theta_s] = 0, \quad (6)$$

$$\Lambda_s(0, t) - (2\kappa_0 + 3\theta_s)\theta_{ss} = 0, \quad (7)$$

where Λ(s, t) is a Lagrange multiplier that ensures the inextensibility of the centerline and letters in subscript denote a partial derivative with respect to the variable written in the subscript.

The governing equations (Eqs. 3 and 4) represent the local balance between the viscous drag and the internal elastic forces, algebraically manipulated to be most suitable for numerical simulations. The boundary conditions shown in Eq. 5 are those imposed by the assumptions that the root (s=0) is clamped in a fixed direction and the tip (s=1) is free of any external forces and moments and thus, as we are in the inertialess limit, free of any internal forces and moments. The remaining boundary conditions (Eqs. 6 and 7) represent the vanishing elastic force density at the root. The elastic force vanishes because it is balanced by the viscous drag which vanishes since the root is not moving.

Besides the initial shape of the centerline and the dimensionless mean and amplitude of the natural curvature (K and A in Eq. 1), the evolution of the model centerline depends on the dimensionless Sperm number $Sp=(\omega\tau)^{1/4}=L(\omega\xi_\perp B^{-1})^{1/4}$ that was mentioned above. In terms of the equations, the Sperm number comes in through the natural curvature forcing as its dimensionless frequency.

The equations are evolved in time by a backward time-stepping scheme as described in Quennouz, et al. (doi: 10.1017/jfm.2015.115). Results of an example simulation are shown in FIGS. 24(a) and 24(b). The relationship between pumping efficiency and Sperm number is shown in FIG. 24(c).

In some implementations, the coupling may decrease with cilia spacing. For example, the coupling may decrease as the spacing goes to about 5 cilia lengths. In some embodiments of the disclosed technology, the spacing is about 1.4 cilia lengths, creating even more coupling. Moreover, the results on metachronal pumping demonstrate that there is indeed a significant effect due to coupling between cilia in different arrays. Given a separation of about 1.4 cilia lengths between the arrays, significant coupling between the induced flows is expected. In one example, pumping is optimal when adjacent cilia arrays have a phase delay of about π/2 (see FIG. 14).

The cilia implemented based on some embodiments of the disclosed technology can exhibit non-reciprocal motions. When arranged in specific layouts (e.g., metasurfaces) and actuated in a particular sequence and/or in spatial patterns, various controlled (e.g., programmable) microfluidic flow patterns can be generated. In some implementations, the cilia and other CMOS electronics can be incorporated into a single device.

Some embodiments of the disclosed technology can be applied to a wide variety of applications that utilize complex surface driven manipulations. In some implementations, cilia metasurfaces may enable numerous fluidic applications in lightweight devices under simple exposure to the sun.

In some implementations, the EAL may include, but not limited to, platinum, ruthenium, rhodium, palladium, osmium, iridium, gold, and silver. In some implementations, The EPL may include, but not limited to, inorganic materials (titanium, $TiO_2$, $SiO_2$, $SiN_x$, $HfO_2$, etc.), organic materials (polymers, gels, biomaterials, etc.) or other electrochemically inert materials. In some implementations, the panels may include, but not limited to, inorganic materials (titanium, $TiO_2$, $SiO_2$, $SiN_x$, $HfO_2$, etc.), organic materials (polymers, gels, biomaterials, etc.) or other electrochemically inert materials.

The disclosed technology can be implemented in some embodiments to provide an integrated microfluid chip with programmable flow patterns. In some implementations, arrays of cilia are used to make a matrix and selectively actuate the desired arrays to get the desired flow patterns, the flow patterns can be changed if needed. The arrays are patterns parallelly and perpendicularly oriented. By wiring out each array and connecting it to chip carrier, a computer can be used to send voltage signals to the cilia to get flow patterns. In some implementations, the number of cilia in one array can be changed. For example, 8 cilia can be used, and it can also be from 1 to more than 1000 cilia. In some implementations, the dimension of the cilia arrays can be changed, currently, the chip has 64 independently controlled cilia arrays, this number can be changed to other numbers from 1 to more than 1000. In some implementations, the control method can be changed. In one example, voltage signals are generated (e.g., using LabView or MATLAB) and sent to a data acquisition device and the data acquisition device is connected to the chip carrier to do actuation. Instead of data acquisition device, a micro controller unit may be used.

The disclosed technology can be implemented in some embodiments to provide a wirelessly controllable artificial cilia using an onboard CMOS circuit. In this configuration, the artificial cilia can be controlled using a light-powered CMOS circuit, which includes photovoltaics and a timing circuit. In some implementations, the artificial cilia can be integrated with this circuit. After fabrication, the artificial cilia can be actuated by shining light on the circuit. Distinct from the integrated microfluidic chip in the previous case, this is a completely untethered system that can get several oscillating voltage signals with phase delays. By making more complex circuit and integrating more parts such as sensors, the artificial cilia will be able to make its own decision of actuation based on the environment. In some implementations, the output frequency can be changed from 0.01 Hz to 1000 Hz, it allows us to change the pumping velocity. In some implementations, the output current of the photovoltaics may vary from 1 nA to 1 A based on the applications. In some implementations, the number and the pattern of cilia can be changed based on the design. In some implementations, the circuit design can be changed. For examples, we have 8 phased in the current circuit, we can design more phases (e.g., 1000) if needed. Also, in the future, we can integrate sensors on the circuit to let the cilia change the actuation mode based on the environment.

The artificial cilia implemented based on some embodiments of the disclosed technology have advantages over traditional microfluidic devices in many aspects. The traditional microfluidic devices need external bulky pumps to get flow while the device implemented based on some embodiments of the disclosed technology is a fully integrated microfluidic system which does not need external pumps. The traditional microfluidic devices cannot change the flow pattern once fabricated, the device implemented based on some embodiments of the disclosed technology can generate programmable/arbitrary flow patterns as wish. The device implemented based on some embodiments of the disclosed technology can achieve wirelessly control of the cilia in the environment where the tethered control is not possible, while the traditional microfluidic devices need setups attached to the devices.

In some implementations of the disclosed technology, an electrochemically actuated artificial cilia can be formed by thin film fabrication processes and can exhibit, by applying voltage, non-reciprocal motions. When arranged in specific layouts (e.g., metasurfaces) and actuated in a particular sequence and/or in spatial patterns, various controlled (e.g., programmable) microfluidic flow patterns can be generated. The artificial cilia work at low voltage (<1 V) which makes them in principle suitable for aqueous environments. Moreover, when integrated with a light-powered CMOS clock circuits, the artificial can be driven wirelessly.

Some example artificial cilia, whose actuation is based on pressure, light, electrostatic, and magnetic interactions, may have severe limitations. For example, cilia that are pressure driven or optically driven can be locally actuated, but it is difficult to implement such cilia at the microscale. However, the disclosed technology can be implemented in some embodiments to manipulate fluids at a microscale using artificial cilia platforms.

In some implementations, the cilia are comprised of surface electrochemical actuators (SEAs). The cilia can exhibit non-reciprocal motions, be arranged in metasurfaces and actuated in controlled spatial patterns and integrated with CMOS electronics. In one example, the untethered cilia implemented based on some embodiments of the disclosed technology are powered by photovoltaics and can incorporate CMOS electronics. Different from another example implementation where the user has to switch between shining a laser on the front or back photovoltaic to activate the robot legs, the cilia implemented based on some embodiments of the disclosed technology can be activated by simply exposing the entire chip to ambient light. In some implementations, photovoltaics in conjunction with a user guided laser can be used to control actuation.

In some implementations, each cilia array only provides unidirectional pumping, and thus two arrays, which provide bidirectional pumping, can be used to generate arbitrary flow patterns. In one example, two arrays on each side can be implemented to enable bidirectional pumping.

FIG. 27 is a plan view, and FIGS. 28 and 29 are respective cross-sectional views, of an artificial cilium 2700. Examples of artificial cilium 2700 include artificial cilia 100, 600, 700, and 2300. FIGS. 27-29 are best viewed together in the following description. Figures herein depict orthogonal axes A1, A2, and A3, also referred to as the x axis, y axis, and z axis, respectively. Herein, the x-y plane is formed by orthogonal axes A1 and A2, and planes parallel to the x-y plane are referred to as transverse planes. Unless otherwise specified, thicknesses of objects herein refer to the object's extent along axis A3. Also, herein, a horizontal plane is parallel to the x-y plane, a width refers to an object's extent along the x or y axis respectively, and a vertical direction is along the z axis.

Artificial cilium 2700 includes actuators 2710(1) and 2710(2), a wire 2722, proximal panel 2740(1), middle panel 2740(2), and distal panel 2740(3). Actuators 2710(1,2) include respective passive layers 2710(1, 2) and respective active layers 2720(1,2). Passive layers 2710(1, 2) are on respective active layers 2720(1,2). Wire 2722 is (i) electrically connected to actuator 2710(2) and (ii) located on each of panel 2740(1) and panel 2740(3).

Middle panel 2740(2) is between proximal panel 2740(1) and distal panel 2740(3), e.g., when panels 2740 are coplanar. When panels 2740(1) and 2740(3) are coplanar, panels 2740(1) and 2740(3) are separated by a distance 2748. Middle panel 2740(2) has a length 2746, which is less than distance 2748, such that (i) panels 2740(1) and 2740(2) are separated by gap width 2742 and (ii) panels 2740(2) and 2740(3) are separated by gap width 2744. When panels 2740(1-3) are coplanar, the sum of length 2746 and gap widths 2742 and 2744 equals distance 2748. When panels 2740(1-3) are coplanar in a horizontal plane, each of panels 2740 intersects a vertical plane that is perpendicular to the horizontal plane. Each of length 2746, distance 2748, and widths 2742 and 2744 is along axis A2.

Actuator 2710(1) is on each of, and spans a proximal gap between, proximal panel 2740(1) and middle panel 2740(2). Actuator 2710(2) is on each of, and spans a distal gap between, middle panel 2740(2) and distal panel 2740(3). The proximal gap and the distal gap have gap widths equal to gap widths 2742 and 2744, respectively. Gap widths 2742 and 2744 may be between 0.1 micrometer and 10 micrometers.

FIGS. 27-29 denote a hinge 2701 between panels 2740(1) and 2740(2), and a hinge 2702 between panels 2740(2) and 2740(3). Actuators 2710(1) and 2710(2) enable artificial cilium 2700 to bend at each of hinges 2701 and 2702. Passive layer 2710(1) and active layer 2720(1) may have different respective surface stresses, which results in a non-zero resting bend angle of hinge 2701, such that despite an absence of oxidation or reduction at active layer 2720(1), panels 2740(1) and 2740(2) are not coplanar. Similarly, passive layer 2710(2) and active layer 2720(2) may have different respective surface stresses, which results in a non-zero resting bend angle of hinge 2701, such that despite an absence of oxidation or reduction at active layer 2720(2), panels 2740(2) and 2740(3) are not coplanar. FIGS. 28 and 29 denote bend directions 2703(1) and 2703(2) attainable by hinges 2701 and 2702, respectively.

Each of passive layers 2710 may include an inorganic material or a combination of inorganic materials. Examples of such materials include titanium, titanium dioxide, silicon dioxide, a nitride of silicon, and hafnium dioxide. Each of active layers 2710 may include at least one of a metal, a transition metal, or a combination thereof. The metal may be one of gold, silver, and platinum, or a combination thereof. The transition layer may be one of ruthenium, rhodium, palladium, osmium, iridium, or a combination thereof.

FIGS. 28 and 29 illustrate passive layers 2710 as between panels 2740 and active layers 2720. In such embodiments, passive layer 2710(1) includes two regions respectively located (i) between the first active layer 2720(1) and proximal panel 2740(1), and (ii) between active layer 2720(1) and middle panel 2740(2). Also in such embodiments, passive layer 2710(2) includes three regions located between active layer 2720(1) and (i) panel 2740(1), (ii) panel 2740(2), and (iii) panel 2740(3), respectively.

In embodiments, actuators 2710 may be oriented such that active layers 2720 are between panels 2740 and passive layers 2710. In such embodiments, active layer 2720(1) includes two regions respectively located (i) between passive layer 2710(1) and panel 2740(1), and (ii) between passive layer 2710(1) and panel 2740(2). Also in such embodiments, active layer 2720(2) includes three regions located between passive layer 2710(1) and (i) panel 2740(1), (ii) panel 2740(2), and (iii) panel 2740(3), respectively.

Wire 2722 and active layer 2720(2) may be monolithic. For example, wire 2722 and active layer 2720(2) may be formed of the same material and be integrally formed.

Wire 2722, actuator 2710(1), and actuator 2710(2) have respective widths 2723, 2714, and 2716 along axis A1. Width 2723 may less than one-tenth of width 2716, and width 2714 may be at least four-fifths that of width 2716.

Artificial cilium 2700 has cilium width 2706 and a cilium length 2707. Cilium width 2706 may equal the maximum of the following widths: width 2716 and respective widths of panels 2740. Each panel 2740 may have an equal width along axis A1. Width 2716 may be less than width 2706, e.g., when cilium width 2716 equals a width of panel 2740(3). Length 2707 may equal the sum of the lengths of panels 2740 plus widths 2742 and 2744, as shown in FIG. 27.

Along axis A3, actuators 2710(1) and 2710(2) have respective thicknesses 2713(1) and 2713(2), which may exceed five nanometers to ensure uniformity of thicknesses 2713. Thicknesses 2713 may be less than fifteen nanometers, such that desired bending radii of curvature is achievable. Active layers 2720(1,2) have respective thicknesses 2723(1,2). Since oxidation of active layers 2720 drives bending of actuators 2710, and an approximate oxidation depth is one nanometers, each of thicknesses 2723 may be at least one nanometer. Panels 2740(1-3) have respective thicknesses 2743(1-3), each of which may be 0.3 micrometers and 0.6 micrometers. FIG. 28 denotes a horizontal distance 2717 between actuator 2710(1) and wire 2722, and a vertical distance 2718 between actuator 2710(1) and actuator 2710(2). Each of distances 2717 and 2718 may exceed five micrometers for ease of fabrication, and yet may be less than five micrometers, e.g., less than one micrometer.

In some implementations, for Sperm number≈1 for example, spatial dimensions of cilia may be changed in a reasonable range: cilium width 2706 may be between 50 nm and 1 mm, and the cilium length 2707 may be between 100 nm and 10 mm. In one example, the thickness of active layers 2720 may be between 1 nm and 100 μm. In another example, the thickness of passive layers 2710 may be between 0.1 nm and 100 μm. In another example, panel thickness 2743 may be between 1 nm and 1 mm. In another example, the working frequency may be between 0.1 Hz and 1000 Hz.

In some implementations, for Sperm number less than one, the dimension of cilia can be changed in a reasonable range, for example, cilium width 2706 be between 50 nm and 1 mm, the cilium length 2707 may be between 100 nm and 10 mm. In an example, the thickness of active layers 2720 may be between 1 nm and 100 μm. In another example, the thickness of passive layers 2710 may be between 0.1 nm and 100 μm. In another example, panel thickness 2743 may be between 100 nm and 1 mm. In another example, the working frequency may be between 0.01 Hz to 1000 Hz. In some implementations, the control voltage may be between −50 V and 50 V based on the used EAL materials. In some implementations, the working medium may be, or include, aqueous solution, organic solvent, ionic liquid, etc., or any combination thereof. In some implementations, the number of panels may increase with increasing cilia length. In embodiments, the number of panels is between two and ten. The number of panels may exceed ten.

Artificial cilium 2700 may include a substrate 2792, which includes electrodes 2761 and 2762 thereon. Electrodes 2761 and 2762 are electrically connected to active layer 2720(1) and active layer 2720(2), respectively.

Figure 30:
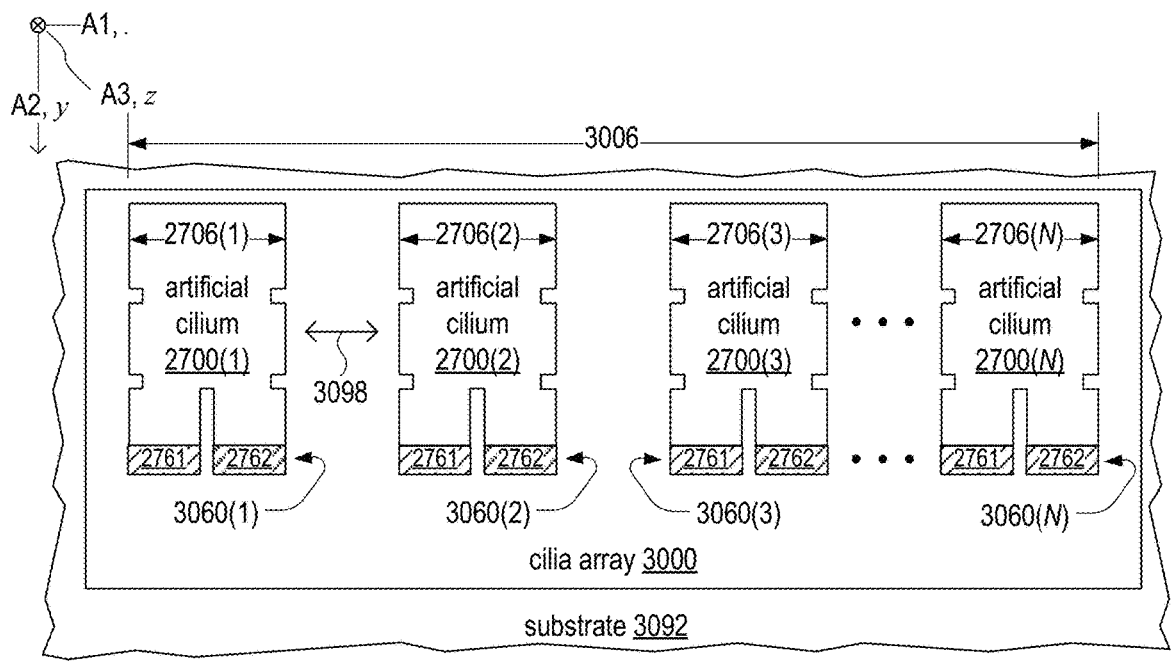
FIG. 30 is a schematic of a cilia array that includes artificial cilia of FIGS. 27-29, in embodiments.

FIG. 30 is a schematic of a cilia array 3000, which includes a N electrode pairs 3060(1-N) and N artificial cilia 2700(1-N) arranged as a linear array along an array-axis 3098. That is, when all cilia 2700(1-N) are flat and coplanar, respective centers of artificial cilia 2700(1-N) are colinear along a line parallel to array-axis 3098. In the example of FIG. 30, axis 3098 is parallel to axis A1. Integer N may be greater than two. For example, in cilia arrays 600A and 700A, N=8. Each of cilia arrays 600A and 700A is an example of cilia array 3000.

Each electrode pair 3060 includes one electrode 2761 and one electrode 2762, and is on a substrate 3092, which is an example of substrate 2792, FIG. 27. Electrode pairs 3060 may be collinear on substrate 3092, and hence be a linear array of electrode pairs, which may be parallel to the array formed by artificial cilia 2700(1-N). Cilia array 3000 may also include substrate 3092.

Each artificial cilium 2700(k) is electrically connected to a respective electrode pair 3060(k), where index k is a positive integer less than or equal to N. Specifically, active layers 2720(1) and 2720(2) of artificial cilium 2700(k) are electrically connected to respective electrodes 2761 and 2762 of electrode pair 3060(k).

Cilia array 3000 has a length 3006, herein also $L_A$. Each artificial cilium 2700(k) has a respective width 2706 (k). Denoting the sum of N widths 2706 (k) at $W_{tot}$ a fill factor $W_{tot}/L_A$ of cilia array 3000 may be between 0.1 and one. In embodiments, the fill factor is between ⅓ and ⅔. When the fill factor is less than 0.1, cilia array 3000 may not generate uniform flow.

Figure 31:
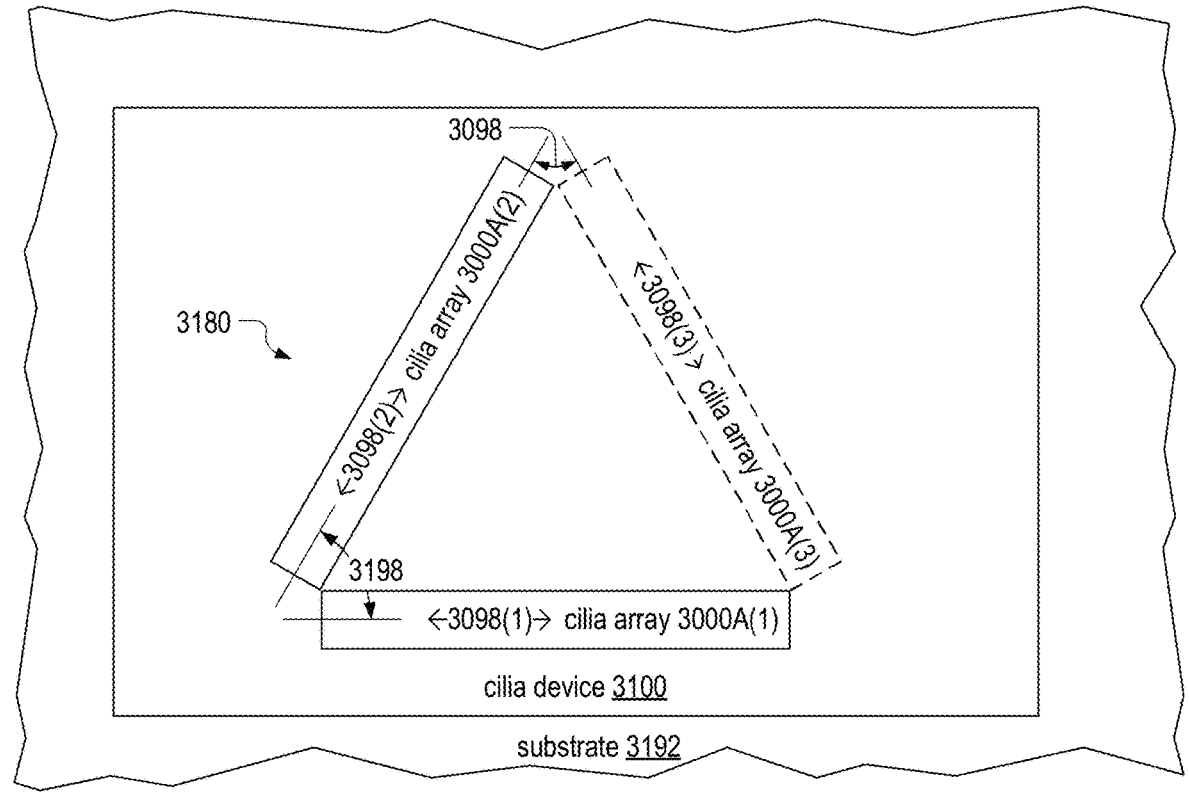
FIG. 31 is a schematic of a cilia device, which includes two cilia arrays of FIG. 30, in embodiments.

FIG. 31 is a schematic of a cilia device 3100, which includes two cilia arrays 3000, denoted as 3000(1) and 3000(2), on a substrate 3192. Cilia device may also include substrate 3192. Cilia arrays 3000(1,2) have respective axes 3098(1) and 3098(2), which are oriented in different respective directions. FIG. 30 denotes an angle 3198 between axes 3098(1) and 3098(2). Example values of angle 3198 include 60°, 90°, and 120°, which correspond to when cilia arrays 3000 are respective sides of a triangular cilia unit, a rectangular cilia unit (e.g., cilia unit 780), and a hexagonal cilia unit. Cilia arrays 3000(1,2) are part of a cilia unit 3180, which may be tiled on substrate 3192 to yield a cilia metasurface, such as cilia metasurface 780A.

Cilia unit 3180 may include one or more additional cilia arrays 3000, for example, cilia array 3000(3), which is oriented at angle 3198 with respect to cilia array 3000A(2). Cilia unit 3180 may include a total of three, four, or six cilia arrays 3000, in which case angle 3198 equals 60°, 90°, and 120°, respectively, and cilia unit 3180 is triangular, rectangular, and hexagonal, respectively.

Combinations of Features

Features described above as well as those claimed below may be combined in various ways without departing from the scope hereof. The following enumerated examples illustrate some possible, non-limiting combinations:

(A1) An artificial cilium device includes: a substrate; and a voltage-actuated cilia-shaped structure attached at a proximal end to the substrate, the voltage-actuated cilia-shaped structure has a first layer of a first material and a second layer of a second material, the second layer of the second material includes an exposed surface that causes the cilia-shaped structure to, in a working medium, (a) change shape from a first shape to a second shape responsive to application of a first voltage and (b) change shape from the second shape to the first shape responsive to application of a second voltage different than the first voltage.

(A2) The embodiment (A1) further includes a plurality of voltage-actuated cilia-shaped structures includes the first layer of the first material and the second layer of the second material, the second layer of the second material includes an exposed surface configured to cause the cilia-shaped structure to, in a working medium, change shape from the first shape to the second shape responsive to application of the first voltage and configured to change shape from the second shape to the first shape responsive to application of the second voltage.

(A3) Either of embodiments (A1) or (A2) further include a controller to regulate application of voltage to the plurality of voltage-actuated cilia-shaped structures.

(A4) In any of embodiments (A1)-(A3), the plurality of voltage-actuated cilia-shaped structures are individually addressable by the controller.

(A5) In any of embodiments (A1)-(A4), the plurality of voltage-actuated cilia-shaped structures are arranged in an array.

(A6) In any of embodiments (A1)-(A5), the plurality of voltage-actuated cilia-shaped structures are arranged to influence surface flow of an aqueous media along the substrate responsive to selective application of the first voltage and/or the second voltage to selected ones of the plurality of voltage-actuated cilia-shaped structures and actuation of the selected ones of the plurality of voltage-actuated cilia-shaped structures to cause the selected ones of the plurality of voltage-actuated cilia-shaped structures to change shape from the first shape to the second shape and/or from the second shape to the first shape.

(A7) In any of embodiments (A1)-(A6), the first material comprises titanium and the second material comprises platinum.

(A8) In any of embodiments (A1)-(A7), the first layer of the first material is thinner than the second layer of the second material.

(B1) An artificial cilium includes a first actuator, a second actuator, a proximal panel, a middle panel, a distal panel, and wire. The first actuator includes a first passive layer on a first active layer. The second actuator includes a second passive layer on a second active layer. The middle panel is between the proximal panel and the distal panel, and has a length less than a distance between the proximal panel and the distal panel when the proximal panel and the distal panel are coplanar. The wire is (i) electrically connected to the second actuator and (ii) on each of the proximal panel and the distal panel. The first actuator is on each of, and spanning a proximal gap between, the proximal panel and the middle panel. The second actuator is on each of, spanning a distal gap between, the middle panel and the distal panel.

(B2) In embodiments of (B1), (i) the first passive layer and the first active layer have different respective surface stresses; and (ii) the second passive layer and the second active layer have different respective surface stresses.

(B3) In either of embodiments (B1) or (B2), each of the first passive layer and the second passive layer includes an inorganic material.

(B4) In any of embodiments (B1)-(B3), the inorganic material includes at least one of titanium, titanium dioxide, silicon dioxide, a nitride of silicon, and hafnium dioxide, or a combination thereof.

(B5) In any of embodiments (B1)-(B4), the first active layer and the second active layer includes at least one of a metal, a transition metal, or a combination thereof.

(B6) In any of embodiments (B1)-(B5), the metal is one of gold, silver, and platinum, or a combination thereof.

(B7) In any of embodiments (B1)-(B6), the transition metal is one of ruthenium, rhodium, palladium, osmium, iridium, or a combination thereof.

(B8) In any of embodiments (B1)-(B7), the first passive layer includes two regions respectively located (i) between the first active layer and the proximal panel, and (ii) between the first active layer and the middle panel; the second passive layer includes three regions located between the first active layer and (i) the proximal panel, (ii) the middle panel, and (iii) the distal panel, respectively.

(B9) In any of embodiments (B1)-(B8), the first active layer includes two regions respectively located (i) between the first passive layer and the proximal panel, and (ii) between the first passive layer and the middle panel; the second active layer includes three regions located between the first passive layer and (i) the proximal panel, (ii) the middle panel, and (iii) the distal panel, respectively.

(B10) In any of embodiments (B1)-(B9), the wire and the first active layer are monolithic.

(B11) In any of embodiments (B1)-(B10), when the proximal, the middle, and the distal panels are coplanar in a horizontal plane, each of the proximal, the middle, and the distal panel also intersects a vertical plane that is perpendicular to the horizontal plane.

(B12) In any of embodiments (B1)-(B11), the distance is along a length direction of the artificial cilium, and in a width direction perpendicular to the length direction, a width of the wire is at most one-tenth of a width of the second actuator.

(B13) In any of embodiments (B1)-(B12), the distance is along a length direction of the artificial cilium, and in a width direction perpendicular to the length direction, a width of the first actuator is at least four-fifths that of the second actuator.

(B14) In any of embodiments (B1)-(B13), the distance is along a length direction of the artificial cilium, each of the proximal gap and the distal gap is between 0.1 micrometer and ten micrometers.

(B15) In any of embodiments (B1)-(B14), the distance is along a length direction of the artificial cilium, each of the first actuator and the second actuator has a respective thickness, perpendicular to the length direction, between five nanometers and fifteen nanometers.

(B16) In any of embodiments (B1)-(B15), the distance is along a length direction of the artificial cilium, each of the first active layer and the second active layer has a respective thickness, perpendicular to the length direction, that is at least one nanometer.

(B17) In any of embodiments (B1)-(B16), the distance is along a length direction of the artificial cilium, each of the proximal panel, the middle panel, and the distal panel has a respective thickness, perpendicular to the length direction, between 0.3 micrometers and 0.6 micrometers.

(B18) Any of embodiments (B1)-(B17) further includes a substrate; further includes a first electrode and a second electrode on the substrate, and electrically connected to the first active layer and the second active layer, respectively.

(C1) A cilia array includes: a substrate that includes a plurality of electrode pairs thereon; and a linear array of artificial cilia of any one of embodiments (B1)-(B18). Each artificial cilium of the linear array is electrically connected to a respective electrode pair of the plurality of electrode pairs.

(C2) In embodiments of (C1), for each artificial cilium of the linear array, the first active layer and the second active layer are electrically connected to a first electrode and a second electrode, respectively, of the electrode pair of the plurality of electrode pair electrically connected thereto.

(C3) In either of embodiments (C1) or (C2), the artificial cilia of the linear array is arrayed in an array direction and has a total width $W_{tot}$ along the array direction. The linear array has a length $L_A$ along the array direction. A fill factor $W_{tot}/L_A$ of the linear array is between ⅓ and ⅔.

(C4) In any of embodiments (C1)-(C3), the plurality of electrode pairs is a one-dimensional array oriented parallel to the linear array of artificial cilia.

(C5) Any of embodiments (C1)-(C4) the linear array is oriented in a horizontal direction, and an additional linear array of artificial cilia of any one of embodiments (B1)-(B18), each electrically connected to a respective electrode pair of the plurality of electrode pairs, the additional linear array is oriented in a second direction that differs from the horizontal direction.

(C6) Any of embodiments (C1)-(C5) a third linear array of artificial cilia of any one of embodiments (B1)-(B18), each electrically connected to a respective electrode pair of the plurality of electrode pairs.

(C7) Any of embodiments (C1)-(C6) the second direction is parallel to the horizontal direction, the third linear array is oriented in a vertical direction that is perpendicular to the horizontal direction and the second direction, and a fourth linear array of artificial cilia of any one of embodiments (B1)-(B18), each electrically connected to a respective electrode pair of the plurality of electrode pairs, the fourth linear array is oriented in the vertical direction, further includes the linear array, the additional linear array, the third linear array, and the fourth linear array forming a rectangular cilia-unit on the substrate.

(C8) Any of embodiments (C1)-(C7) further includes a plurality of additional rectangular cilia-units that, with the rectangular cilia-unit, form an array of rectangular cilia-units on the substrate.

* * * * *

Compact microrobotics can be implemented based on a variety of actuating systems, including magnetic, chemical, biohybrid, and ultrasound microrobots with useful properties such as phototaxis, chemotaxis, and magnetic control of motion direction. Existing microscopic robots achieve certain simple criteria for autonomy such as onboard power and some sensing capabilities, but lack onboard control, a key metric for autonomy in small robots.

The technology disclosed in this document can be implemented to provide a microscopic robot that includes an onboard controller for controlling actuators of robot legs capable of lifting and moving the microscopic robot.

In one aspect, a microscopic robot includes a substrate, one or more legs attached to the substrate, each leg including at least one hinge and at least one actuator, a control circuit disposed on the substrate and including one or more output terminals coupled to one or more actuators of the one or more legs to control motions of the one or more legs, and a photovoltaic module disposed on the substrate and configured to convert light into electricity to supply power to the one or more legs and the control circuit.

Autonomous robots—systems where mechanical actuators are guided through a series of states by information processing units to perform a predesigned function—are revolutionizing everything from health care to transportation. Microscopic robots are poised for a similar revolution in fields from medicine to environmental remediation. A key hurdle for developing these microscopic robots is the integration of information systems, particularly electronics fabricated at commercial foundries, with microactuators. The disclosed technology can be implemented in some embodiments to provide microscopic robots controlled by onboard complementary metal oxide semiconductor (CMOS) electronics. The resulting autonomous, untethered robots are under 10 mm in size and may be 100-250 micrometers in size, are powered by light, and walk at speeds greater than 10 micrometers per second. In some embodiments, the robot or device has at least one dimension (1, 2, or 3 dimensions, length, width, and/or depth) under 5 mm, 4 mm, 2 mm, 1 mm, 900 microns, 800 microns, 700 microns, 600 microns, 500 microns, 400 microns, 300 microns, 200 microns, or 100 microns. In some embodiments, the robot or device has at least one dimension (e.g., length and/width) in a range of 50 microns-10 mm, including any subranges therein. In some embodiments, the thickness or depth of the robot or device is less than 1 mm, less than 500 microns, less than 200 mm, less than 100 microns, less than 80 microns, less than 60 mm, less than 50 microns, less than 40 microns, less than 30 mm, less than 20 mm, or less than 10 microns. Additionally, microscopic robots implemented based on some embodiments of the disclosed technology can respond to an optical command, perform complex functions, respond to their environments, and communicate with the outside world.

The technology disclosed in this patent document can be implemented to provide a microscopic robot that includes an onboard controller for controlling actuators of robot legs capable of lifting and moving the microscopic robot. In some implementations, a microscopic robot includes a substrate, one or more legs attached to the substrate, each leg including at least one hinge and at least one actuator, a control circuit disposed on the substrate and including one or more output terminals coupled to one or more actuators of the one or more legs to control motions of the one or more legs, and a photovoltaic module disposed on the substrate and configured to convert light into electricity to supply power to the one or more legs and the control circuit.

In some embodiments, the robot or device comprises a plurality of legs, wherein at least a portion or all of the legs comprise at least one actuator in a leg. In some embodiments, a leg or an actuator has a cilia structure. In some embodiments, the leg or the cilia structure has a ratio of the longest dimension to the second dimension and/or the third dimension of at least 5, 6, 7, 8, 9, 10, 20, 30, 40, 50, 60, 70, 80, 90, 100, 200, 300, 400, 500, 600, 700, 800, 900, or 1000. In some embodiments, a leg or an actuator comprises no hinge, at least one hinge, at least two hinges, or at least three hinges. a leg, cilia, or actuator comprises no paddle (or called panel or blade), at least one paddle, at least two paddles, at least three paddles, or at least four paddles. In some embodiments, a leg or an actuator comprises at least one hinge on one end of the leg, or between the first end and the second end of the leg. In some embodiments, a leg is or comprises a cilia structured actuator. In some embodiments, a leg, actuator, or cilia comprise at least a portion of the structure comprising at least two layers made of different materials. In some embodiments, a leg, actuator, or cilia comprises at least two different materials selecting from metals, metal alloys, metal oxides, or any combination thereof. In some embodiments, a leg, actuator, or cilia further comprises a coating layer in at least part of the structure, wherein the coating layer is selected from a polymer, a metal, metal alloy, metal oxide, or any combination thereof. In some embodiments, a leg, actuator, or cilia comprise at least 2, 3, 4, 5, or more segments divided by 1, 2, 3, 4, or more hinges, paddles, or panels between a first end and a second end of the leg, actuator or cilia.

In some embodiments, the movement of the robot or device is controlled by a stimulating signal or a control signal. In some embodiments, a stimulating signal is an optical signal or an electrical signal, or a combination thereof. In some embodiments, the control signal comprises a continuous signal. In other embodiments, the control signal comprises an on or off signal or both. In some embodiments, the electrical signal comprises one or more voltages (e.g., comprising a first voltage, a second voltage, and optionally a third voltage).

※ ※ ※

Autonomous robots—systems where mechanical actuators are guided through a series of states by information processing units to perform a predesigned function—are revolutionizing everything from health care to transportation. Microscopic robots are poised for a similar revolution in fields from medicine to environmental remediation. A key hurdle for developing these microscopic robots is the integration of information systems, particularly electronics fabricated at commercial foundries, with microactuators. Here, we develop such an integration process and build microscopic robots controlled by onboard complementary metal oxide semiconductor (CMOS) electronics. The resulting autonomous, untethered robots are 100-250 micrometers in size, are powered by light, and walk at speeds greater than 10 micrometers per second. Additionally, we demonstrate a microscopic robot that can respond to an optical command. This work paves the way for ubiquitous autonomous microscopic robots that perform complex functions, respond to their environments, and communicate with the outside world.

Researchers in the field of microrobotics have created an impressive variety of actuating systems, including magnetic, chemical, biohybrid, and ultrasound microrobots with useful properties such as phototaxis, chemotaxis, and magnetic control of motion direction. Most existing microrobotic systems achieve simple motion in the presence of an external power source, but a few recent examples have demonstrated actuation through a series of states to form a gait using either light or magnetic fields. For example, prior work within our group developed microscopic robots that combine surface electrochemical actuators (SEAs) and silicon photovoltaics as a proof of concept for microrobots with silicon electronics. But even these robots are only "marionettes," requiring an external user to control actuation of each leg. Existing microscopic robots, therefore, achieve certain simple criteria for autonomy such as onboard power and some sensing capabilities, but lack onboard control, a key metric for autonomy in small robots. As noted in numerous reviews, making microscopic robots that respond to internal information processing instead of external controls would set the stage for "next-generation intelligent micromachines that can adapt to diverse scenarios for use in emerging fields." Building these systems around CMOS microelectronics is a particularly appealing approach because it would allow researchers to leverage decades of work on microelectronic circuits and sensors to give microrobots complex functions. Previous work to miniaturize robots with onboard CMOS electronics has demonstrated untethered robots just under 10 mm in size. However, the techniques used to build these robots—including wire bonding and multi-chip stacking-prevent them from shrinking to even smaller sizes. Building untethered microscopic robots controlled by integrated circuits is therefore a major unsolved technology integration challenge, requiring a complex fabrication processes for integrating microelectronics for information processing, onboard energy harvesting, and electrically addressable microactuators to complete autonomous microscopic robots.

※ ※ ※

Figures 32A, 32B, 32C:
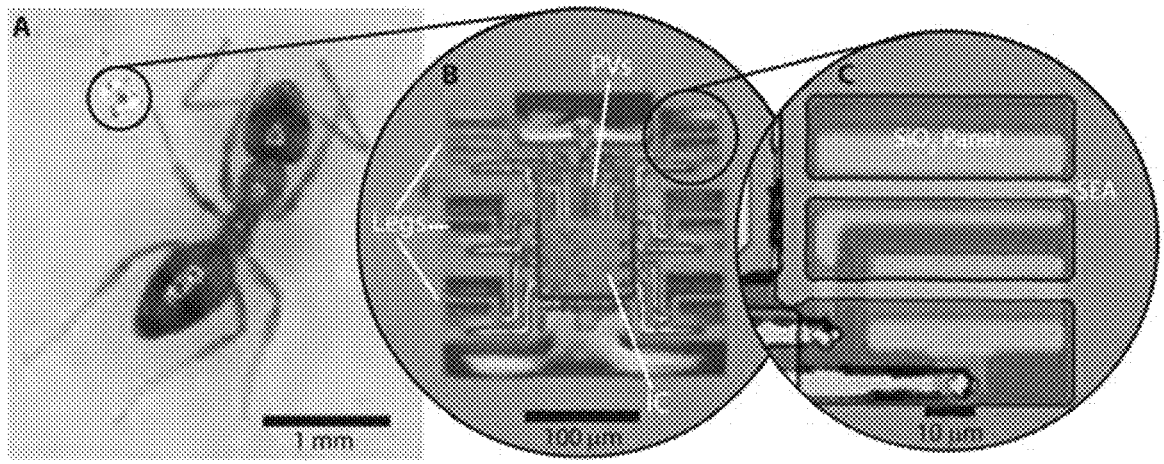
FIGS. 32A-32E Autonomous Microscopic Robots.
Figures 32D, 32E:
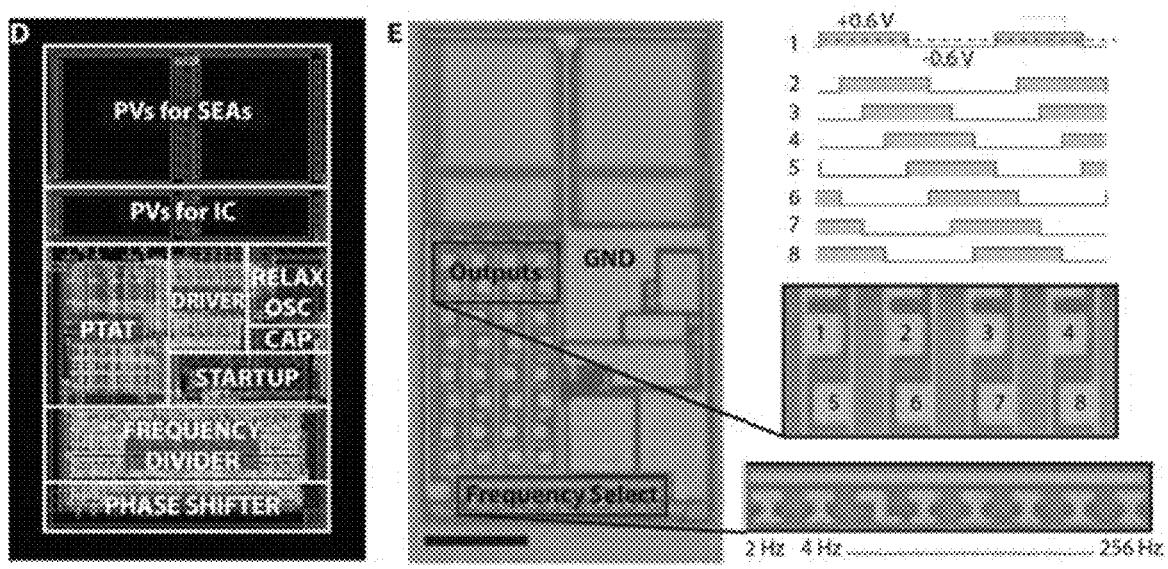

FIGS. 32A-32E: Autonomous Microscopic Robots FIG. 32A, A microscopic robot next to an ant. FIG. 32B, A zoomed-in view of the robot. The robot is composed of three primary pieces: an integrated circuit (IC) for controlling the robot, legs to allow the robot to walk, and photovoltaics (PVs) for powering both the legs and the circuit. FIG. 32C, Further zoomed-in image showing one leg of the robot. It consists of rigid panels of SiO2 and surface electrochemical actuators (SEAs), active hinges that provide the motion. FIG. 32D, image of the CAD layout for the circuit with the primary circuit blocks labeled. FIG. 32E, Optical microscope image of the control circuit for the microscopic robots (scale bar 20 µm). The circuit has eight outputs that deliver phase-shifted square waves with a voltage amplitude of about 0.6 V. The frequency of these square waves can be set by hard wiring the circuit's "frequency select."

FIGS. 33A-33F. Simplified Fabrication Process FIGS. 33A-33F. show optical micrographs at different steps along the fabrication process with a schematic cross section in the bottom right corner. FIG. 33A, ICs as received from XFAB. FIG. 33B, wire up the top of the circuit and etch out the circuit body. FIG. 33C, deposit interconnects from the circuit to the bottom silicon. FIG. 33 D, add metal shielding to protect the circuit from light. FIG. 33E, etch out the panels that form the hinges of the legs and deposit surface electrochemical actuators (SEAs). FIG. 33F, undercut the bottom silicon and release the robots into aqueous solution.

Figures 34A, 34B, 34C:
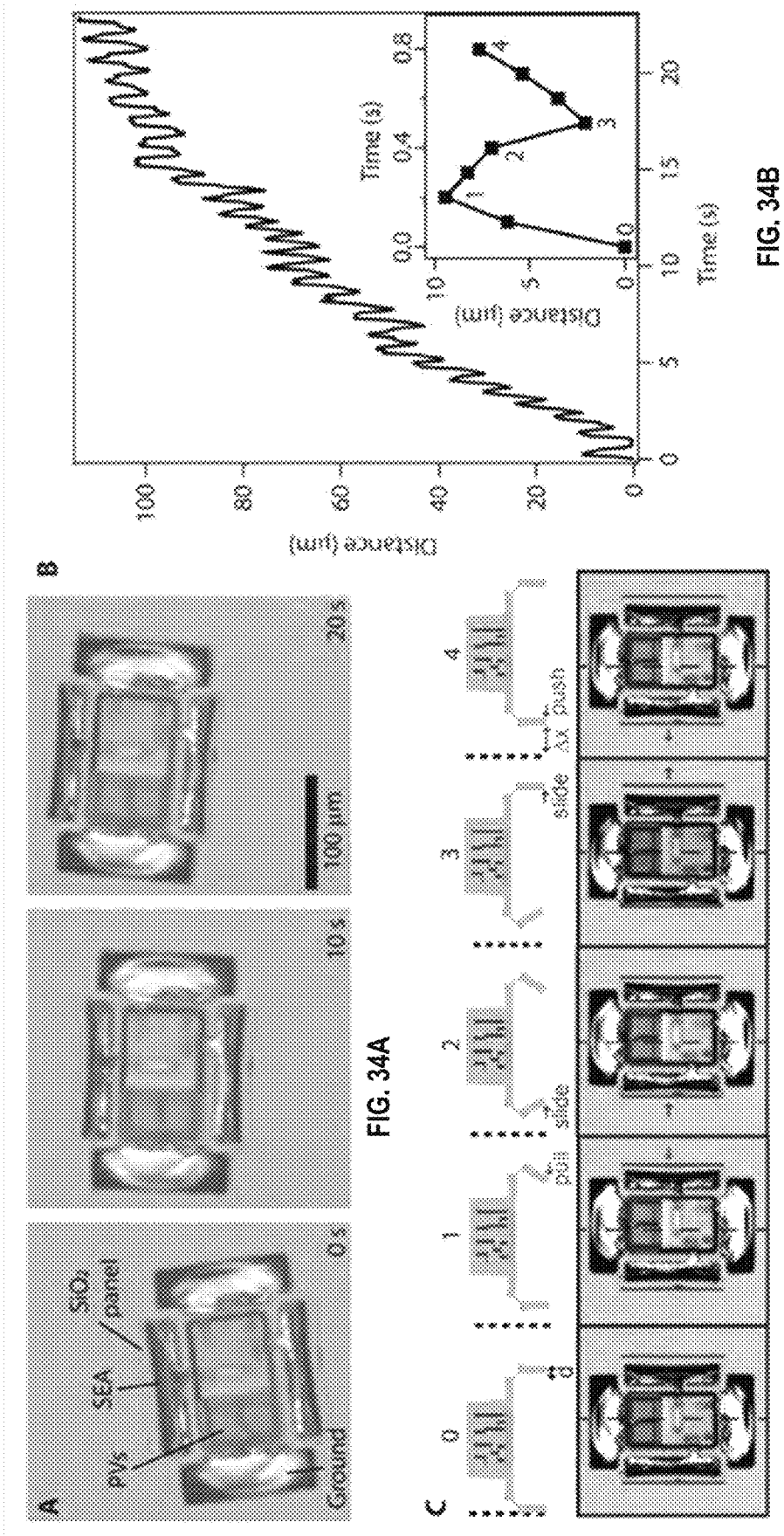
FIG. 34C shows side-view schematics and top-down microscope images for each step in one full cycle of Purcell-bot's gait FIGS. 35A-35E Antbot. Images of antbot crawling on a glass coverside are shown in FIG. 35A. The displacement of the robot versus time is plotted in FIG. 35B. The instantaneous speed can be greater than 50 μm/s, as shown in FIG. 35C. Antbot moves with a gait common to many insects called an alternating tripod gait. In this gait, the top and bottom legs on one side of the robot move synchronously with the middle leg on the other side of the robot and are out of phase with the other three legs, as indicated by the labels in FIG. 35D.

FIGS. 34A-34C. Purcell-bot FIG. 34A Time lapse micrographs of a two-legged Purcell-bot walking along a silicon surface. FIG. 34B Distance versus time for the Purcell-bot shown in A. Inset: distance versus time over one cycle of the Purcell-bot's gait. FIG. 34C Schematic and microscope images showing the sequence of motions in one cycle of the Purcell-bot's gait, with numbers corresponding to the points in time labeled in inset of B. Arrows indicate the direction of motion of the legs. The lines of contact between the robot's legs and the surface are artificially highlighted with red lines to make the alternating motion easier to see.

FIGS. 35A-35E. Antbot FIG. 35A Time lapse microscope images of a microscopic "antbot," a six-legged microscopic robot. FIG. 35B Distance versus time for the robot shown in FIG. 35A. The antbot moves at a speed of about 12 µm/s. FIG. 35C instantaneous speed of the antbot, showing maximum speeds greater than 50 µm/s. FIG. 35D An image of antbot with the legs labeled corresponding to their phase. Antbot moves in the same way as biological ants, using an alternating tripod gait. FIG. 35E Foot position for the legs indicated with squares in D relative to the body of the robot versus time for one leg on each of the phases, showing the phase delay between the legs.

FIGS. 36A-36D. Dogbot FIG. 36A Schematic showing communication with dogbot. Manchester-encoded signals are given to dogbot by varying the full-field light intensity.

Figures 36A, 36B, 36C:
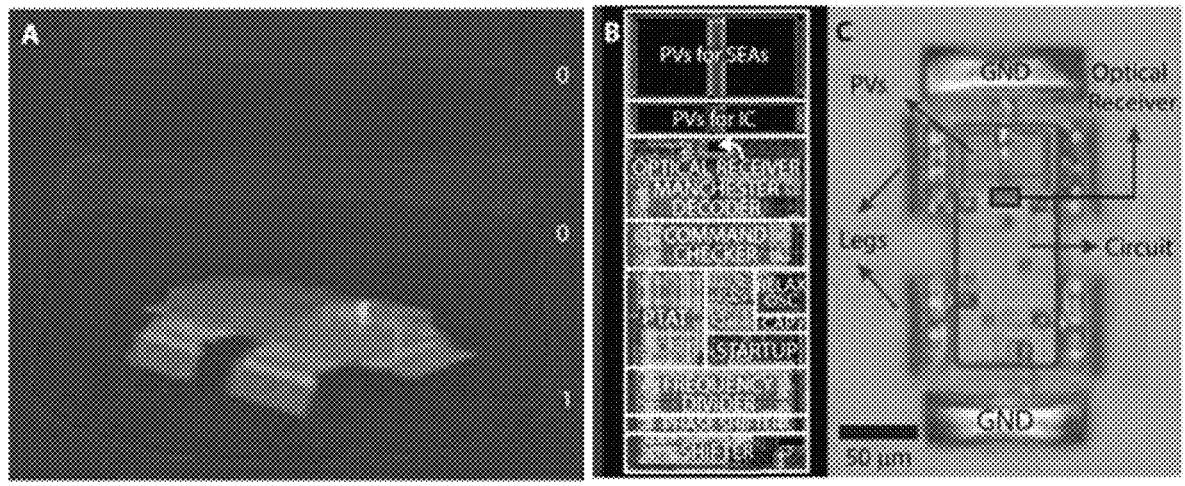
FIGS. 36A-36D Dogbot. To communicate with dogbot, we modulate the full-field intensity of light incident on the robot, as shown schematically in FIG. 36A.
Figure 36D:
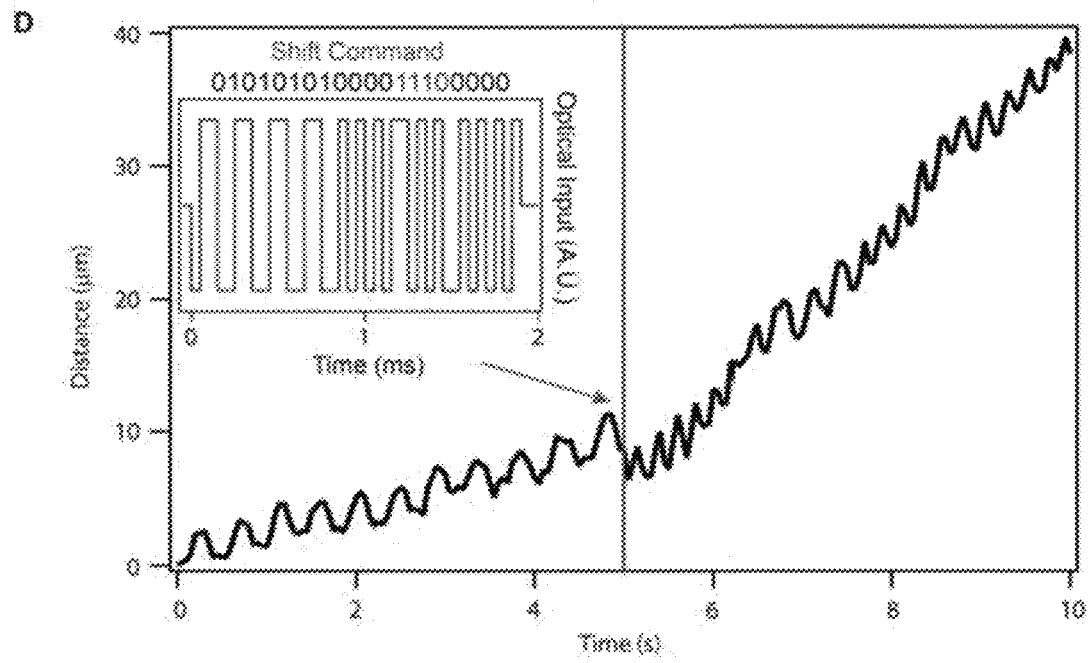

FIG. 36B Image of CAD layout for dogbot. In addition to the components for the previous robots, dogbot has an optical receiver that allows it to receive commands. FIG. 36. C Optical micrograph of fully fabricated and released dogbot. FIG. 36D Dogbot's distance versus time. At 5 s, dogbot receives a shift command (shown in the inset) and the frequency of motion of its legs increases by a factor of two.

Results

Here, we show how to overcome these challenges and demonstrate microscopic robots controlled by onboard digital circuitry. These robots are approximately 10,000 times smaller by volume than previously demonstrated robots with onboard CMOS electronics. FIG. 32A shows one such microscopic robot, pictured next to an ant. The robot cannot be resolved by the naked eye, appearing only as a bright speck when it scatters light. In FIG. 32B, we zoom in on the robot. The robot contains an application-specific integrated circuit (ASIC), which consists of ~1000 transistors, diodes, and resistors, and generates a clock signal that is used to produce a series of phase-shifted square waves for setting the gait of the robots. In addition to the CMOS circuitry, they have silicon photovoltaics (PVs) which, when exposed to light, power the robot. They also have legs made of SEAs and rigid silicon dioxide panels (FIG. 32C). The SEAs consist of an ultrathin layer of platinum (~7 nm) and capping layer of titanium (~2 nm). When the actuator receives a voltage signal from the CMOS circuit, oxygen adsorbs at and expands the platinum surface, causing the robot leg to bend. These actuators are capable of lifting and moving the robot despite being about 1000 times thinner than the robot's body.

The key difference between this robot and previously reported microscopic machines is the onboard ASIC. FIG. 32D shows the computer aided design (CAD) layout of the IC that controls the robot, fabricated by X-FAB Silicon Foundries in their 180-nm CMOS silicon-on-insulator (SOI) process. It consists of a well-defined current reference, relaxation oscillator, frequency divider, phase shifter, and driver that together operate at <1 µW of power from the PVs. Details of the design of this circuit are given in Methods and a block diagram of the components for this circuit is shown in FIGS. 37A and 37B. FIG. 32E shows an optical micrograph of the circuit, only 94 µm by 55 µm in size. The large pair of photovoltaics power the legs of the robot; the small pair power the circuit. The eight outputs labeled in FIG. 32E correspond to eight phase-shifted square waves (FIG. 32E top right) that go between +0.6 V, sufficient to drive oxygen adsorption and desorption for the SEAs driving each leg. The circuit has four redundant sets of these eight outputs to make routing interconnects between the outputs and legs easier. Multiple actuators can be connected to a single output to make legs that move simultaneously. Finally, the circuits are designed so that the frequency of the square wave outputs can be set post fabrication by hard-wiring the I-shaped pins to the bar above them (FIG. 32E bottom right). Our initial proof-of-concept robots are set to operate at about 1-2 Hz to make the robots less susceptible to slipping on flat surfaces. On-chip testing of these circuits demonstrates that they behave as designed, delivering square waves with a 0.6 V amplitude, currents that correspond to a photovoltaic responsivity of about 0.3 A/W, and square wave frequencies that match the designed values for about 1 kW/m$^2$ of illumination (~1 sun) with a frequency that increases with light intensity (Methods and FIGS. 38A-38E). This circuit serves as a platform around which we build a variety of robots.

The next major challenge is the heterogenous integration of CMOS electronics and microactuators to turn these circuits into fully functioning, releasable microscopic robots. The process we developed (a simplified version of which is shown in FIGS. 33A-33F) includes thirteen layers of photolithography, twelve etches, and eleven depositions involving ten different materials at the Cornell Nanofabrication Facility. Starting from CMOS electronics received from XFAB (FIG. 33A), we first etch around the circuit of the robot (FIG. 33B), then deposit interconnects (FIG. 33C), deposit metal to shield the circuit from light (FIG. 33D), and finally pattern the actuators and rigid panels to make the legs (FIG. 33E). Once the robots are completed, we etch the silicon substrate beneath them and release them into aqueous solution (FIG. 33F), typically phosphate buffered saline (PBS, pH 7.5). After releasing the robots, we can manipulate them individually with micropipettes. The complete fabrication recipe can be found in supplementary materials and FIG. 39. The overall yield of working robots is about 50%; yield-limiting steps and future techniques for improving them are also discussed in supplementary materials. All the processes are modular and parallel, producing hundreds of copies of multiple robot designs from an area less than 50 mm$^2$. These can be adapted and expanded in the future to create new generations of autonomous microscopic robots with ever-more sophisticated functions using the same design tools for creating semiconductor integrated circuits.

A simple two-legged autonomous microscopic robot walking independently across a smooth silicon wafer is shown in FIG. 34A (with details for operation of the robots in Materials and Methods). For this robot (and all other robots shown afterwards), the legs can move independently of each other by applying potentials versus large platinum ground electrodes also exposed to the solution, as labeled in FIG. 34A. Although this robot crawls rather than swims, its design and gait are inspired by Edward Purcell's three-link swimmer that can move at low Reynolds number by breaking time reversal symmetry. We therefore call this robot "Purcell-bot." The distance traveled by Purcell-bot versus time (measured by tracking the robot center) is plotted in FIG. 34B. The Purcell-bot shown here moves at a speed of about 4 to 5 µm/s, about two body lengths per minute. The circuit is set so that this robot performs one complete gait cycle at a frequency of about 1 Hz when powered by less than 1 kW/m$^2$ light intensity. The distance traveled over one cycle is ~4 µm (inset of FIG. 34B).

Figure 40:
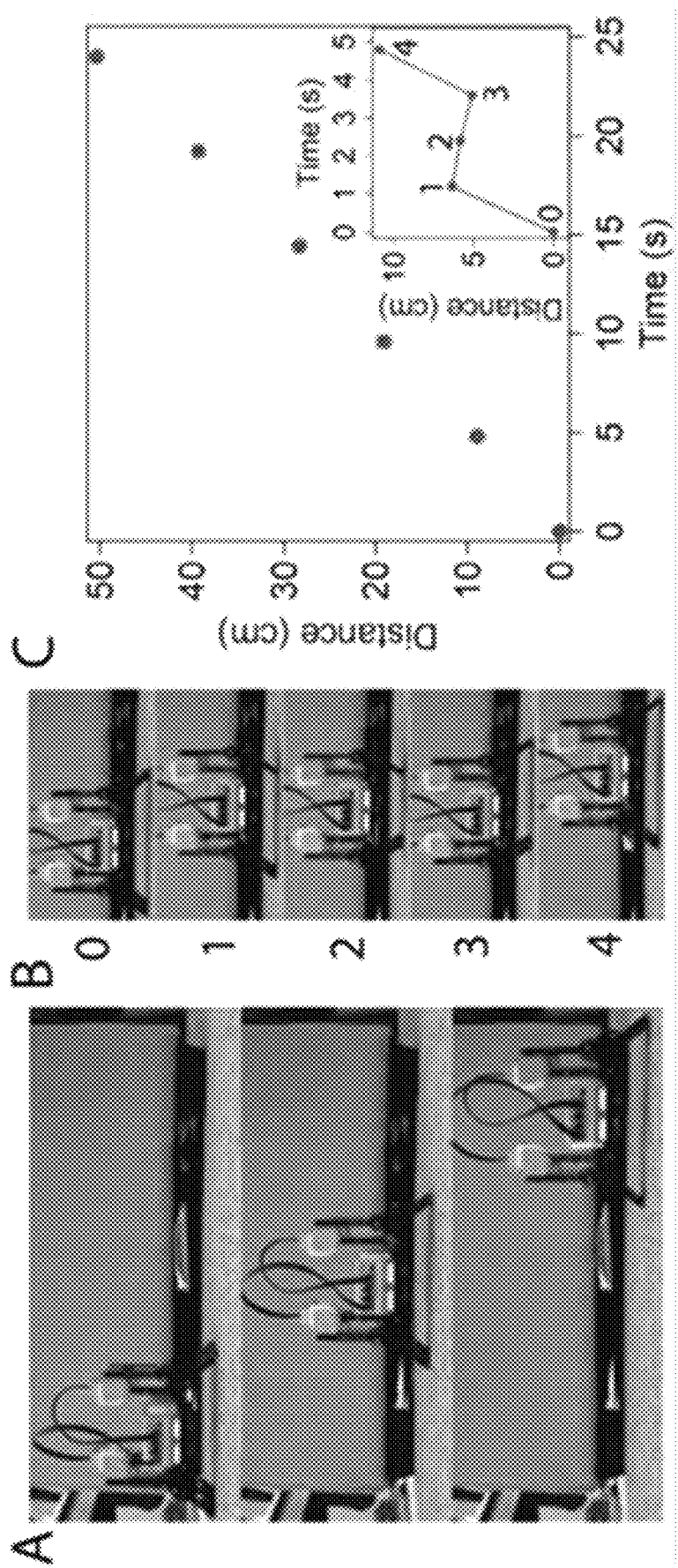
FIG. 40 Macroscale LEGO model of a Purcell-bot.

The distance traveled per cycle in FIG. 34B can be explained with a simple proposed model based on the change in frictional forces on the legs as a function of their position. FIG. 34C shows side-view schematics and top-down microscope images for each step in one full cycle of Purcell-bot's gait with labels corresponding to the inset of FIG. 34B. Starting from a position where both legs are extended (0), the legs alternately bend inward toward the robot's body, (1) and (2), and then outward, back to their starting positions, (3) and (4). The robot moves a larger distance forward in (1) and (4), and a smaller distance backwards in (2) and (3). We explain this behavior by noting that more weight is placed on the leg that is closest to the robot's center of mass, increasing the friction on that leg. The friction is therefore higher on the actuated leg in (1) and (4), allowing that leg to pull or push the robot forward, while the friction is higher on the static leg in (2) and (3), allowing the actuated leg to slide while moving the robot backward a smaller distance. If the leg with higher friction remained completely fixed, Purcell-bot could move a distance of $2d_{leg}$ per cycle-approximately 20 μm for the robot shown in FIGS. 33A-33F—where $d_{leg}$ is the distance each leg moves along the surface during actuation. In practice, this robot travels about 20% of the maximum distance because both legs slide somewhat during each step of the motion. This accounts for the backward motion during steps 2 and 3 of the robot's motion shown in the inset of FIG. 34B. This model also indicates that the speed of motion will be highly sensitive to local changes in friction, a possible explanation for the change in average speed during the measurement. In the future, therefore, increasing the friction between the legs and surface, the length and design of the legs, and the frequency of actuation could result in faster speeds even for this simple robot, as discussed in Materials and Methods. Purcell-bot's behavior matches qualitatively with macroscopic crawling robots designed with the same gait, an example of which is shown in FIG. 40.

The circuit can also drive more complicated legged locomotion. FIGS. 35A-35E shows "antbot," a hexapod robot inspired by the motion of ants. Images of antbot crawling on a glass coverside are shown in FIG. 35A. The displacement of the robot versus time is plotted in FIG. 35B; antbot moves at a consistent average speed of about 12 μm/s, about three body lengths per minute. The instantaneous speed can be greater than 50 μm/s, as shown in FIG. 35C. Based on the size and weight of the robot, the drag coefficient, and this peak speed, the legs exert a peak force of about 1 nN to move the robot forward, close to the previously measured maximum force output of a square SEA. The frequency of the gait is about 2.5 Hz, so the robot moves about 5 μm per stride. Antbot moves with a gait common to many insects called an alternating tripod gait. In this gait, the top and bottom legs on one side of the robot move synchronously with the middle leg on the other side of the robot and are out of phase with the other three legs, as indicated by the labels in FIG. 35D. For this robot, the hinges on the legs labeled "1" are wired to outputs 3 and 1, and the hinges on the legs labeled "2" are wired to outputs 5 and 7. This gait allows the robot to balance on three legs at a time and push off with those legs to move forward, while avoiding drag from the other legs. FIG. 35E tracks the motion of one leg on each phase (indicated by the boxed numbers in FIG. 35D) with respect to the body, showing the approximately 90° phase difference between the two (with some additional fluctuations within each cycle). Despite these fluctuations, which could be caused by microscale debris visible around the robot, the antbot's average speed remains approximately constant in time. We watched this particular robot for over 15 minutes, during which it completed more than 2000 cycles of its gait.

Figure 41B:
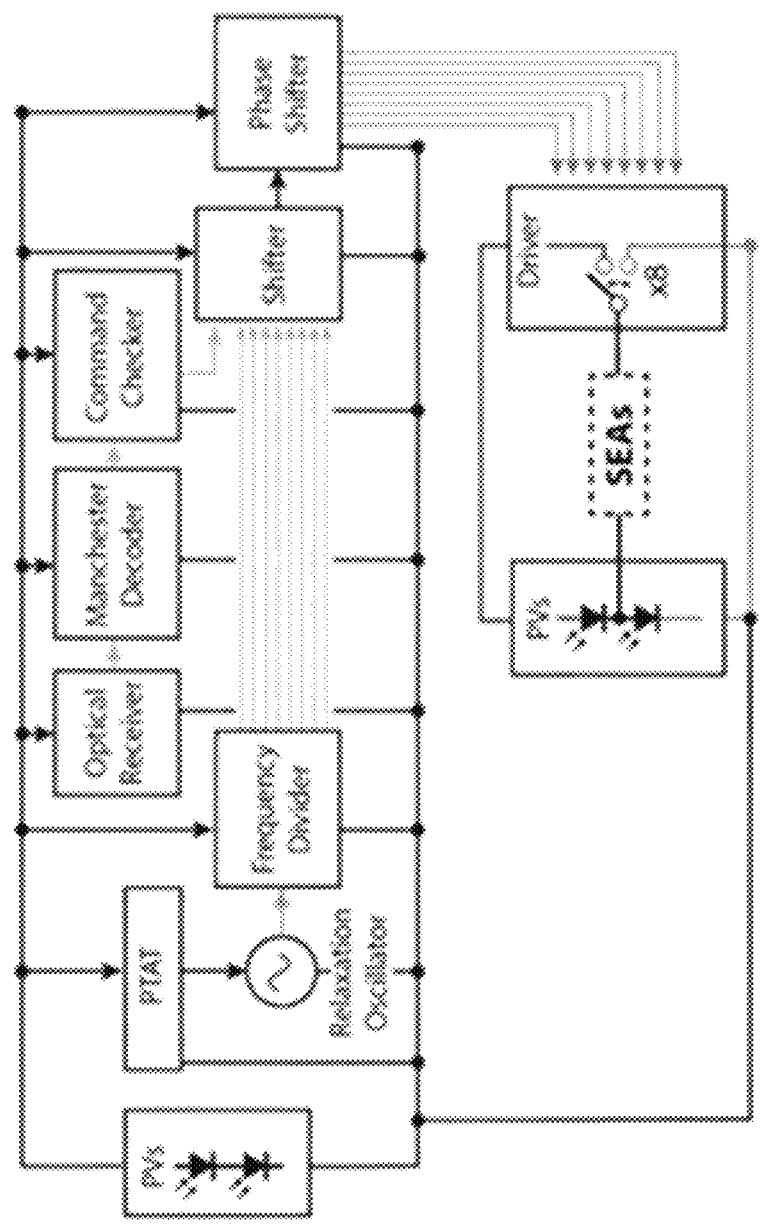
FIGS. 41A and 41B Control circuit for dogbot. The CAD layout and block diagram for this circuit are shown in FIGS. 41A and 41B.

Building microscopic robots with CMOS electronics also allows us to create robots that change their behavior in response to external stimuli. To demonstrate this capability, we built "dogbot," which responds to a simple command (FIG. 36). In this case, the command is delivered optically and tells the robot to speed up. To communicate with dogbot, we modulate the full-field intensity of light incident on the robot, as shown schematically in FIG. 36A. We designed dogbot's circuit to receive Manchester encoded commands, a standard communication protocol where bits are encoded in transitions from high to low or low to high instead of in the levels themselves, allowing data and timing information to be transmitted to the robot within a single optical signal. A block diagram for this circuit is shown in FIG. 41B. The additional circuitry for dogbot expands its area to be approximately 50% bigger with about 1,500 transistors.

FIG. 36B shows the CAD layout for dogbot's circuit. In addition to the previous circuit components, dogbot has an optical receiver, Manchester decoder, and command checker. The optical receiver contains another photovoltaic, the output of which is fed to the Manchester decoder. The Manchester decoder interprets the incident signal to retrieve a four-bit binary word, which it compares to a known four-bit code. If the received binary word matches the known code, the frequency of the outputs to the legs increases by a factor of two. On-chip testing of this circuit is shown in FIGS. 42A-C. While we designed the circuit to receive only one command, this scheme for communication with microscopic robots is scalable. The area of the robot scales linearly with number of bits while the number of commands scales exponentially; an eight-bit dogbot could have more than 200 different commands with only a 20% increase in size. Finally, we show an optical microscope image of the fully integrated dogbot in FIG. 36C.

In FIG. 36D, we show dogbot's response to a shift command that changes the gait frequency by plotting its displacement versus time. The robot is designed to walk with the same gait as Purcell-bot, alternately moving the legs on either side of its body. We expect its speed to increase proportionally with frequency. The robot is powered with a continuous illumination of about 1 kW/m$^2$; to send a command, we briefly alternate the light intensity between about 1 kW/m$^2$ and about 3 kW/m$^2$. The command itself is shown in the inset of FIG. 36D. In addition to the four bits for the command, it includes an initial timing sequence of ones and zeroes, required for the circuit to lock on to the timing to receive the command. The pulse width in the command is 50 μs—a timescale specified by the design of the circuit-so the whole command takes less than two milliseconds to deliver. When dogbot receives the command, the frequency of its gait shifts from about 2 Hz to about 4 Hz, increasing its speed from about 2 μm/s to about 6 μm/s. Although more than a factor of two, this increase is qualitatively consistent with the expected behavior given the variability in crawling speed for the fixed-frequency Purcell-bot.

Discussion

Collectively, the work shown here is the start of a new "family" of microscopic robots with numerous circuit designs "genera" and locomotory strategies "species." Because these microscopic robots are patterned in parallel using photolithography, we can build many robots and try many different designs at once. More than 300,000 of these robots could fit on a single eight-inch wafer. Future research could study and optimize the gaits of microscopic robots and build on existing literature studying microrobot locomotion (47-50). The robots we have demonstrated thus far are still relatively simple, moving with fixed gaits in well-controlled environments and not capable of navigating rough terrain or swimming through viscoelastic media. However, because the circuits are foundry based, and because the integration process has now been developed, the stage is set for other researchers to add new actuators and propulsion mechanisms as well as their own "apps"—onboard memory, chemical detectors, electromagnetic antennal arrays, etc.— to the CMOS electronics of microscopic robots. Future work on microscopic robotics can therefore expand this family tree, increasing the complexity and efficiency of the designs we presented and opening new working environments. Our group, for instance, is currently working on microactuators with higher forces and efficiencies and robots with photovoltaic "eyes" to allow them to steer by sensing light gradients, but any number of microsensors and actuators could be added to give new functions to these microscopic robots. Moreover, the CMOS fabrication could in principle utilize modern node sizes of around 10 nm, enabling autonomous microscopic robots that are an order of magnitude smaller than the ones shown here. Applications would range from environmental cleanup and monitoring to targeted delivery of drugs, monitoring or stimulation of cells, and microscopic surgery. In all these applications, robots with onboard control systems for sensing and responding to their environments and operating autonomously provide a significant advantage, setting the stage for ubiquitous smart microscopic robots with the capacity for positive impacts in the world around us.

Materials and Methods

The work reported here proceeded from circuit design and testing to fabrication to testing the completed robots, corresponding to the following materials and methods subsections. We also discuss how we estimate the maximum speed and actual efficiency of these robots.

Circuit Design

All circuits shown in this paper were designed in Cadence using a process design kit provided by X-FAB Silicon Foundries for their 180-nm node process, XT018.

\* \* \*

FIGS. 37A and 37B. Control circuit for microscopic robots. FIG. 37A Image of the circuit's CAD layout with the primary blocks labeled. FIG. 37B Block diagram of the circuit.

FIGS. 38A-38E. Circuit Testing. FIG. 38A Current versus time from the circuit at two illumination intensities of 660 nm light with the circuit wired to the lowest frequency setting. The circuit functions with light intensities from a fraction of a sun to tens of suns, yielding output currents from 100's of nA to a few µA. FIG. 38B Voltage versus time measured for two of the phase-shifted outputs simultaneously. The voltage alternates between approximately +0.6 V and −0.6 V, which is sufficient to drive the oxygen adsorption actuation of the SEAs. FIG. 38C Voltage and current as a function of incident light intensity. The voltage displays behavior typical of a photovoltaic. The current is linear with light intensity with a responsivity of about 0.3 A/W. FIG. 38D Frequency of the square wave output versus light intensity. The circuit is wired to a state nominally designed to produce an 8 Hz square wave. FIG. 38E Current versus voltage for the two large photovoltaics on the circuit that drive the actuators (each with an area of 540 µm$^2$). Wired in series, the photovoltaics deliver an open circuit voltage of about 1.24 V or 0.62 V per photovoltaic at a light intensity of 1 kW/m$^2$. The short circuit current at 1 kW/m$^2$ is approximately 150 nA. These values match the values delivered by the circuit shown in FIG. 38C.

Figure 39:
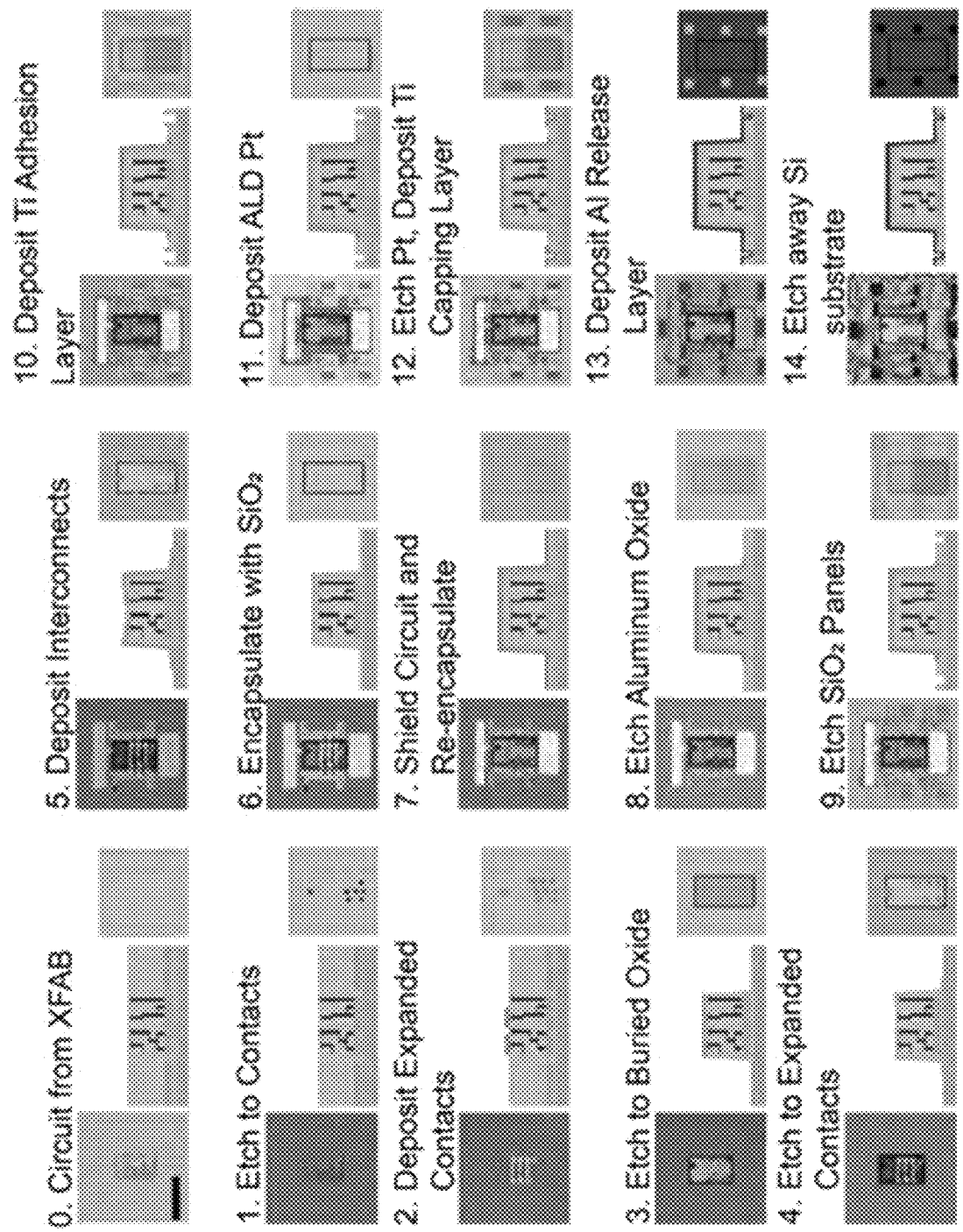
FIG. 39 Fabrication process for microscopic robots. Etch to top metal contacts (1); Deposit expanded contacts (2); Etch through device silicon to buried oxide (3); Etch to expanded contacts (4); Deposit interconnects from top of circuit to silicon wafer (5); Re-encapsulate with oxide for circuit light shield (6); Encapsulate with oxides (7); Etch through aluminum oxide (8); Etch to interconnects and form panels (9); Ti adhesion layer for SEAs (FIG. 39-10). Atomic layer deposition of Pt for SEAs (10); Deposit Ti capping for SEAs (12); Deposit and pattern aluminum/aluminum oxide for release (13); Undercut wafer silicon with XeF2 for release (14).

FIG. 39. Fabrication process for microscopic robots. Sequence of steps to build microscopic robots from the CMOS control circuits. For each step, we show an optical micrograph, a schematic cross-section, and a schematic top view. On steps where a new material is deposited, its thickness is shown larger than on subsequent steps on the cross-section schematic to emphasize what and where it is. Scale bars is 100 µm.

FIG. 40. Macroscale LEGO model of Purcell-bot. (A) Images of a macroscale Purcell-bot made of LEGO during crawling. The robot is approximately 20 cm in length. (B) Images of the macroscale robot over one cycle of its gait. This macroscale model crawls using approximately the same gait as the Purcell-bot shown in FIG. 34 of the main text: alternately moving its right (leading) and left (lagging) legs. (C) Distance versus time for the macroscale Purcell-bot. The distance is measured at the end of each gait cycle. The position versus time over one gait cycle is shown in the inset, with labeled numbers matching the numbers in (B). The behavior qualitatively matches that of the microscale Purcell-bot shown in FIG. 34, with the robot sliding forward during the first and fourth steps in the gait and sliding backward a smaller distance during the second and third.

Figure 41A:
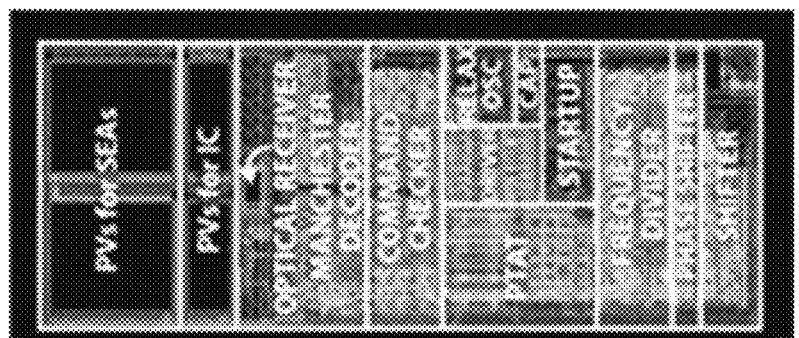

FIGS. 41A and B. Control circuit for dogbot. FIG. 41A Image of the circuit's CAD layout with the primary blocks labeled. FIG. 41B Block diagram of the circuit. In addition to the blocks for the previous circuit, this circuit has an optical receiver, Manchester decoder, command checker, and shifter which are used to interpret shift commands and increase the frequency by a factor of two.

FIGS. 42A-42C. Dogbot circuit testing. FIG. 42A Optical micrograph of the circuit for dogbot, a microscopic robot that can receive commands. The circuit has a photovoltaic for receiving commands in the form of light signals. Scale bar is 20 µm. FIG. 42B Manchester encoded binary waveform for the "shift" command. Manchester code uses transitions between high and low to transmit bits; low to high is a zero and high to low is a one. The four-bit command is bracketed by additional ones and zeroes that the receiver circuit requires to recognize a command is being given. Each bit takes about 100 µs to transmit, so the whole command is transmitted in a matter of milliseconds. FIG. 42A Measured current versus time data from the circuit measured on chip. The red lines indicate when a shift command is given to dogbot by modulating the input light with the waveform shown in B. Each shift command increases the frequency by a factor of two as designed.

\* \* \*

The circuit for driving the robots in FIGS. 34A-C and FIGS. 35A-E consists of the circuit blocks labeled on the circuit CAD layout and in a block diagram in FIGS. 37A and 37B, respectively. The integrated circuit photovoltaics (PVs for IC) power the proportional to absolute temperature (PTAT) current source, providing a constant current to a relaxation oscillator that provides the circuit with a series of short high frequency pulses at ~32 kHz to serve as a clock output, a design based on prior work. We then use a frequency divider that consists of a series of D-type flip-flops to convert the pulses to a 50% duty-cycle signal and decrease that clock frequency to a range usable for the robot. We set the exact number of times the frequency is divided when we wire up the frequency selector. The phase shifter offsets the square waves controlling each output by multiples of one-eighth of a period, producing the phase-shifted square waves. These output signals control the driver for the legs which switches from applying positive to negative voltages to the SEAs.

The circuit for dogbot, the robot shown in FIGS. 36A-D of the main text, was based on the previous circuit and was modified to allow it to respond to optical commands. The CAD layout and block diagram for this circuit are shown in FIGS. 41A and 41B. The added components are an optical receiver, Manchester decoder, command checker and shifter. The optical receiver photovoltaic is connected to the Manchester decoder. The Manchester decoder interprets the received signal to retrieve a four-bit binary word which it compares to a known four-bit code, arbitrarily chosen to be 1110 for these circuits. It is designed to receive signals with a pulse width of about 50 µs. If the received binary word matches the known code, the frequency of the outputs to the legs increases by a factor of two, a function performed by the shifter.

Circuit Testing

We test the circuits in the lab by wiring up the frequency select, connecting to the output states and ground, and shielding the circuit from light with a metal layer. If the circuit is exposed to light, photocurrents at p-n junctions in the silicon cause the circuit to malfunction so this last step is necessary for the circuit to function properly. We use probes connected to micromanipulators to touch down to the pads for outputs and ground. We connect the output of the circuit to the input of an Ithaco 1211 preamplifier and measure the output of the preamplifier with a digital oscilloscope (Picoscope). For voltage measurements, we put the output of the circuit across a 100 MΩ resistor prior to the input of the preamplifier and calculate the voltage based on the measured current and known resistance. This measurement could also be performed with a high input impedance oscilloscope without any preamplification, but the input impedance of many standard oscilloscopes is too low (~1 MΩ) to give an accurate voltage measurement.

FIGS. 38A-38E shows measured outputs for the circuit. In FIG. 38A, we plot the current versus time for two incident light intensities, 2.5 kW/m$^2$ and 7 kW/m$^2$ of 660 nm light. FIG. 38B plots the voltage versus time from two different phase outputs measured simultaneously. Each state outputs the expected voltage of about +0.6 V, spanning the oxygen adsorption actuation voltage for SEAs. The phase difference matches the expected 90° phase difference for the selected outputs. In FIG. 38C, we plot the measured amplitude of current and voltage of square wave outputs from the circuit as a function of light intensity. The current increases with light intensity as expected, yielding a photovoltaic responsivity of about 0.3 A/W and an open-circuit voltage of ~0.6 V, typical values for silicon pn-junction photovoltaics of similar thicknesses. Based on this value and the charge per area for oxygen adsorption actuation of a SEA as measured in previous work, approximately 150 µC/cm$^2$, we expect the circuit to be able to drive SEAs with an exposed platinum surface of about 0.1 mm$^2$ at 1 Hz at 1 kW/m$^2$ input light intensity, a value more than sufficient for operating the microscopic robots. In FIG. 38D, we plot the frequency versus light intensity from one of the circuits, showing an initial linear increase of frequency with light intensity before leveling off after about 2 kW/m$^2$. FIG. 38E shows I-V curves for the large photovoltaics for powering the legs of the robot wired in series; the measured voltage and current from the PVs correspond well to the voltage and current delivered from the functioning circuit.

We also perform on-chip testing of the circuit for dogbot. FIG. 42A shows an optical image of that circuit prior to fabrication. To test the circuit electrically, we wire contact pads to the output of the circuit and shield the circuit from light with a metal layer. In FIG. 42B, we show the shift command delivered to the circuit optically. In FIG. 42C, we plot the current versus time from the circuit as it receives consecutive shift commands. For this experiment, the circuit is powered at about 0.5 kW/m$^2$ and the high level for the command is about 3 kW/m$^2$. In general, we find that delivering the commands requires a light intensity equal to or greater than 3 kW/m$^2$ and that the circuit works best with approximately 50 µs pulses.

Fabrication Process

Due to its length, we provide details of the fabrication process in the supplementary materials.

Robot Manipulation and Operation

To pick up and move individual microscopic robots, we use a pulled micropipette (tip diameter ~30 µm) attached to a micromanipulator with a custom holder. The micropipette is connected to a syringe pump. We withdraw fluid to attach the robot to the micropipette and pump out fluid to release. To flip the robots, we attach the same micropipette to a Pneumatic PicoPump (WPI) and apply a pressure spike to roll the robot over with a small volume of fast-moving water.

To operate the microscopic robots, we simply shine light on them. The robots function in about 0.5-5 kW/m$^2$ of light, comparable to the light intensity outside on a sunny day (about 1 kW/m$^2$). The robots can be operated under any light source that silicon absorbs; we power the robot with a halogen lamp. However, for most of the robots we choose to use light sources at well-known wavelengths to simplify the calibration of light intensity. For the robots in FIG. 34A-34C and FIG. 36A-36D, we use a 660-nm Thorlabs laser to power the robots and a halogen lamp to image them. For FIGS. 35A-35E we use a Thorlabs 600-nm LED lamp to both power and image the robot. The robots are exclusively powered and imaged from above. The underside of the circuit for the robot is not shielded from light, so shining light at the bottom of the robot causes the circuit to malfunction and the robot to stop moving.

To give commands to dogbot, we connect a function generator (Agilent 33250A) to the BNC control for a Thorlabs laser diode driver. We connect a computer to the function generator and use a home-written python script to deliver commands for an arbitrary square wave, which is output from the function generator to the driver, modulating the laser light intensity.

Estimating the Maximum Speed of Purcell-Bot

In the future, there are several changes to the design of Purcell-bot that we anticipate will allow it to go faster, including increasing the friction between the legs and the surface, increasing the frequency of the motion, and increasing the length of the legs. The following analysis allows us to estimate the maximum average velocity a Purcell-bot could achieve with these changes. Actuating a leg of the robot applies a force to the body of the robot equal to the force of friction on the leg, which we will label leg 1. This force is opposed by the fluid drag on the robot and by the friction on the stationary leg, which we label leg 2. The maximum speed of the microrobot is set by balancing these forces, $$F_{F1} - F_{F2} - F_d = 0$$

Based on balancing forces and torques on Purcell-bot, we expect that the normal force is partitioned between the legs based on their proximity to the center of mass. If we make the simplifying assumption that the coefficient of friction is equal for each leg, we can write the maximum difference between the friction forces as:

$$(F_{F1} - F_{F2})_{max} = \eta F_N \frac{d_{leg}}{L_{bot}}$$

where $L_{bot}$ is the separation between the legs when both legs are fully extended, $d_{leg}$ is the displacement of the leg in the x-direction, η is the coefficient of friction on the leg, and $F_N$ is the normal force on the robot.

The drag force is made up of contributions from the body and legs of the robot. If we assume that the body of the robot is the dominant contribution to the drag force, we can write:

$$F_d \approx \frac{\mu A v}{s}$$

where $v$ is the velocity of the robot, $\mu$ is the viscosity of the fluid, $A$ is the area of the robot, and $s$ is the separation between the body of the robot and the surface. The maximum velocity of the robot is then approximately:

$$v_{max} = \frac{\eta F_N s}{\mu A} \frac{d_{leg}}{L_{bot}}$$

For the Purcell-bot shown in FIGS. 34A-34C, $d_{leg}$ is about 10 μm and $L_{bot}$ is about 150 μm. The circuit at the center of the body of the robot is the dominant contributor to the weight: it is about 60 μm wide, 100 μm long, 15 μm tall, and weighs approximately 1.5 nN. With a surface area of about 100 μm by 200 μm, a separation distance of about 20 μm based on the length of the legs, the viscosity of water (about $10^{-3}$ Pa s), and a peak speed of about 50 μm/s, we find a maximum coefficient of friction of about 0.5. The actual value for the coefficient of friction could be lower if the coefficient of friction is different at each of the legs at different times during the gait (i.e. if one leg's friction value is the static coefficient of friction and the other's is the kinetic coefficient of friction) or higher if the drag on the legs contributes substantially to the overall drag. By increasing the friction between the legs and the surface (either by designing a textured surface or engineering the end of the leg) and by redesigning the legs with smaller surface areas to decrease drag forces, we could increase the fraction of the gait where only one leg is sliding on the surface and the other is fixed. This would also increase the maximum speed of the robot, allowing us to increase the frequency of leg motion proportionally to the increased friction. Increasing the length of the legs of the Purcell-bot could further increase the average velocity by increasing both s and $d_{leg}$. For a robot of the same area and weight on a surface where $ \S 1$, with s and $d_{leg}$ approximately 50 μm (close to the maximum value since the robot would tip over if they exceed $L_{bot}/2$), we estimate peak velocities of about 1 mm/s and an average velocity of 100's of μm/s, allowing even this simple robot design to travel at body length per second speeds. This speed is comparable to or faster than other synthetic microrobots that move near solid surfaces, but is outpaced some by acoustically or chemically driven systems.

Estimating Efficiency

We can estimate the efficiency of these robots by comparing the incident power on the photovoltaics to the power expended to move the robot's body through the fluid near a surface, given by the drag force on the robot times its velocity:

$$P_{drag} = \frac{\mu A v^2}{s}$$

For the Purcell-bot shown in FIGS. 35A-35E with an average speed of 4 μm/s, the drag power is about one attowatt. The power incident on the photovoltaics at 1 kW/m² (one sun) is about 1 W. This results in an extremely low efficiency of about $10^{-11}$.

We can account for this efficiency by considering four "internal efficiencies": the efficiency of the photovoltaics, the power transmission efficiency between the photovoltaics and the SEAs, the SEAs efficiency, and the efficiency of motion. Based on a measured responsivity of 0.3 A/W and an output voltage of about 0.6 V, the photovoltaics have an efficiency of about 20%. The change in voltage output is 1.2 V and 200 nA, values that were designed to overshoot the demanded voltage and charge for the actuators on the robot, about 0.3 V and about 10 nC. As a result, at a 1 Hz actuation frequency, the power transmission between the PVs and the SEAs is about 1%. The efficiency of the SEAs is about $10^{-4}$ as measured in previous work. Based on these efficiencies, the efficiency of converting the mechanical work done by the SEAs to forward motion is about $10^{-4}$. This includes energy lost to the surrounding fluid, portions of the motion that do not propel the robot forward, and any mismatch between the maximum force output by the actuator and the force generating forward motion. As discussed in the previous section, redesigns of the robot's legs, increasing the operating frequency, and increasing friction between the legs and surface could likely yield speeds around 100 μm/s without increasing the required input power; this could increase the overall efficiency by two to three orders of magnitude. Operating the robots at higher frequencies could also decrease the power consumption of the circuit, requiring fewer frequency divisions, but this improvement would be marginal.

For antbot, which has an area of approximately 240 μm by 240 μm, moves at 12 μm/s, has an estimated separation from the surface of 25 μm, and is powered by a light intensity of about 4 kW/m² for the data shown in FIGS. 35A-35E, the estimated efficiency is between $10^{-10}$ and $10^{-11}$, about a factor of five greater than for the Purcell-bot in FIGS. 34A-34C Supplementary Materials Materials and Methods: Fabrication Process We perform the fabrication on chips diced from the eight-inch silicon-on-insulator (SOI) wafers received from X-FAB that are approximately one inch long on each side. We use SOI wafers to allow the device silicon to be patterned into multiple electrically isolated photovoltaics and circuits and so that we can use the buried oxide (BOX) to protect the underside of the circuit during release. Each circuit is located at the center of 300 μm by 300 μm squares bordered by a grid of metal fill, interleaved metal and oxide that is required to satisfy XFAB Silicon Foundries' design rules. All steps below are performed at the Cornell Nanofabrication Facility (CNF) unless otherwise indicated.

1. Etch to Thin Top Oxide
   a. Oxford 80:3 min mild descum (50 W)
   b. Oxford 100:10 min oxygen chamber clean, 3 minutes $CHF_3/O_2$ season, $CHF_3/O_2$ etch until about 500 nm of oxide remains on top of the highest metal layer, about 6.5 minutes
2. Etch to Top Metal Contacts (FIG. 39 Step 1)
   a. Prebake chip 2 min, spin P20, Spin AZ nLOF 2020 at 3000 rpm, 1000 rpm/s, 45 s; bake for 1 minute at 115 C
   b. Expose for 1.8 s on ABM Contact aligner, bake for 1 minute at 115 C
   c. Develop for 1 minute in AZ 726 MIF
   d Oxford 80: preclean chamber 10 min, $O_2$ mild descum (50 W) 2 minutes
   e. Oxford 100:10 min $O_2$ chamber clean, 3 min $CHF_3/O_2$ oxide etch season, $CHF_3/O_2$ etch until through oxide to metal, about 5 min
   f. Sonicate in 1165 to remove resist, rinse in DI Water and IPA, blow dry with nitrogen g. Oxford 80: preclean chamber 10 min, $O_2$ plasma (150 W) for 5 minutes
3. Deposit expanded contacts (FIG. 39 step 2)
   a. Prebake chip 2 min, spin P20, Spin AZ nLOF 2020 at 3000 rpm, 1000 rpm/s, 45 s; bake for 1 minute at 115 C
   b. Expose for 2 s on ABM Contact aligner, bake for 1 minute at 115 C
   c. Develop for 1 minute in AZ 726 MIF
       AJA sputter deposition: 60 Ar preclean of the chip, 60 s Ti (about 10 nm) and 130 s Pt (about 60 nm)
   d. Lift off in heated 1165 (about 1 hour); rinse in DI water and IPA, blow dry with nitrogen
   e. Oxford 80: preclean chamber 10 min, $O_2$ plasma (150 W) for 5 minutes
   f. Confirm that contacts are electrically connected to the circuit (at McEuen lab)
4. Encapsulate Top Contacts
   a. Oxford 100 PECVD: 5 min high-rate chamber preclean, deposit 300 nm TEOS on chip, post clean chamber
   b. Confirm film thickness with filmetrix
5. Deposit Cr Hard Mask for Oxide Etch
   a. Prebake chip 2 min, spin P20, Spin AZ nLOF 2020 at 3000 rpm, 1000 rpm/s, 45 s; bake for 1 minute at 115 C
   b. Expose for 1.8 s on ABM Contact aligner, bake for 1 minute at 115 C
   c. Develop for 1 minute in AZ 726 MIF
   d. AJA sputter deposition: 60 Ar preclean of the chip, about 350 nm of Cr (approximately 3200 s)
   e. Lift off in 1165 (about 15 min); rinse in DI water and IPA, blow dry with nitrogen
   f. Oxford 80: preclean chamber 10 min, $O_2$ plasma (150 W) for 5 minutes
6. Etch Through Oxide to Device Silicon
   a. Oxford 100:10 min oxygen chamber clean, 3 minutes $CHF_3/O_2$ season, $CHF_3/O_2$ etch about 1 hour, broken into 20 minute etches with chamber cleans in between. Check remaining thickness between each etch to determine rate
   b. Oxford 80: preclean chamber 10 min, $O_2$ plasma (150 W) for 10 minutes
7. Etch Through Device Silicon to Buried Oxide (FIG. 39 Step 3)
   a. Oxford Cobra ICP Etcher: preclean chamber, season, etch with HBr about 20 minutes broken into two 10 minute etches, post clean chamber.
   b. Dip chip in 30:1 buffered oxide etch for about 3 seconds to remove deposited silicon oxybromide
   c. Oxford 80: preclean chamber 10 min, $O_2$ plasma (150 W) for 25 minutes
8. Remove Cr Hard Mask
   a. Wet etch in Cr etch 200 until all Cr is gone
   b. Oxford 80: preclean chamber 10 min, $O_2$ plasma (150 W) for 10 minutes
9. Re-Encapsulate with Oxide
   a. Oxford 100 PECVD: high-rate clean 5 min, deposit about 300 nm TEOS, post clean chamber
   b. Check thickness with filmetrix
10. Etch to Expanded Contacts (FIG. 39 Step 4)
    a. YES vapor prime with HDMS
    b. Gamma automatic coat-develop tool: spray coat with 1:10 AZ nLOF 2020 in acetone to a thickness of about 2 µm
    c. Bake at 115 C for 1 minute
    d. Expose for 1.9 s on ABM Contact aligner, bake for 1 minute at 115 C
    e. Develop for 1 minute in AZ 726 MIF
    f. Oxford 100:10 min oxygen chamber clean, 3 minutes $CHF_3/O_2$ season, $CHF_3/O_2$ etch through the oxide on top of expanded contacts, about 7.5 minutes, post clean chamber
    g. Sonicate in 1165 to remove resist, rinse in DI Water and IPA, blow dry with nitrogen
    h. Oxford 80: preclean chamber 10 min, $O_2$ plasma (150 W) for 5 minutes
11. Deposit Interconnects from Top of Circuit to Silicon Wafer (FIG. 39 Step 5)
    a. YES vapor prime with HDMS
    b. Gamma automatic coat-develop tool: spray coat with 1:10 AZ nLOF 2020 in acetone to a thickness of about 2 µm
    c. Bake at 115 C for 1 minute
    d. Expose for 3.2 s on ABM Contact aligner, bake for 1 minute at 115 C
    e Develop for 1 minute in AZ 726 MIF
    f. AJA sputter deposition: no Ar preclean, 60 s Ti (about 10 nm) and 140 s Pt (about 60 nm)
        Lift off in heated 1165 (about 1 hour); rinse in DI water and IPA, blow dry with nitrogen. Oxford 80: preclean chamber 10 min, $O_2$ plasma (150 W) for 5 minutes
12. Re-Encapsulate with Oxide for Circuit Light Shield (FIG. 39 Step 6)
    a. Oxford 100 PECVD: high-rate clean 5 min, deposit about 300 nm TEOS, post clean chamber
    b. Check thickness with filmetrix
13. Deposit Circuit Shield Metal
    a. YES vapor prime with HDMS
    b. Gamma automatic coat-develop tool: spray coat with 1:10 AZ nLOF 2020 in acetone to a thickness of about 2 µm
    c. Bake at 115 C for 1 minute
    d. Expose for 3.2 s on ABM Contact aligner, bake for 1 minute at 115 C
    e. Develop for 1 minute in AZ 726 MIF
    f. AJA sputter deposition: 60 Ar preclean of the chip, about 200 nm of Cr (approximately 2000 s)
    g. Lift off in 1165 (about 15 min); rinse in DI water and IPA, blow dry with nitrogen
    h. Oxford 80: preclean chamber 10 min, $O_2$ plasma (150 W) for 10 minutes
14. Encapsulate with Oxides (FIG. 39 Step 7)
    a. Oxford 100 PECVD: high-rate clean 5 min, deposit about 200 nm TEOS, post clean chamber
    b. Check thickness with filmetrix
    c. Oxford AL ALD: 500 cycles of plasma enhanced $Al_2O_3$ at 200 C
15. Etch through aluminum oxide (FIG. 39 step 8)
    a. YES vapor prime with HDMS
    b. Gamma automatic coat-develop tool: spray coat with 1:10 AZ nLOF 2020 in acetone to a thickness of about 2 µm
    c. Bake at 115 C for 1 minute
    d. Expose for 3.2 s on ABM Contact aligner, bake for 1 minute at 115 C
    e. Develop for 1 minute in AZ 726 MIF
    f. PT 770 etcher: AlO etch recipe for 4 min
    g. Sonicate in 1165 to remove resist, rinse in DI Water and IPA, blow dry with nitrogen
    h. Oxford 80: preclean chamber 10 min, $O_2$ plasma (150 W) for 5 minutes 16. Etch to Interconnects and Form Panels (FIG. 39 Step 9)
    a. YES vapor prime with HDMS
    b. Gamma automatic coat-develop tool: spray coat with 1:10 AZ nLOF 2020 in acetone to a thickness of about 2 μm
    c. Bake at 115 C for 1 minute
    d. Expose for 2.1 s on ABM Contact aligner, bake for 1 minute at 115 C
    e. Develop for 1 minute in AZ 726 MIF
    f. Oxford 100:10 min oxygen chamber clean, 3 minutes $CHF_3/O_2$ season, $CHF_3/O_2$ etch
    g. Sonicate in 1165 to remove resist, rinse in DI Water and IPA, blow dry with nitrogen
    h. Oxford 80: preclean chamber 10 min, $O_2$ plasma (150 W) for 5 minutes
    i. Check electrically that integrated circuits work (at McEuen lab)
17. Ti Adhesion Layer for SEAs (FIG. 39 Step 10)
    a. YES vapor prime with HDMS
    b. Gamma automatic coat-develop tool: spray coat with 1:10 AZ nLOF 2020 in acetone to a thickness of about 2 μm
    c. Bake at 115 C for 1 minute
    d. Expose for 2.2 s on ABM Contact aligner, bake for 1 minute at 115 C
    e. Develop for 1 minute in AZ 726 MIF
    f. AJA sputter deposition: 60 Ar preclean of the chip, about 30 nm of Ti (approximately 180 s)
    g. Lift off in 1165 (about 15 min); rinse in DI water and IPA, blow dry with nitrogen
    h. Oxford 80: preclean chamber 10 min, $O_2$ plasma (150 W) for 5 minutes
18. Atomic Layer Deposition of Pt for SEAs (FIG. 39 Step 11)
    a. Arradiance ALD Gemstar-6:5 cycles $Al_2O_3$, 70 cycles Pt
    b. CDE ResMap Resistivity 4-pt Probe: check square resistance to verify film growth (the Pt for the robots shown in the main text measured 34 fl/sq)
19. Etch ALD Pt
    a. YES vapor prime with HDMS
    b. Gamma automatic coat-develop tool: spray coat with 1:10 AZ nLOF 2020 in acetone to a thickness of about 2 μm
    c. Bake at 115 C for 1 minute
    d. Expose for 2.3 s on ABM Contact aligner, bake for 1 minute at 115 C
    e. Develop for 1 minute in AZ 726 MIF
    f. Oxford 80: preclean chamber 10 min, $O_2$ mild descum (50 W) for 1 minutes
    g. AJA ion mill: 2 second etches with 10 seconds in between for 15 cycles
    h. Oxford 80: preclean chamber 10 min, $O_2$ mild descum (50 W) for 3 minutes
    i. Sonicate in 1165 to remove resist, rinse in DI Water and IPA, blow dry with nitrogen
    j. Check electrical contact between the ALD Pt and the interconnects (at McEuen lab)
20. Deposit Ti Capping for SEAs (FIG. 39 Step 12)
    a. YES vapor prime with HDMS
    b. Gamma automatic coat-develop tool: spray coat with 1:10 AZ nLOF 2020 in acetone to a thickness of about 2 μm
    c. Bake at 115 C for 1 minute
    d. Expose for 2.3 s on ABM Contact aligner, bake for 1 minute at 115 C
    e. Develop for 1 minute in AZ 726 MIF
    f. AJA sputter deposition: no Ar preclean, about 14.5 seconds Ti at 7 mTorr (approximately 2 nm)
    g. Lift off in 1165 (about 15 min); rinse in DI water and IPA, blow dry with nitrogen
21. Deposit and Pattern Aluminum/Aluminum Oxide for Release (FIG. 39 Step 13)
    a. AJA sputter deposition: no Ar preclean, about 600 seconds Al (approximately 100 nm)
    b. Oxford AL ALD: 20 cycles of plasma enhanced $Al_2O_3$ at 200 C
    c. YES vapor prime with HDMS
    d. Gamma automatic coat-develop tool: spray coat with 1:10 AZ nLOF 2020 in acetone to a thickness of about 2 μm
    e. Bake at 115 C for 1 minute
    f. Expose for 2 s on ABM Contact aligner, bake for 1 minute at 115 C
    g. Develop in AZ 726 MIF until the aluminum under the developed resist is gone, about 2 min 45 s
    h. Sonicate in 1165 to remove resist, rinse in DI Water and IPA, blow dry with nitrogen
    i. Oxford 80: preclean chamber 10 min, $O_2$ mild descum (50 W) for 3 minutes
22. Undercut Wafer Silicon with XeF2 for Release (FIG. 39 Step 14)
    a. Cleave chip with a scribe to release one quadrant at a time
    b. 3 min 200 C bake
    c. Xactix xenon difluoride etcher: 110 cycles of $XeF_2$, each one 12 s at 2.5 Torr. Check if the etch is finished optically and etch longer if necessary.
23. Release the Microscopic Robots
    a. Fill glass bottomed petri dish with 1:1000 aluminum etchant type A: DI water. Etch for about 3 hours
    b. Once robots are completely released, dilute the aluminum etchant via solvent exchange with DI water until pH neutral
    c. Solvent exchange to 1× phosphate buffered saline The yield of working robots (defined as robots that move divided by total number of fabricated robots) is approximately 50%, with higher yield for simple robots and lower yield for more complex ones. This stems primarily from a few failure-prone steps in the process, particularly the liftoff of the interconnects that go down a 15 μm step from the top of the robot body to the wafer silicon. This particular difficulty can be overcome by placing the circuit output pins on a metal layer closer to the silicon device layer in the future, decreasing the size of the step over which the interconnects have to be patterned.

Implementations of the subject matter and the functional operations described herein can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

We claim:

1. An artificial cilium comprising:
   a first actuator including a first passive layer on a first active layer;
   a second actuator including a second passive layer on a second active layer;
   a proximal panel, a distal panel, and, between the proximal panel and the distal panel, a middle panel having a length less than a distance between the proximal panel and the distal panel when the proximal panel and the distal panel are coplanar; and
   a wire that is (i) electrically connected to the second actuator and (ii) on each of the proximal panel and the distal panel;
   the first actuator being on each of, and spanning a proximal gap between, the proximal panel and the middle panel;
   the second actuator being on each of, spanning a distal gap between, the middle panel and the distal panel.

2. The artificial cilium of claim 1, (i) the first passive layer and the first active layer having different respective surface stresses; and (ii) the second passive layer and the second active layer having different respective surface stresses.

3. The artificial cilium of claim 1, each of the first passive layer and the second passive layer including an inorganic material.

4. The artificial cilium of claim 3, the inorganic material including at least one of titanium, titanium dioxide, silicon dioxide, a nitride of silicon, and hafnium dioxide, or a combination thereof.

5. The artificial cilium of claim 1, the first active layer and the second active layer including at least one of a metal, a transition metal, or a combination thereof.

6. The artificial cilium of claim 5, the metal being one of gold, silver, and platinum, or a combination thereof.

7. The artificial cilium of claim 5, the transition metal being one of ruthenium, rhodium, palladium, osmium, iridium, or a combination thereof.

8. The artificial cilium of claim 1,
the first passive layer including two regions respectively located (i) between the first active layer and the proximal panel, and (ii) between the first active layer and the middle panel;
the second passive layer including three regions located between the first active layer and (i) the proximal panel, (ii) the middle panel, and (iii) the distal panel, respectively.

9. The artificial cilium of claim 1,
the first active layer including two regions respectively located (i) between the first passive layer and the proximal panel, and (ii) between the first passive layer and the middle panel;
the second active layer including three regions located between the first passive layer and (i) the proximal panel, (ii) the middle panel, and (iii) the distal panel, respectively.

10. The artificial cilium of claim 1, the wire and the first active layer being monolithic.

11. The artificial cilium of claim 1, when the proximal, the middle, and the distal panels are coplanar in a horizontal plane, each of the proximal, the middle, and the distal panel also intersects a vertical plane that is perpendicular to the horizontal plane.

12. The artificial cilium of claim 1, the distance being along a length direction of the artificial cilium, and in a width direction perpendicular to the length direction, a width of the wire being at most one-tenth of a width of the second actuator.

13. The artificial cilium of claim 1, the distance being along a length direction of the artificial cilium, and in a width direction perpendicular to the length direction, a width of the first actuator being at least four-fifths that of the second actuator.

14. The artificial cilium of claim 1, the distance being along a length direction of the artificial cilium, each of the proximal gap and the distal gap being between 0.1 micrometer and ten micrometers.

15. The artificial cilium of claim 1, the distance being along a length direction of the artificial cilium, each of the first actuator and the second actuator having a respective thickness, perpendicular to the length direction, between five nanometers and fifteen nanometers.

16. The artificial cilium of claim 1, the distance being along a length direction of the artificial cilium, each of the first active layer and the second active layer having a respective thickness, perpendicular to the length direction, that is at least one nanometer.

17. The artificial cilium of claim 1, the distance being along a length direction of the artificial cilium, each of the proximal panel, the middle panel, and the distal panel having a respective thickness, perpendicular to the length direction, between 0.3 micrometers and 0.6 micrometers.

18. The artificial cilium of claim 1, further comprising:
a substrate;
a first electrode and a second electrode on the substrate, and electrically connected to the first active layer and the second active layer, respectively.

19. A cilia array comprising:
a substrate including a plurality of electrode pairs thereon; and
a linear array of artificial cilia of claim 1, each electrically connected to a respective electrode pair of the plurality of electrode pairs.

20. The cilia array of claim 19, wherein for each artificial cilium of the linear array, the first active layer and the second active layer are electrically connected to a first electrode and a second electrode, respectively, of the electrode pair of the plurality of electrode pair electrically connected thereto.

21. The cilia array of claim 19, the artificial cilia of the linear array being arrayed in an array direction and having a total width $W_{tot}$ along the array direction, the linear array having a length $L_A$ along the array direction, a fill factor $W_{tot}/L_A$ of the linear array being between ⅓ and ⅔.

22. The cilia array of claim 19, the plurality of electrode pairs being a one-dimensional array oriented parallel to the linear array of artificial cilia.

23. The cilia array of claim 19, the linear array being oriented in a horizontal direction, and further comprising:
an additional linear array of artificial cilia of claim 1, each electrically connected to a respective electrode pair of the plurality of electrode pairs, the additional linear array being oriented in a second direction that differs from the horizontal direction.

24. The cilia array of claim 23, further comprising a third linear array of artificial cilia of claim 1, each electrically connected to a respective electrode pair of the plurality of electrode pairs.

25. The cilia array of claim 24, the second direction being parallel to the horizontal direction, the third linear array being oriented in a vertical direction that is perpendicular to the horizontal direction and the second direction, and further comprising:
a fourth linear array of artificial cilia of claim 1, each electrically connected to a respective electrode pair of the plurality of electrode pairs, the fourth linear array being oriented in the vertical direction,
the linear array, the additional linear array, the third linear array, and the fourth linear array forming a rectangular cilia-unit on the substrate.

26. The cilia array of claim 25, further comprising a plurality of additional rectangular cilia-units that, with the rectangular cilia-unit, form an array of rectangular cilia-units on the substrate.

* * * * *